United States Patent
Miyawaki et al.

(10) Patent No.: US 11,018,563 B2
(45) Date of Patent: May 25, 2021

(54) MANUFACTURING APPARATUS AND MANUFACTURING METHOD OF ELECTRICAL ROTATING MACHINE

(71) Applicant: ODAWARA ENGINEERING CO., LTD., Kanagawa (JP)

(72) Inventors: Noburo Miyawaki, Ashigarakami-gun (JP); Takayuki Mochizuki, Ashigarakami-gun (JP); Yuji Miyazaki, Ashigarakami-gun (JP); Wataru Wakui, Ashigarakami-gun (JP); Hisayoshi Watanabe, Ashigarakami-gun (JP); Kodai Kono, Ashigarakami-gun (JP); Daiki Saito, Ashigarakami-gun (JP); Ryo Honda, Ashigarakami-gun (JP); Tomohiro Ishizuka, Ashigarakami-gun (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 173 days.

(21) Appl. No.: 16/281,461

(22) Filed: Feb. 21, 2019

(65) Prior Publication Data
US 2019/0190359 A1  Jun. 20, 2019

Related U.S. Application Data

(63) Continuation of application No. PCT/JP2018/019045, filed on May 17, 2018.

(30) Foreign Application Priority Data

Sep. 11, 2017 (JP) .............................. JP2017-173985

(51) Int. Cl.
*H02K 15/04* (2006.01)
*H02K 3/34* (2006.01)
(Continued)

(52) U.S. Cl.
CPC ......... *H02K 15/0421* (2013.01); *H02K 1/165* (2013.01); *H02K 3/04* (2013.01);
(Continued)

(58) Field of Classification Search
CPC ... B23P 19/00; H01F 7/00; H01F 7/06; H02K 3/04; H02K 15/00; H02K 15/04;
(Continued)

(56) References Cited

U.S. PATENT DOCUMENTS 8,056,215 B2 * 11/2011 Takada ............... H02K 15/0478
29/605
8,341,824 B2 * 1/2013 Takada ............... H02K 15/0037
29/596
(Continued)

FOREIGN PATENT DOCUMENTS

CN  105934871 A    9/2016
JP  2000166192 A *  6/2000
(Continued)

OTHER PUBLICATIONS

Extended (Supplementary) European Search Report dated May 11, 2020, issued in counterpart EP Application No. 18853175.0. (13 pages).
(Continued)

*Primary Examiner* — Carl J Arbes
(74) *Attorney, Agent, or Firm* — Westerman, Hattori, Daniels & Adrian, LLP

(57) ABSTRACT

A manufacturing apparatus of an electrical rotating machine includes a coil segment shaping section for shaping a linear wire rod with a predetermined length into a coil segment with a predetermined shape consisting of a pair of slot insertion portions extending substantially in parallel with each other and a linking portion for coupling the pair of slot insertion portions, and a coil assembling section for assem-
(Continued)

bling a coil by circularly arranging the coil segments shaped in the coil segment shaping section. The coil segment shaping section and the coil assembling section are constituted to continuously perform the shaping and the assembling of the coil segment in each coil segment unit, based on control data set depending on a coil to be fabricated.

12 Claims, 51 Drawing Sheets

(51) Int. Cl.
*H02K 3/12* (2006.01)
*H02K 3/48* (2006.01)
*H02K 15/12* (2006.01)
*H02K 1/16* (2006.01)
*H02K 15/06* (2006.01)
*H02K 15/10* (2006.01)
*H02K 3/28* (2006.01)
*H02K 3/04* (2006.01)
*H02K 15/08* (2006.01)

(52) U.S. Cl.
CPC ............... *H02K 3/12* (2013.01); *H02K 3/28* (2013.01); *H02K 3/345* (2013.01); *H02K 3/48* (2013.01); *H02K 15/04* (2013.01); *H02K 15/064* (2013.01); *H02K 15/08* (2013.01); *H02K 15/105* (2013.01); *H02K 15/12* (2013.01)

(58) Field of Classification Search
CPC ........ H02K 15/085; H02K 1/165; H02K 3/28; H02K 3/345; H02K 3/48; H02K 15/0421; H02K 15/064; H02K 15/08; H02K 15/105; H02K 15/12

See application file for complete search history.

(56) References Cited

U.S. PATENT DOCUMENTS

| 2014/0223727 | A1 | 8/2014 | Watanabe et al. |
| 2016/0372992 | A1 | 12/2016 | Tsuiki et al. |

FOREIGN PATENT DOCUMENTS

| JP | 2003-324911 | A | | 11/2003 |
| JP | 2004-072839 | A | | 3/2004 |
| JP | 2004-173357 | A | | 6/2004 |
| JP | 3791426 | B | * | 6/2006 |
| JP | 2012-151996 | A | | 8/2012 |
| JP | 2012-239371 | A | | 12/2012 |
| JP | 2014-007793 | | * | 1/2014 |
| JP | 2014-135857 | A | | 7/2014 |

OTHER PUBLICATIONS

Office Action dated Jan. 25, 2021, issued in counterpart to CN Application No. 201880003530.8 (11 pages).

* cited by examiner

MANUFACTURING APPARATUS AND MANUFACTURING METHOD OF ELECTRICAL ROTATING MACHINE

FIELD OF THE INVENTION

The present invention relates to a manufacturing apparatus of an electrical rotating machine used for fabrication of the electrical rotating machine such as a motor or a generator and to a manufacturing method of the electrical rotating machine.

BACKGROUND ART

Known is a segment-type coil as a stator coil or a rotor coil of the electrical rotating machine. This segment coil is formed by inserting a plurality of segments (hairpins), each obtained by bending a wire rod in a U-shape, into a plurality of slots arranged along the circumferential direction of the stator or the rotor, respectively, and by joining together free ends of these inserted segments by welding.

In Patent Document 1, a segment shaping method for the segment-type coil is disclosed. In this method, a wire rod already cut into a predetermined length was sequentially bent into a three-dimensional shape by a first bending die, a second bending die and shaping rollers without moving.

RELATED ART DOCUMENT

Patent Document

Patent Document 1: Japanese Patent Publication No. 2004-297863A

SUMMARY OF THE INVENTION

Problem to be Solved by the Invention

According to the conventional coil segment shaping method disclosed in Patent Document 1, most of parameters of the coil segment, such as the curved shape of the linking portion of the coil segment and the width between the slot insertion portions of the coil segment, were defined by a die geometry (dimension and shape of press surface) of the press die or the press bending die. Therefore, in order to change the curved shape of the linking portion and the width between the slot insertion portions, it was necessary to exchange the press die each time. In general, a great variety of coil segments with different lengths and angles of the U-shape linking portions and with different widths between the slot insertion portions were mixed in a single coil. Thus, according to the conventional method, even if in case of fabricating a single coil, press dies with various kinds of shape had to be prepared and exchanged with each other for making these coil segments with various kinds of shape. Also, when assembling these coil segments with various kinds of shape to form the coil, since the management of the coil segments, that is, what shaped coil segment should be utilized into where, was necessary, the assembling process became very complicated.

It was possible to reduce the number of exchange of the press die by stocking many of the coil segments with the same shape fabricated by using the same press die and by taking out the stocked coil segment at the time of need. However, the management of the stocked coil segments with various kinds of shape was complicated, and the management of fabricating the coil segments with various kinds of shape without overs and shorts was also complicated.

Furthermore, according to the conventional method, since it was impossible to consistently perform both the coil segment shaping process and the coil assembling process but it was necessary to independently perform them, the work efficiency was not able to be improved.

It is therefore an object of the present invention to provide a manufacturing apparatus and a manufacturing method of an electrical rotating machine, whereby fabrication processes can be consistently performed from shaping of coil segment to coil assembling and therefore an improved work efficiency can be attained.

Another object of the present invention is to provide a manufacturing apparatus and a manufacturing method of an electrical rotating machine, whereby there is no need of management of stocking and selecting of shaped coil segments.

Further object of the present invention is to provide a manufacturing apparatus of an electrical rotating machine, whereby it is possible to construct facilities with a scale that depends on demand.

Means to Solve the Problem

According to the present invention, a manufacturing apparatus of an electrical rotating ma chine includes a coil segment shaping section for shaping a linear wire rod with a predetermined length into a coil segment with a predetermined shape consisting of a pair of slot insertion portions extending substantially in parallel with each other and a linking portion for coupling the pair of slot insertion portions, and a coil assembling section for assembling a coil by circularly arranging the coil segments shaped in the coil segment shaping section. The coil segment shaping section and the coil assembling section are constituted to continuously perform the shaping and the assembling of the coil segment in each coil segment unit, based on control data set depending on a coil to be fabricated.

The shaping and the assembling of the coil segment in each coil segment unit are continuously performed based on control data set depending on a coil to be fabricated. Thus, the operations from the shaping of the coil segments to the coil assembling can be consistently performed resulting that the work efficiency can be extremely improved. Also, since the stock of the formed coil segments and the selection of necessary coil segment from the stocked coil segments are not necessary, the managements can become extremely easy.

It is preferred that the coil segment shaping section includes a first bending section for performing first bending of the wire rod in a plane to form a first bent body, and a second bending section for performing second bending of the first bent body in a direction intersected with the plane, and that the first bending section and the second bending section are constituted to continuously perform the first bending and the second bending of the coil segment in each coil segment unit, based on the set control data.

It is also preferred that apparatus further includes a wire rod providing section for supplying a linear wire rod with a predetermined length, and that the wire rod providing section, the coil segment shaping section and the coil assembling section are constituted to continuously perform the supplying, the shaping and the assembling of the coil segment in each coil segment unit, based on the set control data.

It is further preferred that the apparatus further includes a coil insertion mechanism for pushing out an assembled coil that is assembled in the coil assembling section to an axial direction of the assembled coil to insert the assembled coil into a core coaxially arranged with the assembled coil.

In this case, it is preferred that the apparatus further includes a work supplying line for supplying stator and rotors having cores, a coil supplying line connected to the work supplying line and provided with the coil segment shaping section, the coil assembling section and the coil insertion mechanism, and that the coil insertion mechanism of the coil supplying line is constituted to insert the assembled coil into slots of the core supplied from the work supplying line.

In this case, it is preferred that the coil supplying line is unitizes, and that a plurality of unitized coil supplying lines are equipped, the number of the equipped coil supplying lines depending on the demand of the electrical rotating machine. Because the coil supplying line is unitized, it is possible to perform efficient investment in plant and equipment. That is, in the initial stage of construction of manufacturing equipment, a small scale coil supplying line is built to reduce the initial investment cost, and then, the number of the unitized coil supplying lines may be increased to enlarge the manufacturing scale depending on increased demand.

It is also preferred that the first bending section includes a plurality of jigs arranged on the plane for supporting the wire rod, and a plurality of first bending drive mechanisms for moving respectively the plurality of jigs on the plane so that the wire rod is formed in the predetermined shape based on moving amounts respectively set depending on shape conditions of the coil segment to be formed.

It is more preferred that the plurality of first bending drive mechanisms are constituted to rotate or linearly move the plurality of jigs based on set data of the moving amounts, respectively.

It is further preferred that the second bending section includes a plurality of pairs of press jigs arranged to oppose to each other in directions intersecting with the plane, for pinching and pressing the linking portion, and a plurality of second bending drive mechanisms for moving respectively the plurality of pairs of press jigs in directions intersecting with the plane based on moving amounts respectively set depending on shape conditions of the coil segment to be formed.

It is more preferred that the plurality of second bending drive mechanisms are constituted to move the plurality of pairs of press jigs based on data of the set moving amounts, respectively.

It is also preferred that the plurality of second bending drive mechanisms are constituted to move the plurality of pairs of press jigs in a direction perpendicular to the plane and/or in a direction obliquely intersecting with the plane so as to forma misalignment along a direction intersecting with the plane in the linking portion.

It is further preferred that the coil assembling section includes a segment arrangement body having a plurality of segment hold portions annularly arranged along its circumferential direction, into which the plurality of coil segments can be respectively inserted from the outer radial directions, and being rotatable around its center axis, and a guide means constituted to guide and insert one of the pair of slot insertion portions of each coil segment into one of the segment hold portions each time the segment arrangement body rotates by a first predetermined angle, and constituted to guide and insert the other one of the pair of slot insertion portions into another one of the segment hold portions after the segment arrangement body rotates by a second predetermined angle from the insertion of the one slot insertion portion.

According to the present invention, also, a manufacturing method of an electrical rotating machine includes a coil segment shaping process of shaping a linear wire rod with a predetermined length into a coil segment with a predetermined shape consisting of a pair of slot insertion portions extending substantially in parallel with each other and a linking portion for coupling the pair of slot insertion portions, and a coil assembling process of assembling a coil by circularly arranging the coil segments shaped in the coil segment shaping process. The coil segment shaping process and the coil assembling process continuously perform the shaping and the assembling of the coil segment in each coil segment unit, based on control data set depending on a coil to be fabricated.

The shaping and the assembling of the coil segment in each coil segment unit are continuously performed based on control data set depending on a coil to be fabricated. Thus, the operations from the shaping of the coil segments to the coil assembling can be consistently performed resulting that the work efficiency can be extremely improved. Also, since the stock of the formed coil segments and the selection of necessary coil segment from the stocked coil segments are not necessary, the managements can become extremely easy.

It is preferred that the coil segment shaping process includes a first bending process of performing first bending of the wire rod in a plane to form a first bent body, and a second bending process of performing second bending of the first bent body in a direction intersected with the plane, and that the first bending process and the second bending process continuously perform the first bending and the second bending of the coil segment in each coil segment unit, based on the set control data.

It is also preferred that the method further includes a wire rod providing process of supplying a linear wire rod with a predetermined length, and that the wire rod providing process, the coil segment shaping process and the coil assembling process continuously perform the supplying, the shaping and the assembling of the coil segment in each coil segment unit, based on the set control data.

It is further preferred that the method further includes a coil insertion process of pushing out an assembled coil that is assembled in the coil assembling process to an axial direction of the assembled coil to insert the assembled coil into a core coaxially arranged with the assembled coil.

Effect of the Invention

According to the present invention, since the shaping and the assembling of the coil segment in each coil segment unit are continuously performed based on control data set depending on a coil to be fabricated, the operations from the shaping of the coil segments to the coil assembling can be consistently performed resulting that the work efficiency can be extremely improved. Also, since the stock of the formed coil segments and the selection of necessary coil segment from the stocked coil segments are not necessary, the managements can become extremely easy.

According to the present invention, also, the work supplying line for supplying stator and rotors having cores, the coil supplying line connected to the work supplying line and provided with the coil segment shaping section, the coil assembling section and the coil insertion mechanism are provided, and he coil supplying line is unitizes. Thus, in the initial stage of construction of manufacturing equipment, a small scale coil supplying line is built to reduce the initial investment cost, and then, the number of the unitized coil supplying lines may be increased to enlarge the manufacturing scale depending on increased demand. As a result, it is possible to perform efficient investment in plant and equipment.

EMBODIMENTS FOR CARRYING OUT THE INVENTION

Hereinafter embodiments of the present invention will be described with reference to the drawings. In the following embodiments, a rectangular wire with a quadrangular cross-section will be used as for a wire rod. However, a single line wire or a stranded line wire with any shaped cross-section such as for example a circular-shaped cross-section, a square-shaped cross-section, a polygonal-shaped cross-section or other-shaped cross-section may be applicable as for the wire rod, according to the present invention.

Figure 1:
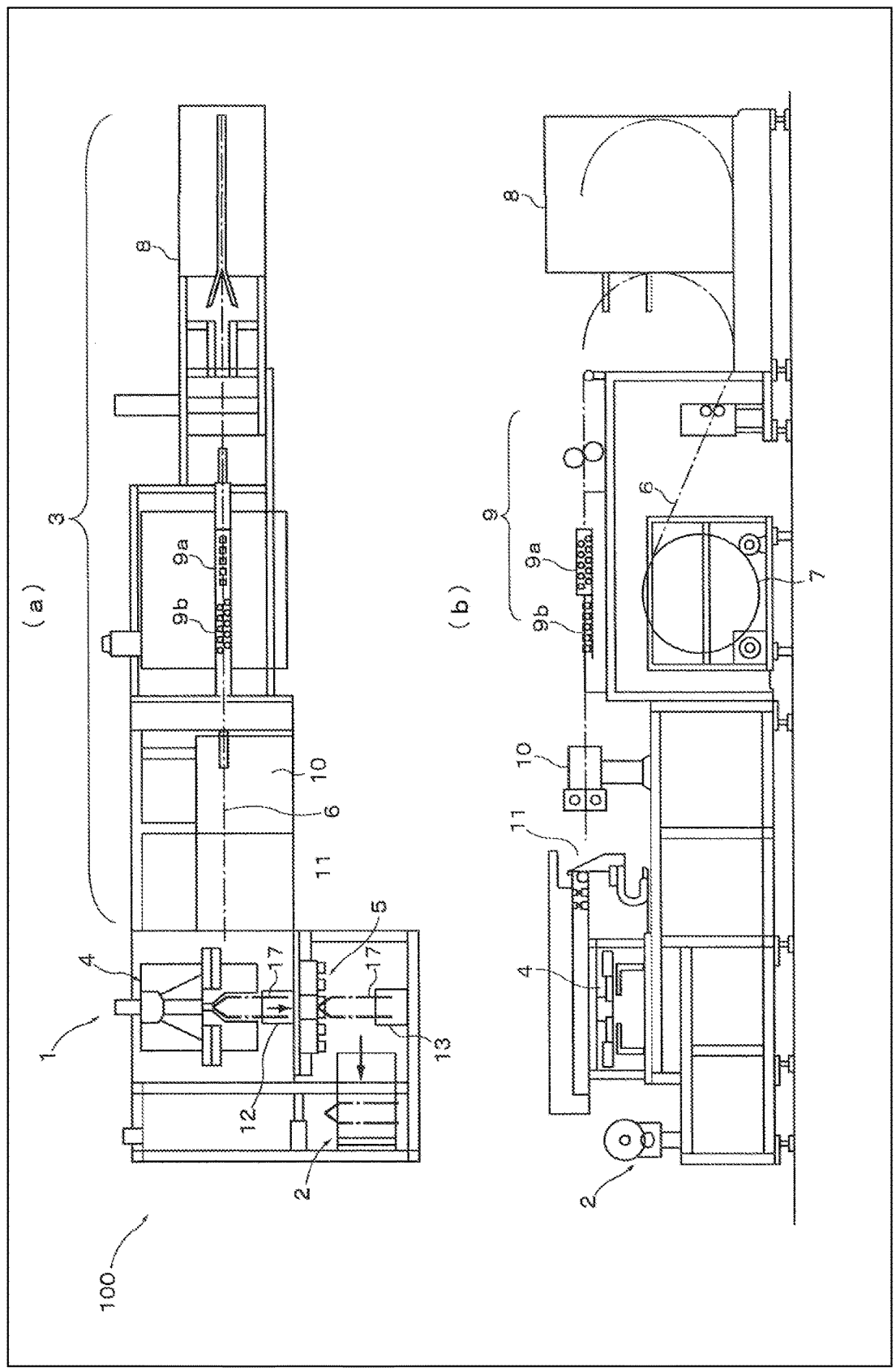
FIG. 1 is views schematically illustrating a partial constitution of a manufacturing apparatus of an electrical rotating machine in an embodiment according to the present invention, in which (a) shows a plane view and (b) shows a side view.

As shown in FIG. 1, a manufacturing apparatus 100 of an electrical rotating machine of this embodiment has a coil segment shaping section 1, and a coil assembling section 2 for assembling coil segments formed in the coil segment shaping section 1 in line with slots circularly arranged along the circumferential direction of the electrical rotating machine.

The coil segment shaping section 1 has a wire rod providing section 3, a first bending section 4 and a second bending section 5 for forming step portion in the crank shape. The first bending section 4 bends a separated linear wire rod with a predetermined length, supplied from the wire rod providing section 3, into a predetermined shape (U-shape for example) in the same plane (in a horizontal plane in this embodiment). The second bending section 5 bends a coil segment (first bent body) bent in the first bending section 4 in a plane (in a perpendicular plane in this embodiment) perpendicular to the axis of the coil segment and to the above-mentioned same plane. Also, the second bending section 5 provides a special shape (step shape or crank shape for example) to the top end portion of the coil segment in order to shift or misalign a slot insertion portion of the coil segment in a radial direction of the core.

The wire rod providing section 3 has a bobbin 7 on which a continuous wire rod 6 of a rectangular wire with the surface coated by an insulation layer is wound, a feed direction switching section 8 for drawing the continuous wire rod 6 from the bobbin 7 and for changing its feed direction, a corrective transporting section 9 including a plurality of roller pairs 9a for pinching the flatwise side of the continuous wire rod 6 to transport the pinched wire rod and a plurality of roller pairs 9b for pinching the edgewise side of the continuous wire rod 6 to transport the pinched wire rod, for correcting a longitudinal distortion of the wire rod, a peeling section 10 for stripping the insulation layer coated around the distortion-corrected wire rod 6, in which peeling areas are located at both end portions of the wire rod to keep a predetermined distance with each other, and a cutting section 11 for cutting the continuous wire rod 6 passed through the peeling section 10 at positions located along the wire rod to keep the predetermined distance with each other into separated wire rods. The peeling section 10 in this embodiment has a configuration to strip the coated insulation layer by a laser beam. A peeling area stripped by the peeling section 10 includes respective two areas of the separated wire rod and the neighbor separated wire rod. Thus, the cutting section 11 is constituted to cut the continuous wire rod 6 at the center position of the peeling area. Note that, as for the peeling section 10, any constitution to strip the coated insulation layer using mechanical cutting or clipping may be utilized other than that using a laser beam.

The separated wire rod 6 bent by the first bending section 4, that is, a U-shaped first bent body is transferred to the second bending section 5 by means of a feed mechanism 12 located between the first bending section 4 and the second bending section 5. The feed mechanism 12 has a pair of chucking portions (not shown) formed by air cylinders. The pair of chucking portions will be waiting in the state where their chuck pieces are open to cover the region into which both leg parts (a pair of slot insertion portions) of the first bent body are turned by the bending. After the chucking portions grip the both leg parts of the first bent body, the feed mechanism 12 moves upward to detach the first bent body from the first bending section 4 and then transfers the first bent body to the second bending section 5. The end portions of the both leg parts of the first bent body transferred by means of the feed mechanism 12 are then held by a hold member 13. The hold member 13 has configurations of a pair of chucking portions formed by air cylinders for gripping the pair of slot insertion portions as well as the feed mechanism 12. After the first bent body is delivered to the hold member 13, the feed mechanism 12 backs away so that the coil end portion (linking portion) of the first bent body becomes free. Under this state, bending operation including bending operation for forming a step shape (a crank shape) in the coil end portion of the first bent body is performed by the second bending section 5. In the configuration shown in FIG. 1, the feed direction switching section 8, the corrective transporting section 9, the peeling section 10 and the cutting section 11 in the wire rod providing section 3, and the first bending section 4 are aligned along the lateral direction in FIG. 1 (a), the second binding section 5 is arranged along the perpendicular direction with respect to the first bending section 4 (the longitudinal direction in FIG. 1 (a)), and the coil assembling section 2 is arranged along the perpendicular direction with respect to the second bending section 5 (lateral direction in FIG. 1 (a)). However, the feed direction switching section 8, the corrective transporting section 9, the peeling section 10, the cutting section 11, the first bending section 4, the second binding section 5 and the coil assembling section 2 may be aligned along the lateral direction in FIG. 1 (a). That is, there is no limitation in the arrangement of the coil segment shaping section and the coil assembling section, in other words, there is no limitation in the layout if the coil formation concludes in a single manufacturing apparatus.

Hereinafter, configurations and bending operations of the first bending section 4 will be described in detail.

Figure 2:
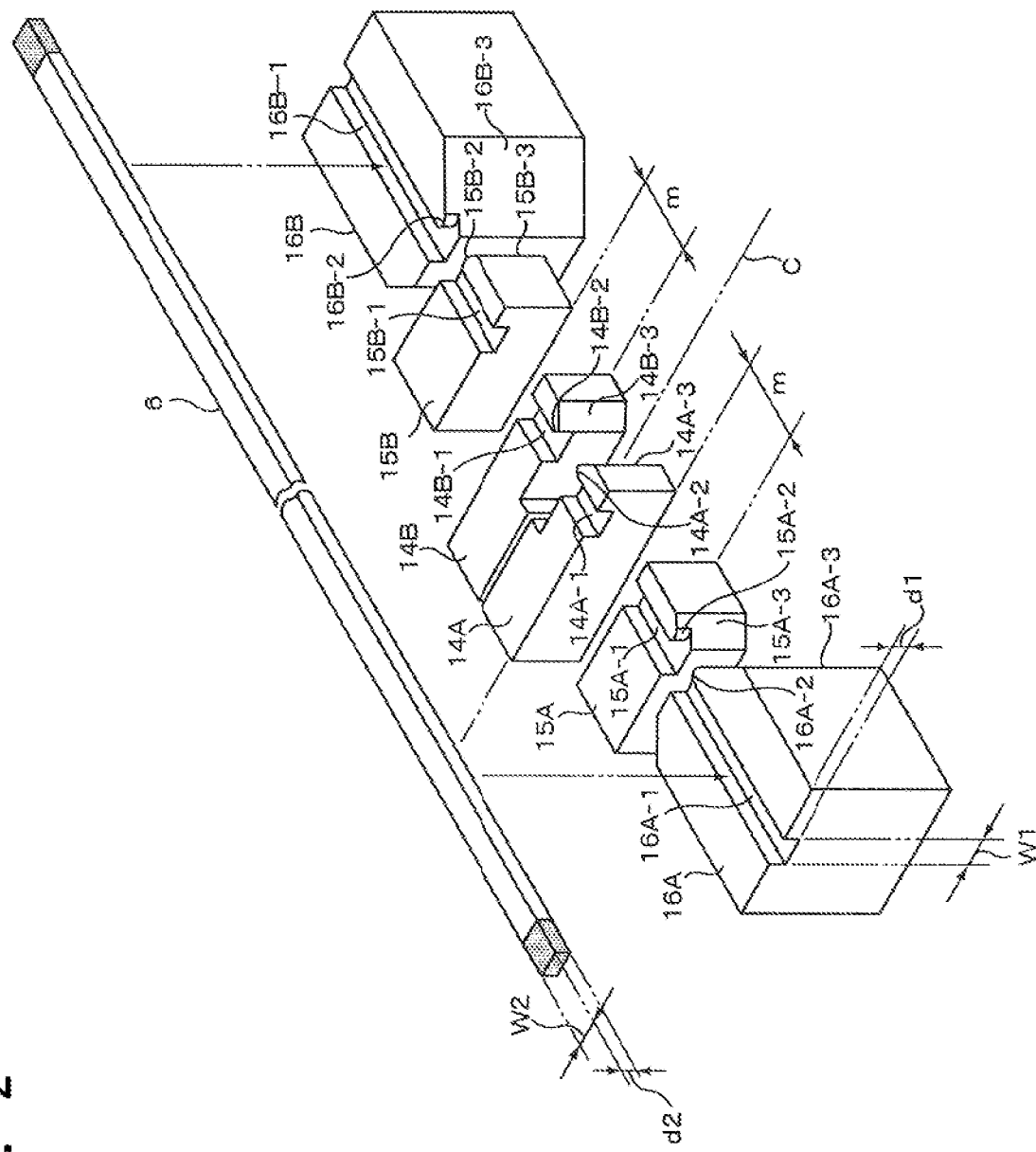
FIG. 2 is an essential part perspective view schematically illustrating initial state relationship between jigs and a wire rod in a first bending section of a coil segment shaping section in the embodiment of FIG. 1.

The first bending section 4 has as shown in FIG. 2 a plurality of (in this case six) block-shaped jigs 14A, 14B, 15A, 15B, 16A and 16B provided with respective concave grooves for supporting the linear wire rod 6 with the predetermined length. The insulation layer of the both end portions of the wire rod 6 was stripped or peeled. In the figure, the peeled portions at the both ends of the wire rod 6 are represented as dot areas. Rotary movement or linear movement of these jigs 14A, 14B, 15A, 15B, 16A and 16B are controlled by numerical control (NC control) based on the set control data, respectively. It should be noted that "the rotary movement" in this description indicates a rotating (turning) movement around the rotation center (turning center).

Figure 3:
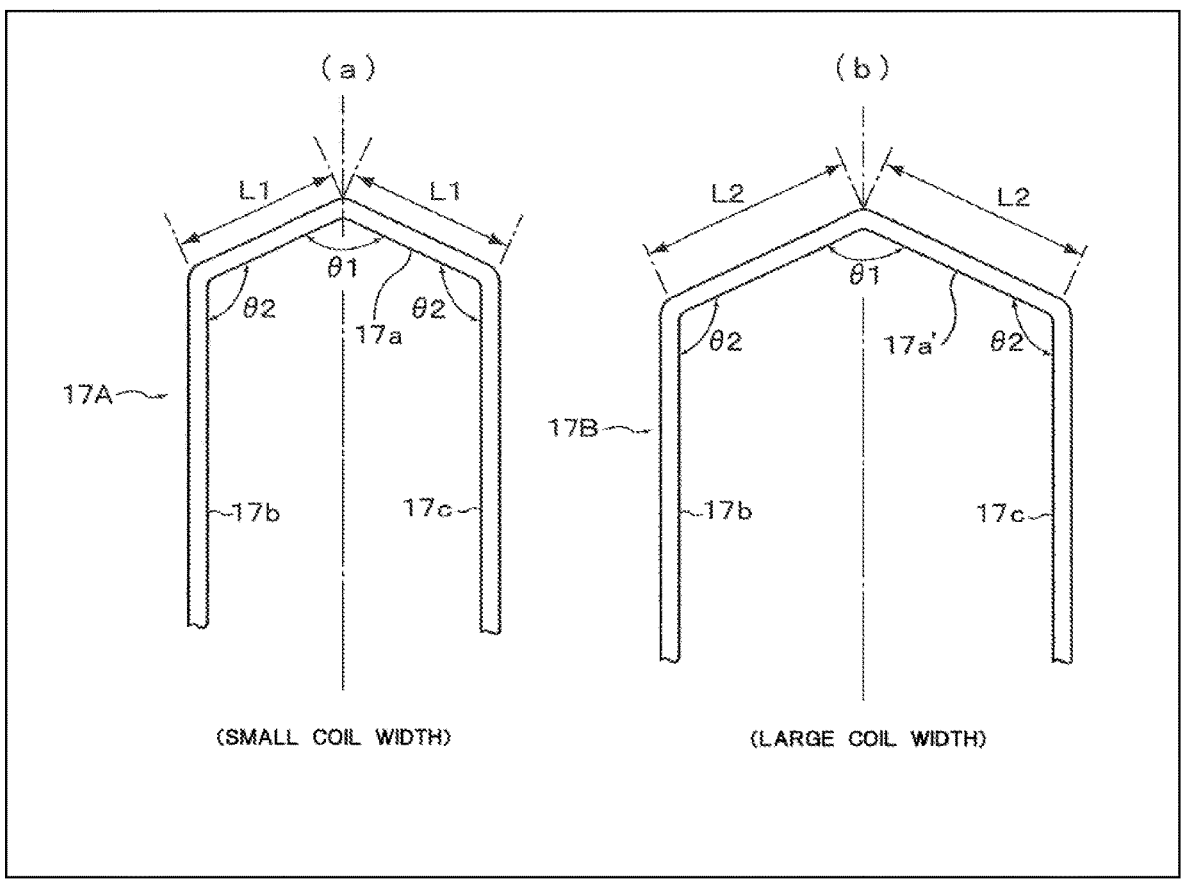
FIG. 3 is views illustrating shapes of first bent bodies formed in the first bending section in the embodiment of FIG. 1, in which (a) shows the first bent body with a small coil width, and (b) shows the first bent body with a large coil width.

In this embodiment, at the first bending section 4, the linear wire rod 6 is bent in the same plane to form the U-shape shown in FIG. 3 (a) and thus the first bent body 17A of the coil segment is obtained. The first bent body 17A consists of a linking portion 17a having a chevron shape with an apex angle (hereinafter called as a central angle) of θ1, and a pair of slot insertion portions 17b and 17c each connected to the linking portion 17a with an angle (hereinafter called as a shoulder angle) of θ2 and extending substantially in parallel with each other. The linking portion 17a and the pair of slot insertion portions 17b and 17c are formed in the same plane. This first bent body 17A is a small coil width example in which each side of the linking portion 17a has a small length of L1.

The jigs 14A, 14B, 15A, 15B, 16A and 16B in this embodiment are arranged as shown in FIG. 2 in line symmetry with respect to the folding centerline C (bending centerline) of the first bending section 4, in other words, with respect to the center position of the wire rod 6 along its axis. These jigs of the equal number (three in this case) to each other are arranged in left-side and right-side of the folding centerline. The pair of jigs 14A and 14B arranged at the most inner side with respect to the folding centerline C (innermost jigs) are configured to provide, by its rotation (rotary movement), the folding of the center angle of θ1 to the linking portion 17a of the first bent body 17A. In practice, the pair of jigs 15A and 15B and the pair of jigs 16A and 16B rotate together with the rotation of the pair of jigs 14A and 14B. On the other hand, the pair of jigs 16A and 16B arranged at the most outer side with respect to the folding centerline C (outermost jigs) and the pair of jigs 15A and 15B arranged next to the respective outermost jigs 16A and 16B are configured to provide, by their relative rotation (relative rotary movement), the folding of the shoulder angle of θ2 to the first bent body 17A. The coil width determined by the length L1 of each side of the linking portion 17a of the first bent body 17A shown in FIG. 3 (a) is defined by a distance m between the jigs 14A and 15A and a distance m between the jigs 14B and 15B.

As shown in FIG. 2, the jigs 14A, 14B, 15A, 15B, 16A and 16B have concave grooves 14A-1, 14B-1, 15A-1, 15B-1, 16A-1 and 16B-1 with opened top surfaces and laterally penetrated-through sides, respectively. The width w1 of each concave groove is set to slightly larger than the width (width of the edgewise direction) w2 of the wire rod 6 of the rectangular wire. Thus, the wire rod 6 is certainly supported by the concave grooves of the jigs 14A, 14B, 15A, 15B, 16A and 16B during the bending operation to the edgewise direction. Configuration of each jig for supporting the wire rod 6 is not limited to a particular shape, but in this embodiment, each jig has a concave groove so that the wire rod 6 is inserted into the concave groove to restrict its movement in the bending direction. The depth d1 of each concave groove is set equal to or larger than the thickness (width in flatwise direction) d2 of the wire rod 6. The width w1 of each concave groove is set so that the wire rod 6 can be closely inserted and supported by the concave groove to improve the dimensional precision of the first bent body 17A. Since the width w1 is not variable but fixed, if it is necessary to change the width w2 of the wire rod 6 depending on the kind of the coil, the jigs 14A, 14B, 15A, 15B, 16A and 16B have to be changed. Therefore, these jigs 14A, 14B, 15A, 15B, 16A and 16B are detachably fixed to a support member described below by using fixing screws.

In the initial state before the bending operation of the first bending section 4 is started, the concave grooves 14A-1, 14B-1, 15A-1, 15B-1, 16A-1 and 16B-1 of these jigs 14A, 14B, 15A, 15B, 16A and 16B are aligned on a straight line with each other as shown in FIG. 2. That is, the jigs 14A, 14B, 15A, 15B, 16A and 16B shown in this figure are in the initial position.

As shown in FIG. 2, edges 14A-2, 14B-2, 15A-2, 15B-2, 16A-2 and 16B-2 of the concave grooves 14A-1, 14B-1, 15A-1, 15B-1, 16A-1 and 16B-1 of these jigs 14A, 14B, 15A, 15B, 16A and 16B that will be in contact with the edgewise side surface of the wire rod 6 are formed to have curved surfaces so as to not scratch the insulation layer of the wire rod 6 by their sharp corners during the bending operation. Also, chamfering parts 14A-3, 14B-3, 15A-3, 15B-3, 16A-3 and 16B-3 are formed on the outside surface of the jigs 14A, 14B, 15A, 15B, 16A and 16B to avoid occurrence of any interference with other jigs by their displacements during the bending operation, respectively. According the conventional bending method where the wire rod was pressed by a pair of forming dies having a fixed press surface corresponding to the desired bending shape, because the both surfaces or the whole surface of the wire rod received the press pressure, the insulation layer of the wire rod was easily bruised. That is, because the edge of the press surface of the press dies would sharpen in order to improve the bending precision and thus the stress was concentrated at the edge, the insulation layer was easily damaged. In the conventional bending method using the press dies with the fixed press surface, it was impossible to know whether the insulation layer would be damaged or not until the wire rod was really pressed by the press dies. In case that the problem was occurred, it was necessary to fabricate another press dies causing increase in cost for the bending. Whereas in this embodiment, since it is the bending in the open system where the wire rod 6 is inserted in the concave grooves of the jigs, any scratch on the insulation layer of the wire rod will never be occurred.

It should be noted that, although in the above-mentioned description, the jigs 14A, 14B, 15A, 15B, 16A and 16B have the concave grooves 14A-1, 14B-1, 15A-1, 15B-1, 16A-1 and 16B-1 with the opened top surfaces and the laterally penetrated-through sides, respectively, and that the wire rod 6 is inserted into these concave grooves from the upper side, another configuration in which the wire rod 6 is inserted into the concave grooves from their lateral sides may be adopted. In the above-mentioned description, also, the wire rod 6 is caught and supported by the concave grooves with the opened top surfaces during the bending operation. However, the jigs of the segment forming apparatus according to the present invention are not limited to this configuration. For example, the jigs may be formed by stacking pairs of jigs to have via holes for passing the wire rod 6 there through. The wire rod 6 will be passed through the via holes from the lateral direction, and then the bending operation of the wire rod will be performed. After the first bending operation is performed, each jig will be separated into individual top and bottom jigs to release the first bent body.

Hereinafter, the first bending operation of the wire rod 6 in the first bending section 4 will be described in detail. First, the linear wire rod 6 having a predetermined length is inserted from the upper side into the concave grooves, aligned in a straight line, of the jigs 14A, 14B, 15A, 15B, 16A and 16B, and is supported by these jigs in a bridging state. Then, bending operation by the first bending section 4 is started.

Figure 4:
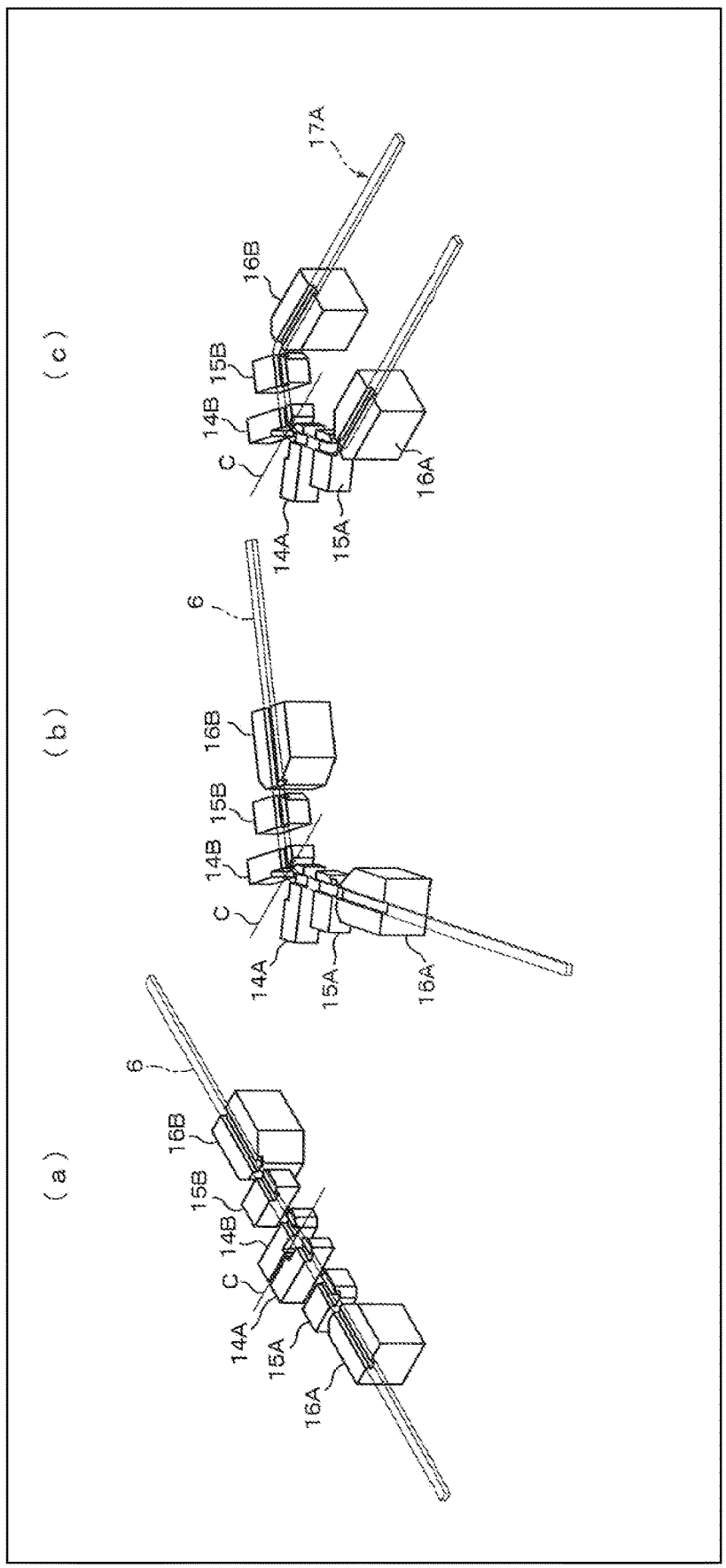
FIG. 4 is an essential part perspective view illustrating, in stages, first bending operation of the wire rod in the embodiment of FIG. 1.

FIG. 4 schematically illustrates this bending operation performed by the first bending section 4. FIG. 4 (a) shows the state where the wire rod 6 is set in the concave grooves, aligned in a straight line, of the jigs 14A, 14B, 15A, 15B, 16A and 16B, and is supported by these jigs in the bridging state. First bending of the wire rod 6 is performed as shown in FIG. 4 (b) by rotating and moving the jigs 14A, 14B, 15A, 15B, 16A and 16B from this state, and then second bending is performed to finally provide the first bent body 17A with the U-shape as shown in FIG. 4 (c).

As aforementioned, in this embodiment, the six jigs 14A, 14B, 15A, 15B, 16A and 16B are arranged in symmetry with respect to the bending centerline C, and each pair of the jigs located at the line-symmetric positions rotates and moves in line-symmetric manner in response to control data. As a result, the first bent body 17A formed in the first bending section 4 of this embodiment has the U-shape in the line-symmetry as shown in FIG. 3 (a). It is possible to form a first bent body with various kinds of shape by modifying the control data to change the rotating angle or the moving linear distance of the jigs 14A, 14B, 15A, 15B, 16A and 16B. For example, if the second bending is performed under the conditions where the pair of outermost jigs 16A and 16B and the pair of jigs 15A and 15B next to the outermost jigs 16A and 16B are linearly moved in the direction leaving from the bending centerline C to increase the distance m between the jig 14A and the jig 15A and the distance m between the jig 14B and the jig 15B in the initial state before the bending or during the bending, a line-symmetrical first bent body 17B with a large coil width can be fabricated. As shown in FIG. 3 (b), the linking portion 17a' of this first bent body 17B consists of a pair of sides each having a length L2 that is longer than the length L1 of each side of the linking portion 17a shown in FIG. 3 (a) (L2>L1). Also, if the first bending is performed under the conditions where the rotational movement amount of the pair of jigs 14A and 14B is changed to obtain the center angle of θ3, and then if the second bending is performed under the conditions where only the pair of jigs 15B and 16B is linearly moved in the direction leaving from the bending centerline C to increase the distance m between the jig 14B and the jig 15B in the initial state before the bending or during the bending, a line-asymmetrical first bent body 17C can be fabricated. As shown in FIG. 3 (c), the linking portion 17a" of this first bent body 17C has a center angle different from other first bent bodies and consists of a pair of sides having different length with each other. Therefore, according to this embodiment, various kinds of first bent bodies for the coil segments with various shapes can be promptly obtained without changing molding parts (jigs) by merely changing the amount of movement (control data) of the jigs 14A, 14B, 15A, 15B, 16A and 16B. As aforementioned, to fabricate a single coil of the rotating machine, it is necessary to fabricate plural kinds of coil segments with different shapes. However, according to this embodiment, only by providing a plurality of kinds of control data to the apparatus, each jig will automatically move and rotate in response to the control data read out to fabricate continually a plurality of kinds of coil segments (first bent bodies). Therefore, a plurality of kinds of coil segments (first bent bodies) that are necessary for forming a coil can be fabricated in a lump without performing stock management of the coil segments.

As mentioned above, according to this embodiment, the first bent bodies of the coil segments are formed only by rotationally moving or linearly moving in one plane (in horizontal plane), by NC control based on the control data, the plurality of simple block-shaped jigs 14A, 14B, 15A, 15B, 16A and 16B that do not have the similar shapes as the target shapes. Thus, according to this embodiment, since press dies having shapes similar to the target shapes respectively as in the conventional apparatus are not necessary to use but a plurality of NC-controlled dies are used, a large amount of die production expense is not necessary and the manufacturing cost of coil segments becomes cheap. Also, since any die exchange becomes needless for forming coil segments of various kinds of shape, no downtime due to the die exchange occurs resulting that shortening in working hours can be expected and the work itself becomes extremely easy.

Hereinafter, support structures and drive mechanisms of the jigs 14A, 14B, 15A, 15B, 16A and 16B will be described in detail.

Figure 5:
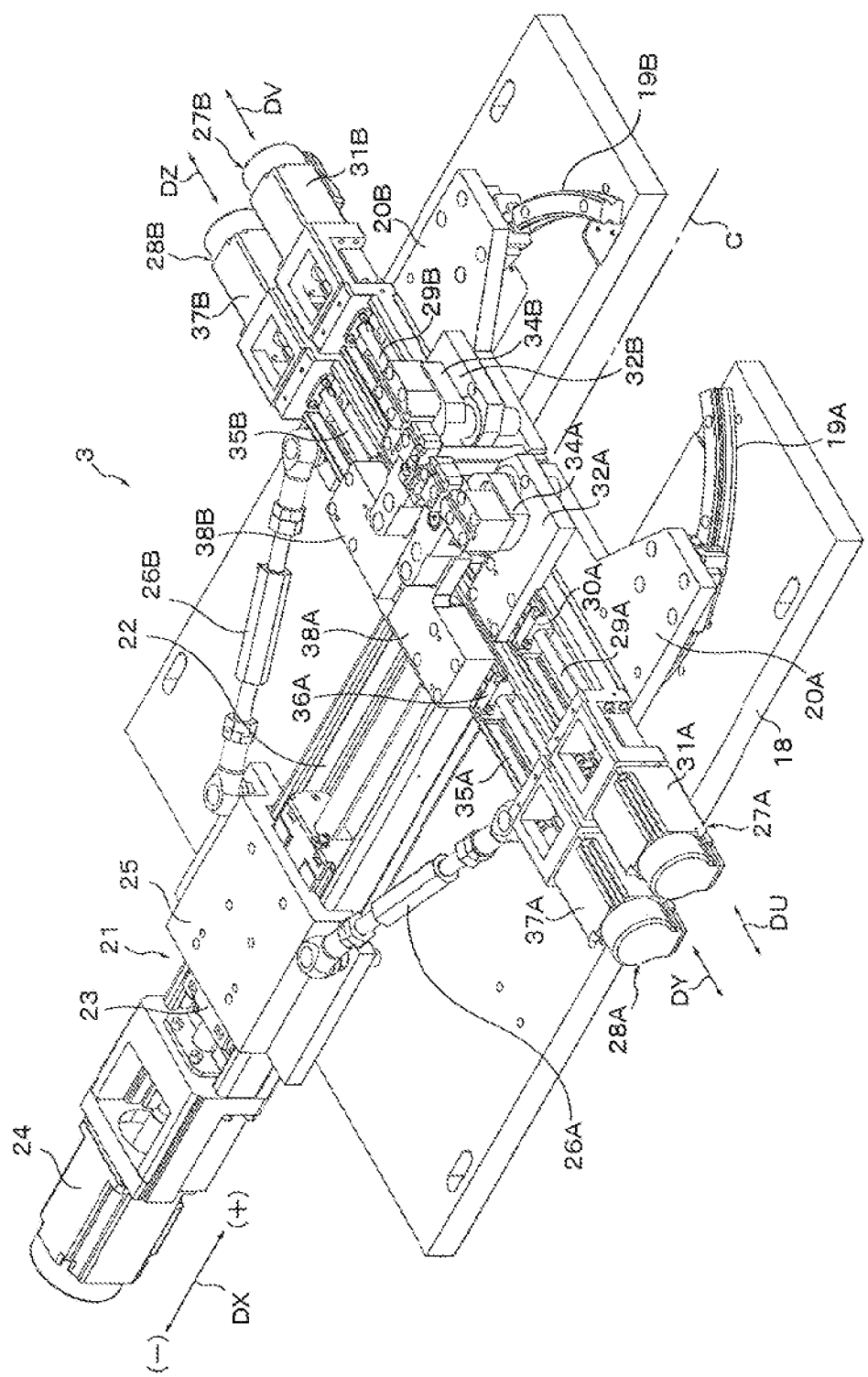
FIG. 5 is a perspective view illustrating an initial state of the first bending operation of the first bending section in the embodiment of FIG. 1.
Figure 6:
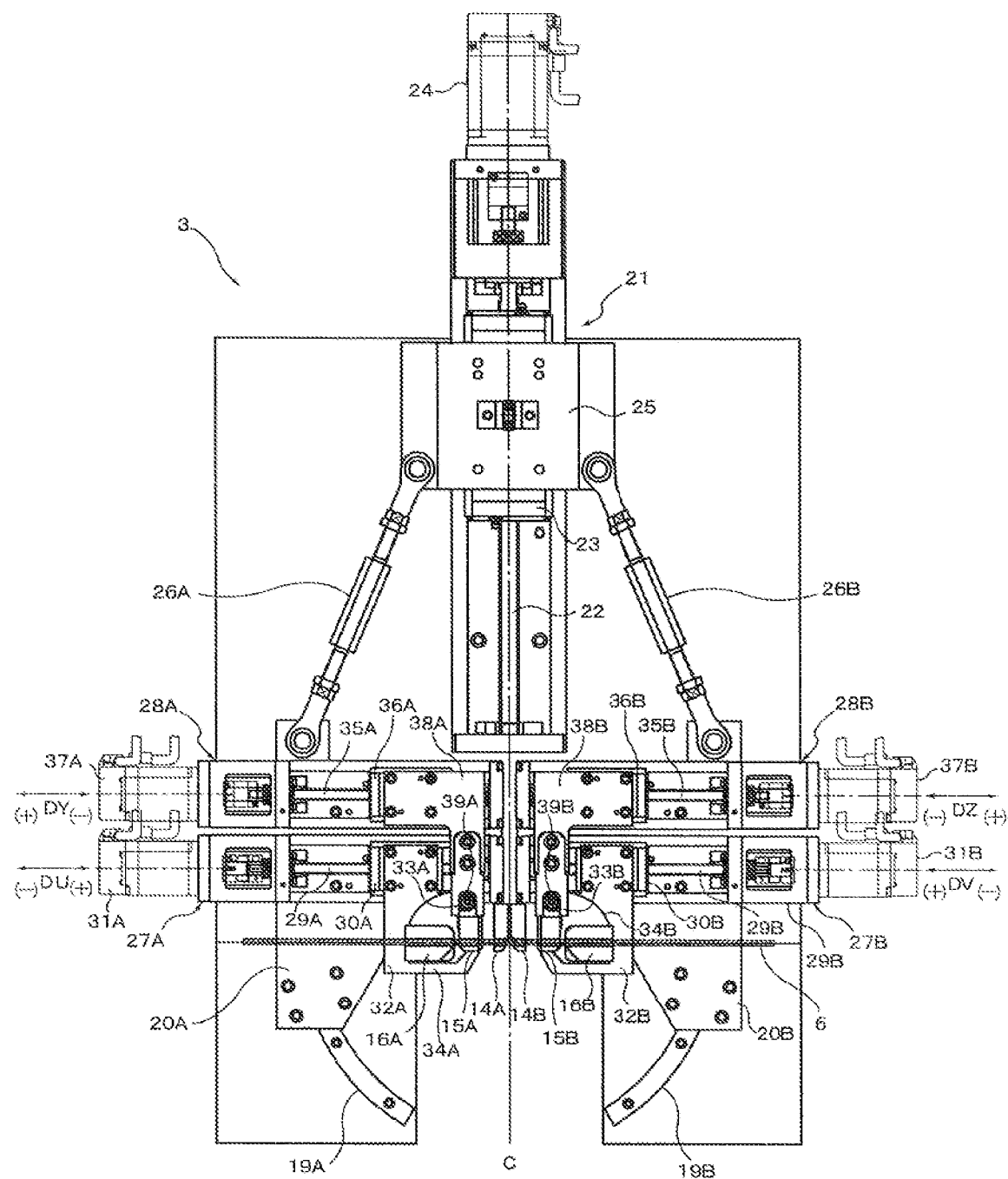
FIG. 6 is a plane view illustrating the initial state of the first bending operation of the first bending section in the embodiment of FIG. 1.

As shown in FIG. 5 and FIG. 6, the first bending section 4 has a fixed base 18 provided with a notched portion formed in the central part around the folding centerline C and in front (downward region in FIG. 6), a pair of arc-shaped guide rails 19A and 19B arranged and fixed to the front portion of the fixed base 18 in a linear symmetry with respect to the folding centerline C, movable bases 20A and 20B engaged with these guide rails 19A and 19B and slidably moved along the guide rails 19A and 19B, respectively, and a drive mechanism 21 for moving the movable bases 20A and 20B along the guide rails 19A and 19B, respectively.

The guide rails 19A and 19B are configured so that the center of the arc of these guide rails is located on a point of the folding centerline C.

The drive mechanism 21 has a ball screw portion 22 provided with a rotation axis in the DX direction along the bending centerline C, a nut portion 23 threadably mounted on the ball screw portion 22 and slidable in the DX direction, a servomotor 24 for rotating the ball screw portion 22, a slider 25 fixed to the nut portion 23 and moving in the DX direction in response to the rotation of the ball screw portion 22, and arms 26A and 26B respectively coupled via rotatable joints between the slider 25 and the movable bases 20A and 20B.

On the movable base 20A, a drive mechanism 27A provided with a rotation axis along the DU direction that is perpendicular to the DX direction, for linearly moving the jigs 15A and 16A so that the distance m between the jigs 15A and 14A can be changed, and a drive mechanism 28A provided with a rotation axis along the DY direction that is parallel to the rotation axis of the drive mechanism 27A for rotating the jig 16A. On the movable base 20B, a drive mechanism 27B provided with a rotation axis along the DV direction that is perpendicular to the DX direction, for linearly moving the jigs 15B and 16B so that the distance m between the jigs 15B and 14B can be changed, and a drive mechanism 28B arranged to oppose the drive mechanism 28A and provided with a rotation axis along the DZ direction that is parallel to the rotation axis of the drive mechanism 27B for rotating the jig 16B.

The drive mechanism 27A has a ball screw portion 29A provided with a rotation axis in the DU direction, a nut portion 30A threadably mounted on the ball screw portion 29A and slidable in the DU direction, a servomotor 31A for rotating the ball screw portion 29A, and a slide plate 32A fixed to the nut portion 30A and moved in the DU direction in response to the rotation of the ball screw portion 29A. The jig 15A is fixed to this slide plate 32A. A turning plate 34A provided with a cam follower 33A is axially supported by this slide plate 32A so that this turning plate 34A can turn. The jig 16A is fixed to this turning plate 34A. The drive mechanism 28A has a ball screw portion 35A provided with a rotation axis in the DY direction, a nut portion 36A threadably mounted on the ball screw portion 35A and slidable in the DY direction, a servomotor 37A for rotating the ball screw portion 35A, and a turning drive plate 38A fixed to the nut portion 36A and moved in the DY direction in response to the rotation of the ball screw portion 35A. The turning drive plate 38A has an engagement concave portion 39A that is engaged with the cam follower 33A.

The drive mechanism 27B has a ball screw portion 29B provided with a rotation axis in the DV direction that is perpendicular to the DX direction, a nut portion 30B threadably mounted on the ball screw portion 29B and slidable in the DV direction, a servomotor 31B for rotating the ball screw portion 29B, and a slide plate 32B fixed to the nut portion 30B and moved in the DV direction in response to the rotation of the ball screw portion 29B. The jig 15B is fixed to this slide plate 32B. A turning plate 34B provided with a cam follower 33B is axially supported by this slider plate 32B so that this turning plate 34B can turn. The jig 16B is fixed to this turning plate 34B. The drive mechanism 28B has a ball screw portion 35B provided with a rotation axis in the DZ direction, a nut portion 36B threadably mounted on the ball screw portion 35B and slidable in the DZ direction, a servomotor 37B for rotating the ball screw portion 35B, and a turning drive plate 38B fixed to the nut portion 36B and moved to the DZ direction in response to the rotation of the ball screw portion 35B. The turning drive plate 38B has an engagement concave portion 39B that is engaged with the cam follower 33B.

As mentioned above, the jigs 14A, 15A and 16A and the drive mechanisms 27A and 28A are mounted on the movable base 20A so as to rotate together with the rotation of this movable base 20A. Also, the jigs 14B, 15B and 16B and the drive mechanisms 27B and 28B are mounted on the movable base 20B so as to rotate together with the rotation of this movable base 20B.

Figure 7:
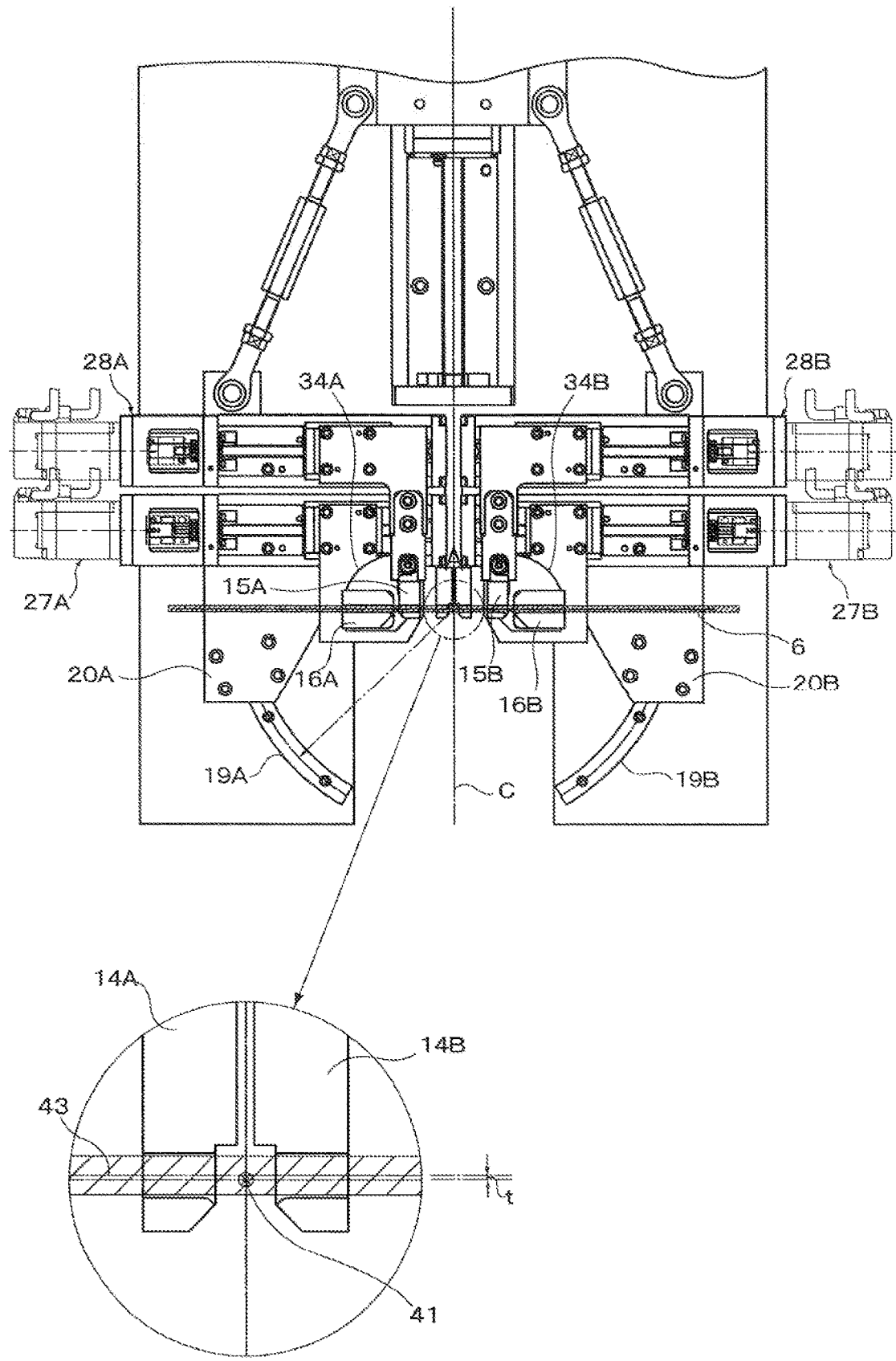
FIG. 7 is a plane view illustrating out of alignment of the turning center of the movable base from the center of the wire rod in the embodiment of FIG. 1.

As shown in FIG. 7, two fitting members (not shown) fitted with the guide rail 19A are attached to the lower surface of the movable base 20A at positions isolated to each other along the arc of this guide rail 19A so as to be slidable with respect to the guide rail 19A. Also, two fitting members (not shown) fitted with the guide rail 19B are attached to the lower surface of the movable base 20B at positions isolated to each other along the arc of this guide rail 19B so as to be slidable with respect to the guide rail 19B.

The center of the arc of the guide rails 19A and 19B, that is, the center of the rotation of the movable bases 20A and 20B, is as shown in FIG. 7 the turning center 41 that is a point located on the folding centerline C. In this embodiment, as aforementioned, the movable bases 20A and 20B turn by means of the configuration where the fitting members of the movable bases 20A and 20B fit and slide along the guide rails 19A and 19b with the rail shape mounted on the fixed base 18. However, in a modification, the movable bases 20A and 20B may turn by means of the configuration where guide rails with concave grooves are mounted on the fixed base 18 and convex parts formed on the movable bases 20A and 20B may engage to these concave grooves, respectively.

The turning center 41 of the movable bases 20A and 20B is set as shown in FIG. 7 at a position on the folding centerline C, deviated from the centerline 43 of the wire rod 6 by a small distance t (for example, t=0.5 mm) toward the inner side of bending (downward in FIG. 7). When the wire rod 6 is bent to the edgewise direction, the expansion of the thickness occurs due to compression in the inner side of the bending and the contraction of the thickness occurs due to pulling in the outer side of the bending. Since this change of the thickness is bigger in the inner side of the bending than the outer side of the bending, the turning center 41 of the movable bases 20A and 20B is deviated toward the inner side of bending as mentioned above so as to minimize the expansion and contraction of the wire rod 6 by the bending.

Hereinafter, bending operations of the first bending section 4 of this embodiment will be described with reference to FIG. 6 to FIG. 9.

When the first bending section 4 is in initial state, the concave grooves of the jigs 14A, 14B, 15A, 15B, 16A and 16B are aligned on a straight line with each other as shown in FIG. 6 and FIG. 7, the linear wire rod 6 is inserted into the concave grooves of these jigs and supported by these jigs in the bridging state.

Figure 8:
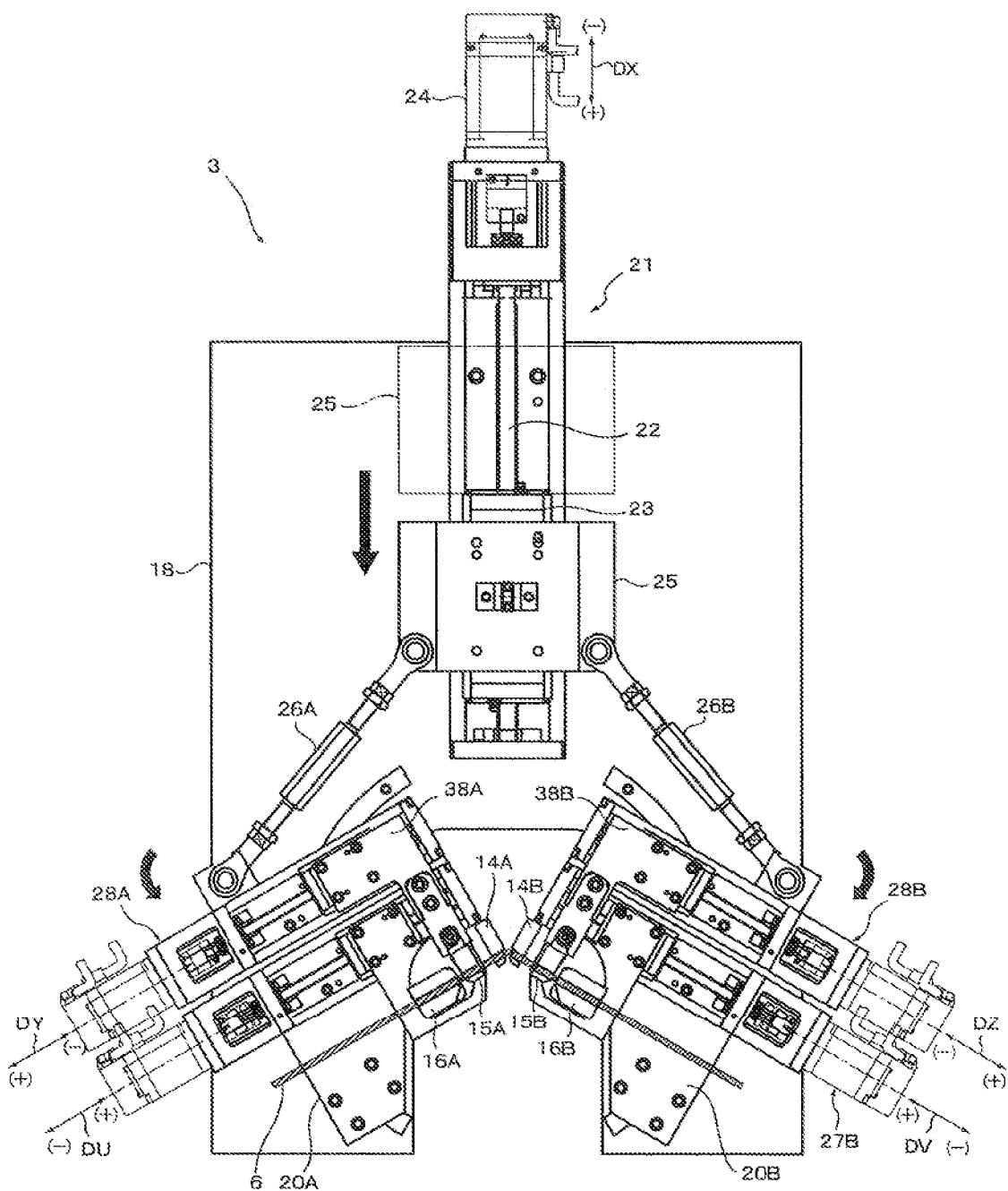
FIG. 8 is a plane view illustrating a halfway state of the first bending operation of the first bending section in the embodiment of FIG. 1.

Then the drive mechanism 21 operates from this initial state so that the slider 25 moves toward the DX(+) direction and thus the movable bases 20A and 20B are driven through the arms 26A and 26B, respectively, to rotate around the turning center 41. Since the jigs 14A, 15A and 16A are fixed to the movable base 20A and the jigs 14B, 15B and 16B are fixed to the movable base 20B, the jigs 14A, 15A and 16A and the jigs 14B, 15B and 16B rotate together with the rotation of the movable bases 20A and 20B, respectively. Thus the wire rod 6 is bent at its part on the folding centerline C until the center angle of the linking portion 17a becomes an angle θ1 that is the set angle based on the control data. The state after this first bending operation by this rotation of the jigs 14A, 15A and 16A and the jigs 14B, 15B and 16B is shown in FIG. 8.

Figure 9:
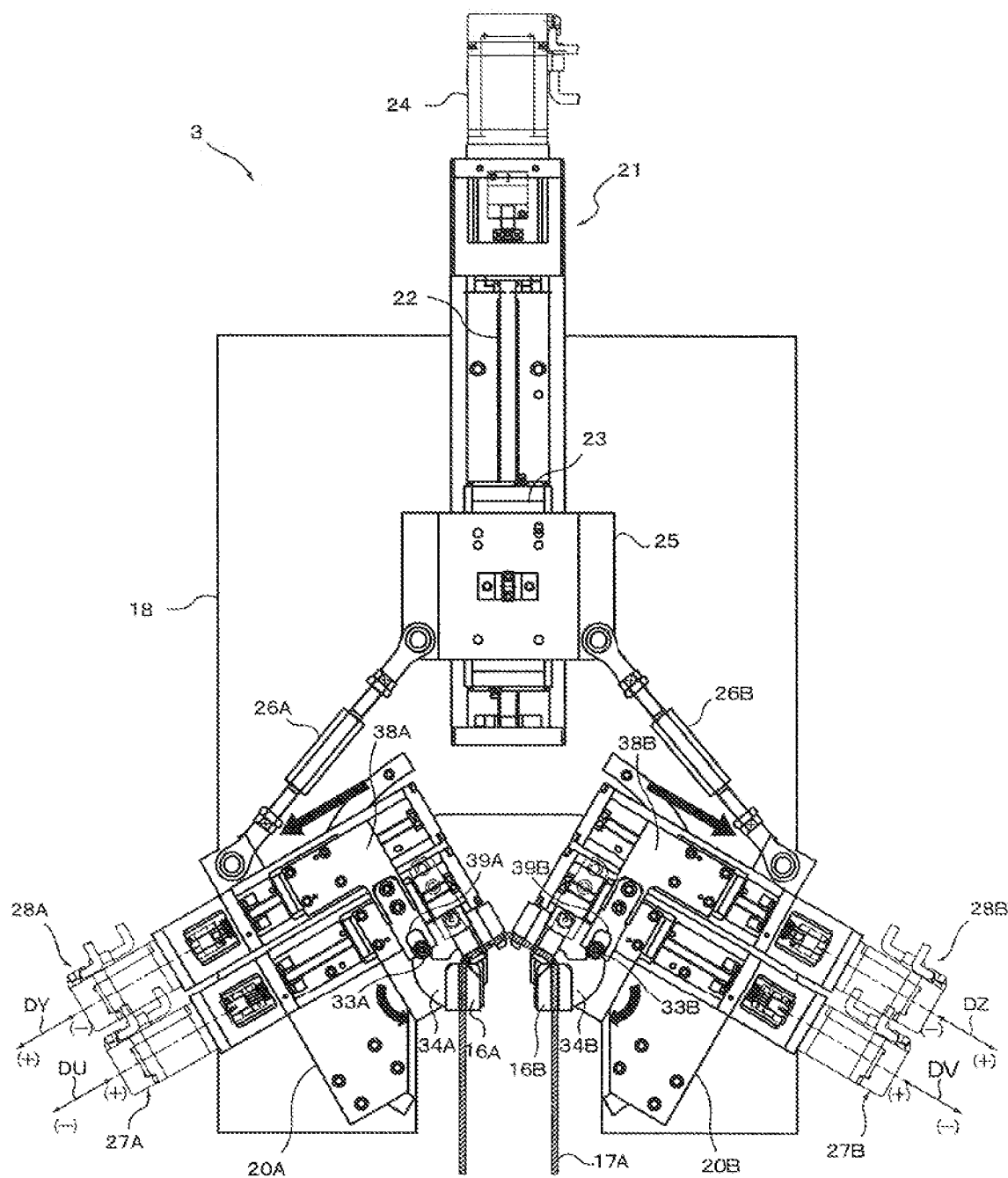
FIG. 9 is a plane view illustrating a complete state of the first bending operation of the first bending section in the embodiment of FIG. 1.

When the central angle becomes the angle θ1, the drive mechanisms 28A and 28B operate so that the turning drive plate 38A moves toward the DY(+) direction (FIG. 6) and the turning drive plate 38B moves toward the DZ(+) direction. Thus the engagement concave portions 39A and 39B push the cam followers 33A and 33B, respectively, and thereby the turning plates 34A and 34B turn around their turning centers 44 (FIG. 10) as shown in detail in FIG. 10. The jigs 16A and 16B or the outermost jigs 16A and 16B rotate by this turning of the turning plates 34A and 34B, until the shoulder angle of the wire rod 6 becomes an angle θ2 that is the set angle based on the control data and thus U-shaped bending completes. The state after this second bending operation is shown in FIG. 9.

Figure 10:
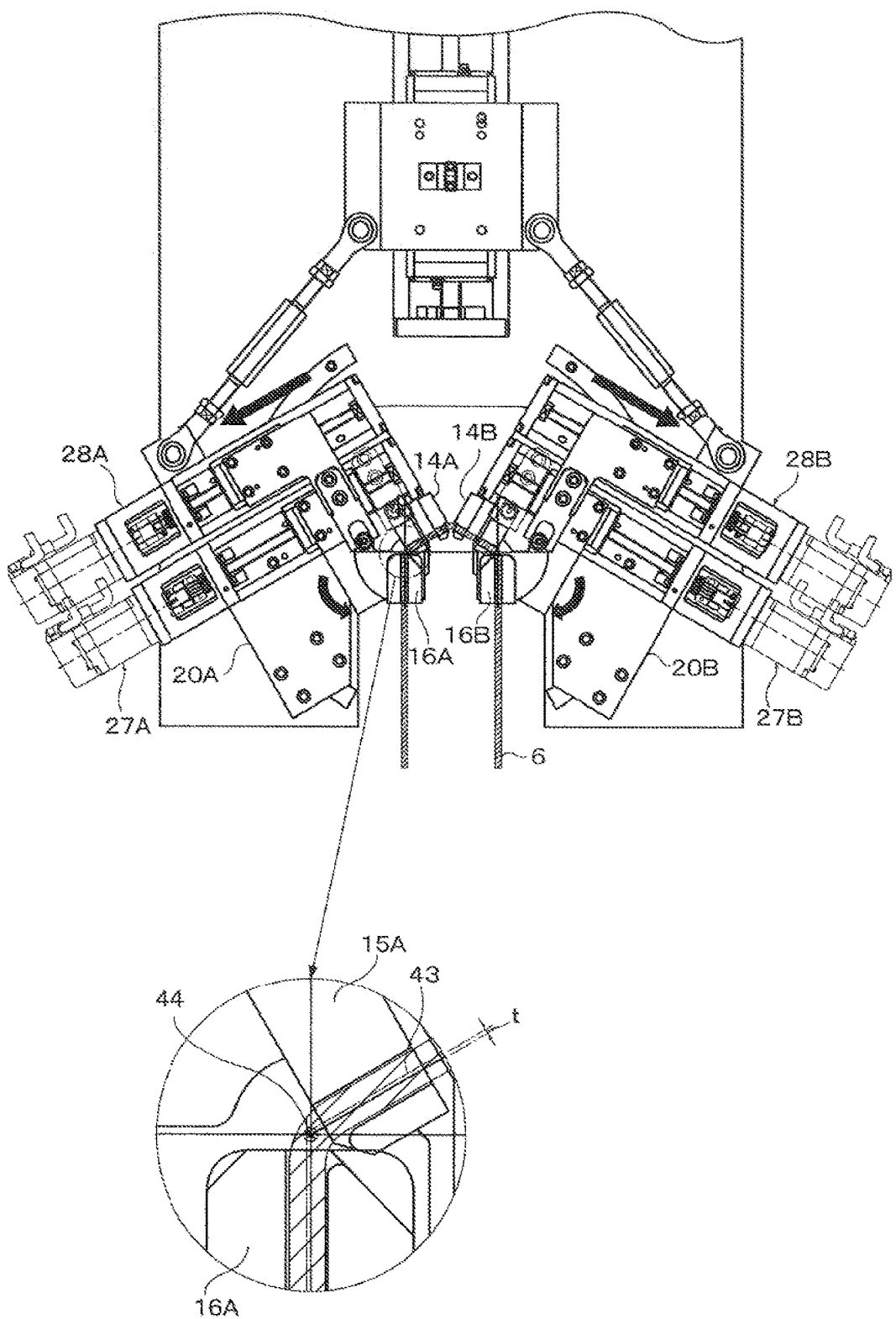
FIG. 10 is a plane view illustrating out of alignment of the turning center of a turning plate for turning an outermost jig from the center of the wire rod in the embodiment of FIG. 1.

The turning center 44 of the turning plates 34A and 34B namely the center of the rotation (turning) of the jigs 16A and 16B is set at a position as shown in FIG. 10 deviated from the centerline 43 of the wire rod 6 by a small distance t (for example, t=0.5 mm) toward the inner side of bending. When the wire rod 6 is bent to the edgewise direction, the expansion of the thickness occurs due to compression in the inner side of the bending and the contraction of the thickness occurs due to pulling in the outer side of the bending. Since this change of the thickness is bigger in the inner side of the bending than the outer side of the bending, the turning center 44 of the turning plates 34A and 34B namely the center of the rotation (turning) of the jigs 16A and 16B is set to deviate toward the inner side of bending so as to minimize the expansion and contraction of the wire rod 6 by the bending.

As aforementioned, the length of each side of the linking portion 17a of the first bent body 17A can be adjusted by changing the distance m between the jigs 14A and 15A and the distance m between the jigs 14B and 15B. The width (coil width) of the U-shaped first bent body 17A is adjusted by changing the length of each side of the linking portion 17a and thus a satisfied coil segment can be fabricated. Namely, a first bent body with a small coil width or a first bent body with a large coil width can be fabricated. The changes in the distances m are accomplished by the drive mechanisms 27A and 27B, respectively. That is, when the drive mechanisms 27A and 27B operate, the slide plate 32A to which the jigs 15A and 16A (the outermost jig 16A and the jig 15A next to the outermost jig 16A) are attached linearly moves in the DU direction and the slide plate 32B to which the jigs 15B and 16B are attached linearly moves in the DV direction resulting the distances m to change. Since the cam followers 33A and 33B are fixed as aforementioned to the slide plates 32A and 32B, respectively, and also these cam followers 33A and 33B engage with the engagement concave portions 39A and 39B of the turning drive plates 38A and 38B, respectively, the drive mechanisms 27A and 27B operate so that the turning drive plates 38A and 38B move in synchronization with the slide plates 32A and 32B. In the following description, these synchronizing movements are abbreviated as movement of only the slide plates 32A and 32B.

The setting of the distance m may be executed just before bending, but it is possible to perform the setting after the bending is started until the jigs 16A and 16B rotate. These slide plates 32A and 32B are located at their home positions in the initial state just before the bending starts, and then move from the home positions in response to given control data.

Figure 11:
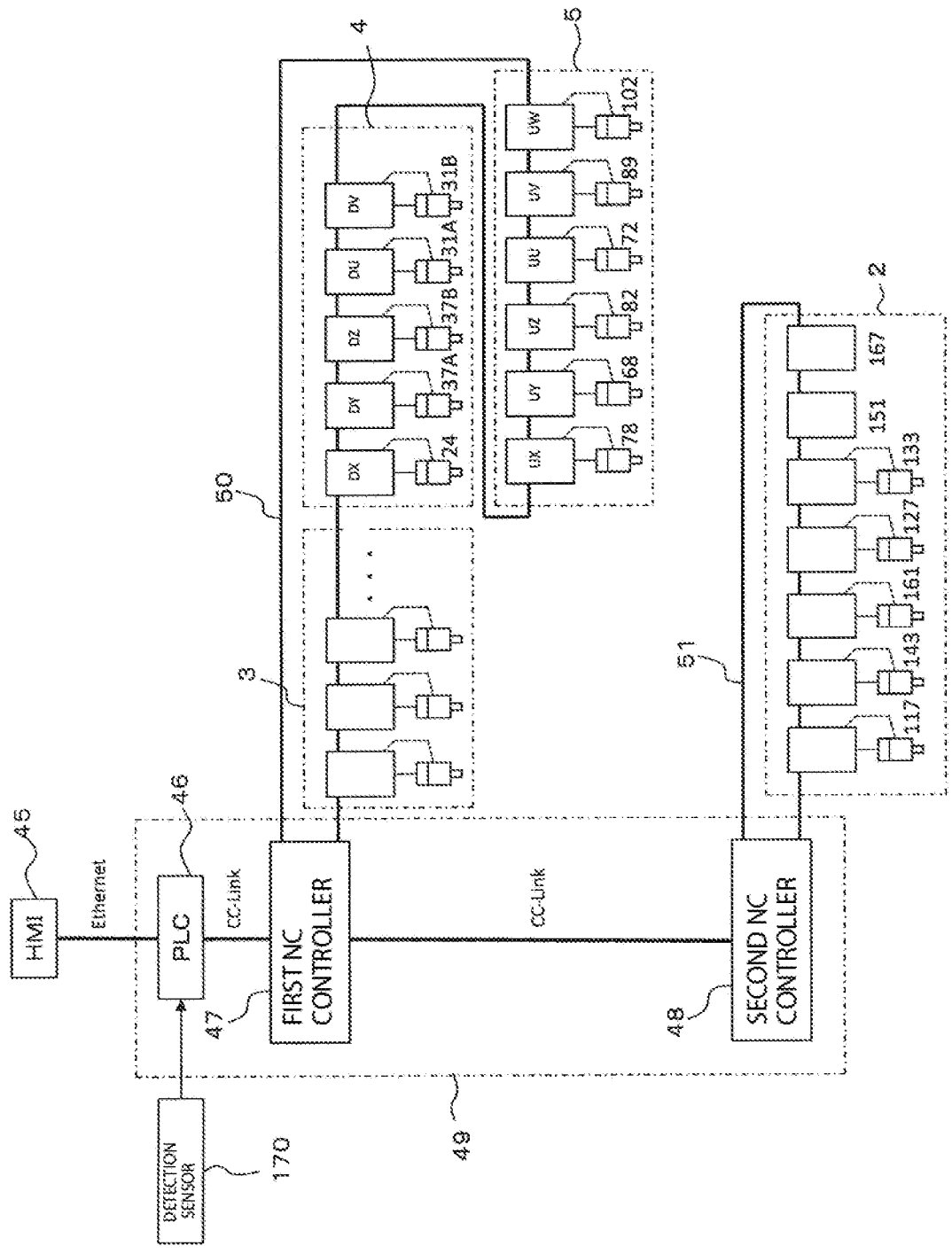
FIG. 11 is a block diagram schematically illustrating an electrical configuration of the coil segment shaping section in the embodiment of FIG. 1.
Figure 12:
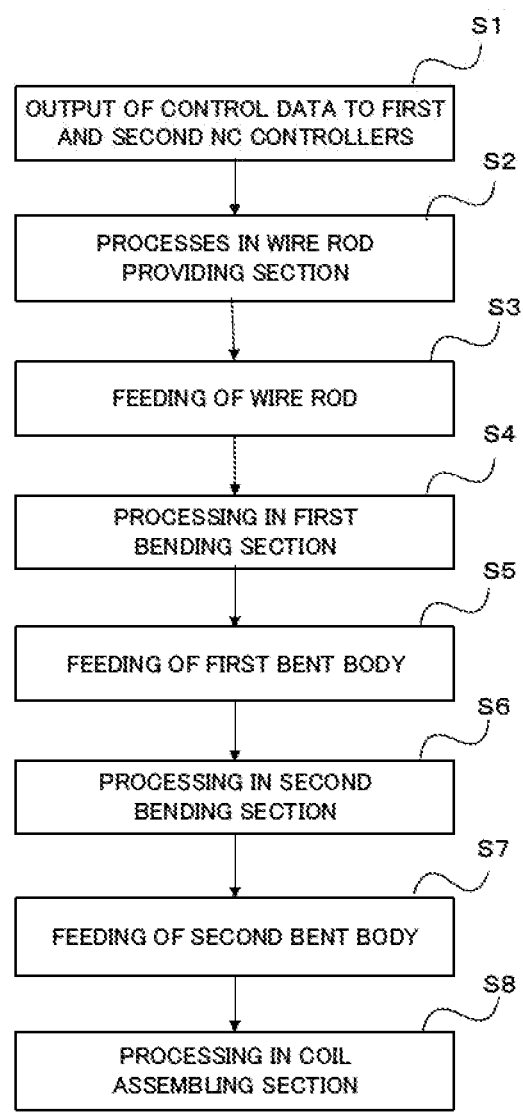
FIG. 12 is a flow chart schematically illustrating whole control processes of the coil segment shaping section in the embodiment of FIG. 1.

FIG. 11 illustrates an electrical configuration of the coil segment shaping section in this embodiment, and FIG. 12 illustrates whole control processes of this coil segment shaping section.

As shown in FIG. 11, the apparatus has a human-machine interface (HMI) 45 including an input and display means such as a touch panel, for inputting control data for shaping the wire rod, for instructing reading of control data stored in a memory, for instructing modification of the control data stored in the memory, for instructing start of the NC control, or for instructing end of the NC control for example. The HMI 45 is connected to a programmable logic controller (PLC) 46 through Ethernet (registered trademark). A first NC controller 47 and a second NC controller 48 are connected to the PLC 46 by means of a high-speed network such as CC-Link. The PLC 46 is provided with a memory for storing at least control data and control program for shaping coil segments with various kinds of shape, a central processing unit (CPU) and an input-output interface. The CPU transfers control data indicated by the program to the first NC controller 47 and the second NC controller 48. The first NC controller 47 expands control data of a length of the wire rod, a center angle θ1 of the coil segment, a pitch, and a shoulder angle θ2 of the coil segment, and data for executing multiaxial control with respect to the first bending section 4. The first NC controller 47 also expands control data of bending and pressing, and data for executing multiaxial control with respect to the second bending section 5. The second NC controller 48 expands control data of coil arrangement or else in the coil assembling section 2. A control unit 49 for controlling the wire rod providing section 3, the first bending section 4, the second bending section 5 and the coil assembling section 2 is configured by the PLC 46, the first NC controller 47 and the second NC controller 48.

The first NC controller 47 is connected to the wire rod providing section 3, the first bending section 4 and the second bending section 5 through an optical communication cable 50 used for establishing servo-link. In the wire rod providing section 3, the first bending section 4 and the second bending section 5, a plurality of amplification and drive circuits are connected to the optical communication cable 50, and a plurality of servomotors are connected to the plurality of amplification and drive circuits, respectively. Signal lines from encoders mechanically coupled with the plurality of servomotors are connected to the plurality of amplification and drive circuits, respectively.

In this embodiment, as aforementioned, the first bending section 4 adopts the 5-axes control configuration, and therefore the amplification and drive circuit of the servomotor 24 for DX direction drive, the amplification and drive circuit of the servomotor 37A for DY direction drive, the amplification and drive circuit of the servomotor 37B for DZ direction drive, the amplification and drive circuit of the servomotor 31A for DU direction drive, and the amplification and drive circuit of the servomotor 31B for DV direction drive are connected to the optical communication cable 50.

On the other hands, the second bending section 5 adopts the 6-axes control configuration, and therefore the amplification and drive circuit of the servomotor 78 for UX direction drive, the amplification and drive circuit of the servomotor 68 for UY direction drive, the amplification and drive circuit of the servomotor 82 for UZ direction drive, the amplification and drive circuit of the servomotor 72 for UU direction drive, the amplification and drive circuit of the servomotor 89 for UV direction drive, and the amplification and drive circuit of the servomotor 102 for UW direction drive are connected to the optical communication cable 50.

The second NC controller 48 is connected to the coil assembling section 2 through an optical communication cable 51 used for establishing servo-link. In the coil assembling section 2, a plurality of amplification and drive circuits are connected to the optical communication cable 51, and a plurality of servomotors are connected to the plurality of amplification and drive circuits, respectively. Signal lines from encoders mechanically coupled with the plurality of servomotors are connected to the plurality of amplification and drive circuits, respectively.

The PLC 46, the first NC controller 47 and the second NC controller 48 control the whole operations of the coil segment shaping section depending on steps shown in FIG. 12.

First, the PLC 46 reads out from the memory control data for first bending operations, that is series of control data for defining a length, a center angle θ1, a length of each side of the linking portion 17a and a shoulder angle θ2 for example, with respect to a coil segment to be shaped and assembled next (hereinafter called as a coil segment to be formed) among a plurality of coil segments of the coil to be fabricated, and outputs the control data to the first NC controller 47, and also reads out from the memory control data for second bending operations, that is series of control data for defining moving amount of each press jig with respect to the forming of the curved shape and moving amount of each press jig with respect to the forming of step part (Z bending) for example, with respect to the coil segment to be formed, and outputs the control data to the first NC controller 47. Further, the PLC 46 reads out from the memory control data for coil assembling operations, that is number and layer number of coil segments applied to a segment arrangement drum 105 (described later) in the coil assembling section 2, a rotating amount of index, a rotating amount of arms 139A and 139B in the separation preventing means 106, a protruded amount of the blade 108 and a moving amount of the press ring 135 for example, with respect to the coil segment to be formed, and outputs the control data to the second NC controller 48 (Step S1).

The first NC controller 47 thereby expands the received control data and performs NC control of a drive mechanism with the designated address. The NC control of stripping or peeling of the insulation layer in the both peeling end areas of the wire rod by the peeling section 10 and cutting of the wire rod into a predetermined length by the cutting section 11 are performed at first (Step S2). More concretely, a control data with respect to the length of the wire rod 6 (wire rod for the coil segment to be formed) is expanded and output to the drive mechanism in the peeling section 10 for driving the corresponding servomotor so that stripping of the insulation layer in the both peeling end areas of the wire rod is performed. Also, a control data with respect to the length of the wire rod 6 (wire rod for the coil segment to be formed) is expanded and output to the drive mechanism in the cutting section 11 for driving the corresponding servomotor so that the wire rod is cut to a predetermined length.

Then, the first NC controller 47 performs NC control for feeding or transporting the cut wire rod 6 (wire rod for the coil segment to be formed) by a transporting mechanism not shown (Step S3). That is, the first NC controller 47 expands the control data for feeding or transporting and outputs the expanded control data to a drive mechanism in the transporting mechanism to drive the target servomotor so that the linear wire rod 6 cut into the predetermined length is fed or transported to the jigs 14A, 14B, 15A, 15B, 16A and 16B which were set in an initial state and that the wire rod 6 is inserted into the concave grooves 14A-1, 14B-1, 15A-1, 15B-1, 16A-1 and 16B-1 of these jigs.

Then, the first NC controller 47 performs first bending operations (described later) with respect to the coil segment to be formed (Step S4).

After the first bending operations, the first NC controller 47 feeds the first bent body of the coil segment to be formed to the second bending section 5 (Step S5), and then the first NC controller 47 performs second bending operations (described later) with respect to the coil segment to be formed (Step S6).

After the second bending operations, the first NC controller 47 feeds the second bent body of the coil segment to be formed to the coil assembling section 2 (Step S7).

Then, the second NC controller 48 performs coil assembling operations (described later) with respect to the second bent body of the coil segment to be formed (Step S8). Since, based on the control data set depending on the coil to be fabricated, processes of shaping of each coil segment to be formed and assembling of the shaped coil segments are consistently performed for each coil segment to be formed, working efficiency of the whole works for fabricating the coil can be extremely improved. Also, since it is not necessary to form previously, to stock many coil segments with various kinds of shape and to select a necessary coil segment from the stocked coil segments, the management of the coil segments can become extremely easy.

Figure 13:
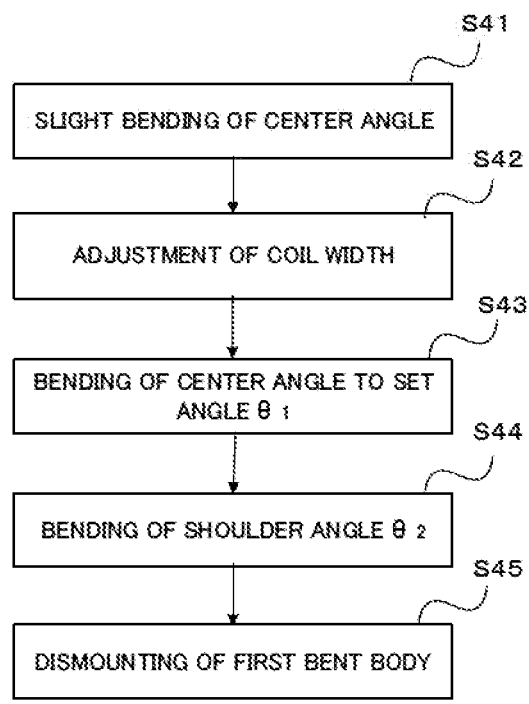
FIG. 13 is a flowchart schematically illustrating control processes of bending operations in the embodiment of FIG. 1.

Hereinafter, the first bending operation at the aforementioned Step 4 will be described in detail based on FIG. 13.

First, the first NC controller 47 performs NC control for starting slight bending of the center angle of the wire rod 6 by the drive mechanism 21 (Step S41). That is, the first NC controller 47 expands the control data for the slight bending of the central angle and outputs the expanded control data to the drive mechanism 21 to drive the target servomotor so that the folding operation with respect to the folding centerline of the wire rod 6 is started. More concretely, the servomotor of the drive mechanism 21 operates in response to the control data to turn the movable bases 20A and 20B and thus to slightly rotate or turn the jigs 14A, 14B, 15A, 15B, 16A and 16B mounted on these movable bases around 50% of the angle θ1 for example, so that the slight bending of the center angle of the wire rod 6 is performed.

The first NC controller 47 performs NC control for adjusting the coil width by the drive mechanisms 27A and 27B slightly after the start of the operation of the drive mechanism 21, that is, when the slider 25 moves by 30 mm for example (Step S42). Namely, the first NC controller 47 expands the control data for coil-width adjustment and outputs the expanded control data to the drive mechanisms 27A and 27B to drive the target servomotor so that the slide plates 32A and 32B move linearly. Thus, the slide plates 32A and 32B move from their home positions by movement amounts for obtaining a distance m that corresponds to the given control data for adjusting the length of each side of the linking portion (coil width).

Then, the first NC controller 47 performs NC control for bending the central angle of the wire rod 6 to the set angle $θ1$ by the drive mechanism 21 (Step S43). Namely, the first NC controller 47 expands the control data for bending the central angle to the set angle $θ1$ and outputs the expanded control data to the drive mechanism 21 to drive the target servomotor so that the central angle of the wire rod 6 is bent to the set angle $θ1$. More concretely, in response to the control data, the servomotor of the drive mechanism 21 operates to turn the movable bases 20A and 20B and to rotate (turn) the jigs 14A, 14B, 15A, 15B, 16A and 16B thereon so that the center angle of the wire rod 6 is bent to the set angle $θ1$.

When the bending of the center angle of the wire rod 6 to the set angle $θ1$ is finished, the first NC controller 47 performs NC control for bending the shoulder angle of the wire rod 6 by the drive mechanisms 28A and 28B (Step S44). Namely, the first NC controller 47 expands the control data for bending of the shoulder angle and outputs the expanded control data to the drive mechanisms 28A and 28B to drive the target servomotor so that the shoulder angle of the wire rod 6 is bent. More concretely, in response to the control data, the servomotors of the drive mechanisms 28A and 28B operate to move the turning drive plates 38A and 38B by the predetermined distance in DY(+) direction and the DZ (+) direction, respectively, and to turn the turning plates 34A and 34B around their turning centers 44 so that the jigs 16A and 16B rotate (turn) for bending the shoulder angles to the set angle $θ2$.

The center angle $θ1$ and/or the shoulder angle $θ2$ are set from a point of view to bend the wire rod 6 harder in consideration of the spring-back compensation. In such bending operations, so-called spring-back phenomenon in which the bent amount is slightly restored by the elasticity of the materials when the pressing force is released after having bent may occur. The quantity of return by this spring-back is different due to parameters such as materials of the wire rod 6, a width d2 of the flatwise direction and a width w2 of the edgewise direction. According to the conventional bending method of bending the wire rod by using the press die, even if the forming surface of the press die was designed by considering the influence of the spring-back, undesirable spring-back influence was sometimes remained in the bent wire rod and thus the press die had to be redesigned and made again. Such redesign and remake invited forming cost of the press die, shaping cost of the coil segment and also manufacturing cost of the electrical rotating machine to increase. In case that the remake of the press die became multiple times, the manufacturing cost was extremely increased. Whereas according to this embodiment, because such spring-back influence can be cancelled by correcting the control data, no remake of the press die is necessary at all. In modifications of the present invention, control data for cancelling the spring-back influence may be preliminarily obtained by an experiment using the aforementioned parameters and a control table used in the NC control for bending the wire rod 6 may be made in accordance with the obtained control data, or shaping conditions for cancelling the spring-back influence may be automatically set depending on a kind of the input wire rod 6.

When the bending of the shoulder angle to the angle $θ2$ is finished, the first NC controller 47 performs NC control for dismounting and feeding or transferring the first bent body 17A that is a first bending-finished wire rod by means of the feed mechanism 12 shown in FIG. 1 (Step S45). Namely, the first NC controller 47 expands the control data for dismounting and feeding or transferring the first bent body 17A and outputs the expanded control data to the drive mechanism 21 to drive the target servomotor so that the first bent body 17A is gripped by a pair of chucking portions that is air cylinders, dismounted from the jigs 14A, 14B, 15A, 15B, 16A and 16B (picked up from the concave grooves), and fed or transferred to the second bending section 5. Thereafter, the first NC controller 47 resets the drive mechanisms in the first bending section 4 to prepare for first bending operation of the next coil segment.

With respect to NC control of the second bending section 5 by means of the first NC controller 47 and NC control of the coil assembling section 2 by means of the second NC controller 48, explanations will be described later.

Hereinafter, configurations and bending operations of the second bending section 5 will be described.

Figure 14:
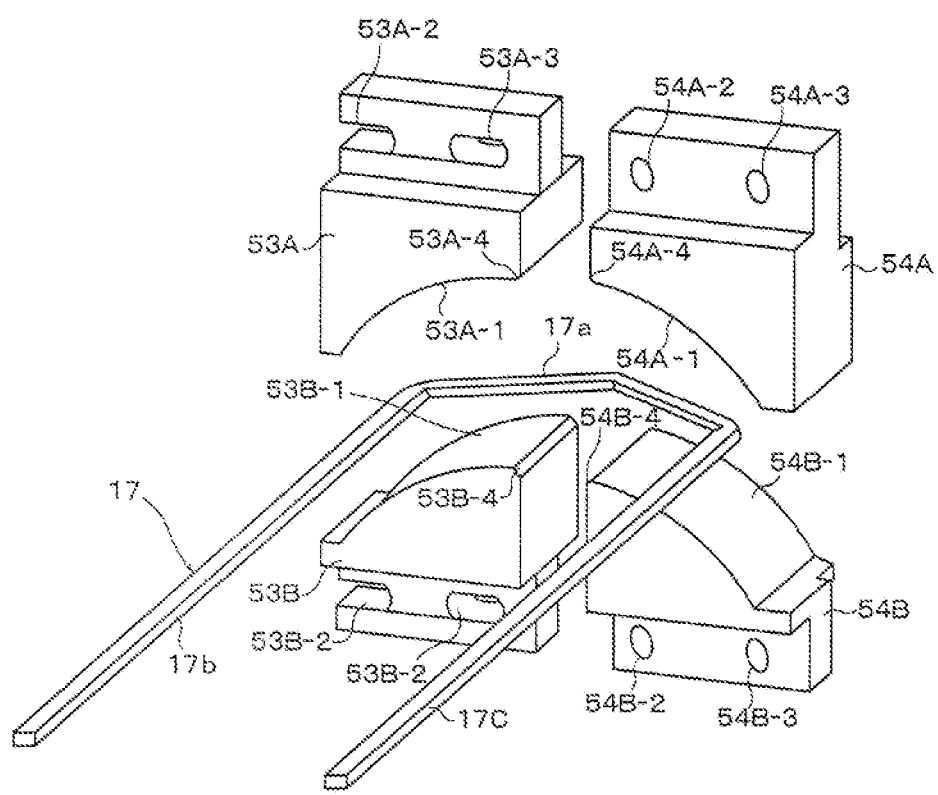
FIG. 14 is an exploded perspective view schematically illustrating a constitution of press jigs in a second bending section of the coil segment shaping section in the embodiment of FIG. 1 and a position of a first bent body that is bent by these press jigs.

The second bending section 5 has as shown in FIG. 14 a block-shaped press jig 53A provided with on its lower surface a press surface 53A-1 curved in concave, a block-shaped press jig 53B provided with on its upper surface a press surface 53B-1 curved in convex, which is corresponding to the press surface 53A-1, a block-shaped press jig 54A provided with on its lower surface a press surface 54A-1 curved in concave, and a block-shaped press jig 54B provided with on its upper surface a press surface 54B-1 curved in convex, which is corresponding to the press surface 54A-1. The pair of press jigs 53A and 53B are located to oppose to each other in a direction intersecting with (for example a direction perpendicular to) a plane in which the first bent body 17 is held (the horizontal plane in this embodiment), and moved along the intersecting direction so as to close to each other. The pair of press jigs 54A and 54B are also located to oppose to each other in a direction intersecting with (for example a direction perpendicular to) a plane in which the first bent body 17 is held (the horizontal plane in this embodiment), and also moved along the intersecting direction so as to close to each other. The plane in which the first bent body 17 is held is a plane formed by the bending operation performed in the first bending section 3. That is, the first bent body 17 is transferred to the second bending section 5 by means of the feed mechanism 12 in a posture bent in the first bending section 4 and then bending operation of this first bent body 17 is executed in the second bending section 5 with keeping this posture.

The press jig 53A located in FIG. 14 on the upper left has bolt-insertion holes 53A-2 and 53A-3 for fixing it to a support member as will be mentioned below, also the press jig 54A located in FIG. 14 on the upper right has similarly bolt-insertion holes 54A-2 and 54A-3. The bolt-insertion holes 53A-2 and 53A-3 have an elongated slot shape to adjust the position of the press jig 53A with respect to the press jig 54A, in other words, to absorb an error occurred when a single press surface curved in concave is formed by joining the press jigs 53A and 54A.

The press jig 53B located in FIG. 14 on the lower left has bolt-insertion holes 53B-2 and 53B-3 for fixing it to a support member as will be mentioned below, also the press jig 54B located in FIG. 14 on the lower right has similarly bolt-insertion holes 54B-2 and 54B-3. The bolt-insertion holes 53B-2 and 53B-3 have an elongated slot shape to adjust the position of the press jig 53B with respect to the press jig 54B, in other words, to absorb an error occurred when a single press surface curved in convex is formed by joining the press jigs 53B and 54B.

As aforementioned, the first bent body 17 bent in U-shape in the first bending section 4 consists of the linking portion 17a with an angle shape and the slot insertion portions 17b and 17c coupled to each other through this linking portion 17a and elongated in parallel with each other. In the second bending section 5, at first, the linking portion 17a of the first bending body 17 is bent in the direction intersecting with (for example a direction perpendicular to) a plane in which the first bent body 17 is held (the horizontal plane in this embodiment) to form a curved shape. More concretely, the press jigs 53A and 54A are controlled to be positioned based on the control data of the coil segment to be formed, namely the press jigs 53A and 54A are driven to move into an adjacent state in proximity to each other so that their press surfaces 53A-1 and 54A-1 forma single surface curved in concave. Also, the press jigs 53B and 54B are controlled to be positioned based on the control data of the coil segment to be formed, namely the press jigs 53B and 54B are driven to move into an adjacent state in proximity to each other so that their press surfaces 53B-1 and 54B-1 form a single surface curved in convex.

Since both pairs of or one pair of the press jigs 53A and 54A and the press jigs 53B and 54B in this state are moved in the up-and-down direction in a plane (the vertical plane) perpendicular to a plane of the first bent body 17 (the horizontal plane), the linking portion 17a of the first bent body 17 is pressed to form the curved shape. Corner edges 53A-4, 53B-4, 54A-4 and 54B-4 of the respective press jigs 53A, 53B, 54A and 54B that will be in contact with the surface of the linking portion 17a during this pressing operation are chamfered respectively so as to not hurt the insulating layer of the linking portion 17a.

Because the press jigs 53A and 54A are not configured as an integral block but configured as blocks divided with each other, it is possible to continuously perform the bending operation process of forming the curve-shaped linking portion 17a and the bending operation process of forming a crank-shaped step part at the tip of the linking portion 17a in this second bending section 5. That is, two kinds of bending operation processes consisting of the curved shape bending process and the crank-shaped step part forming process in the plane (the vertical plane) perpendicular to the plane of the first bent body 17 (the horizontal plane) can be performed without changing the forming die (press jigs). This is similar about the press jigs 53B and 54B. Also, control conditions in two kinds of the bending operation processes can be changed by modifying the moving distances of these press jigs 53A, 53B, 54A and 54B, respectively, and thereby it is possible to form various kinds of coil segments by using the same press jigs.

Figure 15:
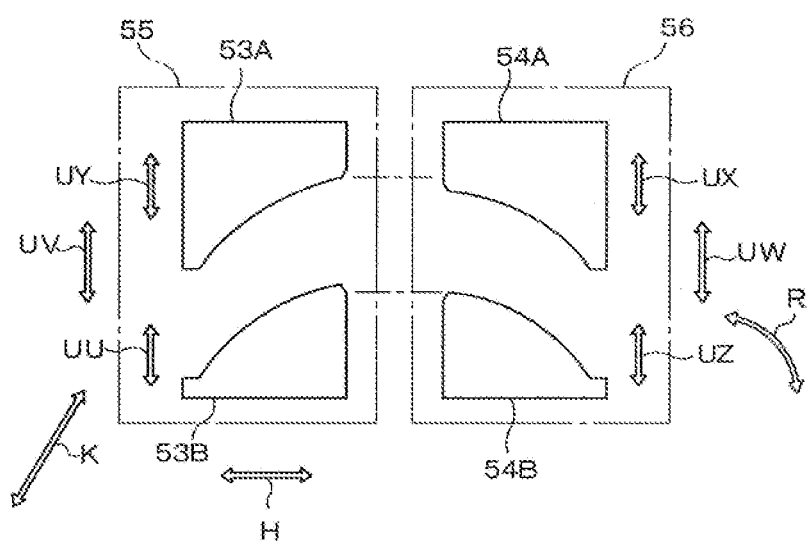
FIG. 15 is views illustrating moving directions of the respective press jigs in the second bending section in the embodiment of FIG. 1.

FIG. 15 shows moving directions of the press jigs of the second bending section 5. As shown in the figure, a thickness in the up-and-down direction of the central axis side (the inner side) of the press jig 54A is set larger than a thickness in the up-and-down direction of the central axis side (the inner side) of the press 53A, and a thickness in the up-and-down direction of the central axis side (the inner side) of the press jig 53B is set larger than a thickness in the up-and-down direction of the central axis side (the inner side) of the press 54B. These press jigs 53A, 54A, 53B and 54B are individually movable by the drive mechanisms described later in the upper and lower up-and-down direction (UY direction, UX direction, UU direction and UZ direction) in the vertical plane. By appropriately controlling the moving direction and the moving speed of these press jigs 53A, 54A, 53B and 54B, the press jigs 53A and 53B can be moved in the up-and-down direction (the UV directions) as a single press jig unit 55, and similarly the press jigs 54A and 54B can be moved in the up-and-down direction (the UW directions) as a single press jig unit 56. The press jig unit 55 can be moved in a horizontal direction (the H direction), and therefore this press jig unit 55 can be moved in an oblique direction (the K direction) by simultaneously performing the movement in the up-and-down direction and the movement in the horizontal direction. The press jig unit 56 can perform not only the movement in the up-and-down direction (the UW directions) but also the rotation (turn) in R direction in the vertical plane. This rotation of the press jig unit 56 enables variable adjustment of a curvature factor of the curved surface of the linking portion 17a of the first bent body 17 when forming the curved surface or the curved shape, and also enables formation of the curved surfaces in the linking portions 17a of the first bent bodies 17 even if the width between the slot insertion portions 17b and 17c of theses first bent bodies 17 differ with each other. That is, according to such configurations of the press jig units, the second bending of the coil segments with various kinds of shapes is enabled. The movement of the up-and-down direction of each of the press jigs 53A, 53B, 54A and 54B, the movement in the horizontal direction and the oblique directions of the press jig unit 55, and the movement of the rotation of the press jig unit 56 are numerically controlled (NC controlled) based on the set moving amount data (control data), respectively. It should be noted that, in FIGS. 15, 16 and 17, fixing parts of the press jigs 53A, 53B, 54A and 54B to the support member are omitted from illustration.

Hereinafter, referring to FIG. 16, the bending operations in the second bending section 5 will be schematically described. In this drawing, as the first bent body 17, only the linking portion 17a that is the processing object is shown by hatching.

Figure 16:
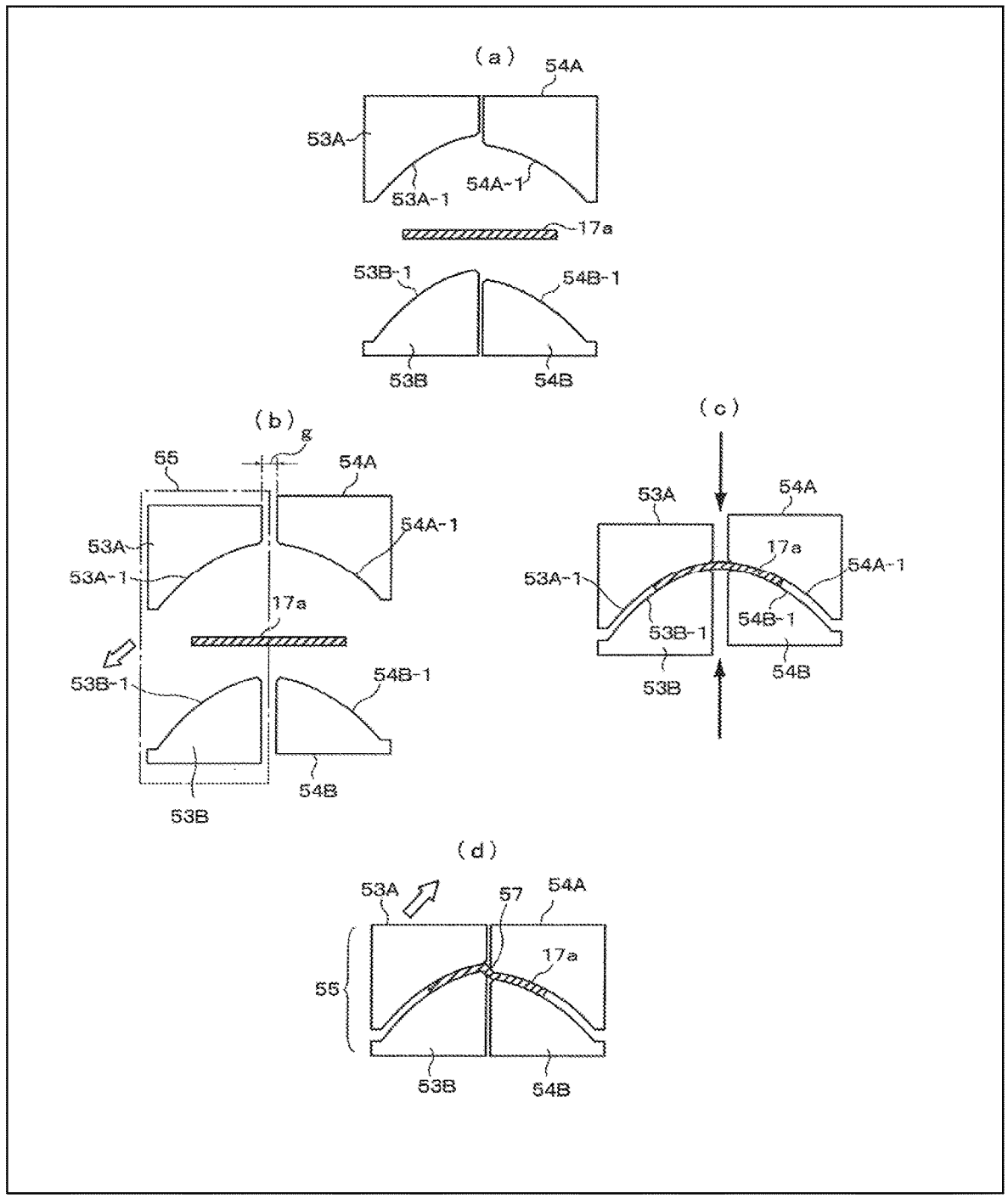
FIG. 16 is views illustrating curved shape bending processes (curved shape forming processes) and stepped shape creating processes (crank-shaped step part forming processes) of a linking portion in the second bending section in the embodiment of FIG. 1.

FIG. 16 (a) shows the conditions where the press jigs 53A, 53B, 54A and 54B are in initial position (home position). That is, this drawing shows an initial state where the first bent body 17 bent by the first bending section 4 was transferred to the second bending section 5 by the feed mechanism 12 and the free end portions of the pair of slot insertion portions 17b and 17c of the first bent body 17 were held by the hold member 13, and then the feed mechanism 12 was backed away from the first bent body 17 so that bending operations of this first bent body 17 in the second bending section 5 can be started. In this home position, the adjacent press jigs 53A and 54A in proximity to each other are positioned so that their upper end surfaces form the same plane and the adjacent press jigs 53B and 54B in proximity to each other are positioned so that their lower end surfaces form the same plane. In this position, also, the press surfaces 53A-1 and 54A-1 of the press jigs 53A and 54A have a step between them, and the press surfaces 53B-1 and 54B-1 of the press jigs 53B and 54B have a step between them.

From the home position, as shown in FIG. 16 (b), the press jig unit 55 consisting of the press jigs 53A and 53B is integrally moved to the left oblique lower direction. Thus, a gap g is formed between the press jig 53A and the press jig 54A and also the press surfaces 53A-1 and 54A-1 of the press jigs 53A and 54A form a curved concave smooth surface with no step there between. In addition, the press surfaces 53B-1 and 54B-1 of the press jigs 53B and 54B form a curved concave smooth surface with no step there between.

From this state, a press operation is started. Namely, at first, the pair of press jigs 53B and 54B are moved upward to abut to the lower surface of the linking portion 17a, and then the pair of the press jigs 53A and 54A are moved downward with keeping the state of the pair of press jigs 53B and 54B as shown in FIG. 16 (c). In other words, the linking portion 17a is pinched between the curved concave surface formed by the press surfaces 53A-1 and 54A-1 of the press jigs 53A and 54A and the curved convex surface formed by the press surfaces 53B-1 and 54B-1 of the press jigs 53B and 54B, and pressed by these curved concave surface and curved convex surface so as to bend or curve the linking portion 17a in a direction perpendicular to the horizontal plane of the linking portion 17a. When the press operation is performed in some extent, namely when no position deviation of the first bent body 17 may be occurred, holding or chucking of the first bent body 17 by the hold member 13 (chucking of the air cylinders) is cancelled. It should be noted that the movements of the press jigs during this press operation are not limited to the above-mentioned movement but various kinds of movements may be adopted as far as no position deviation of the first bent body 17 occurs. When the above-mentioned press operation is completed, the process of forming the curved shape in the linking portion 17a that is bending process of the linking portion 17a is finished.

After the process of forming the curved shape in the linking portion 17a is finished, while the linking portion 17a is pinched between the press surfaces 53A-1 and 54A-1 of the press jigs 53A and 54A and the press surfaces 53B-1 and 54B-1 of the press jigs 53B and 54B, the press jig unit 55 consisting of the press jigs 53A and 53B is moved to the right oblique upper direction as shown in FIG. 16 (d) so that the upper end surfaces of the press jigs 53A and 54A become the same plane and the lower end surfaces of the press jigs 53B and 54B become the same plane. A step part 57 with a crank shape is thereby formed on the top of linking portion 17a. The gap g formed by the movement of the press jig unit 55 in the left oblique lower direction shown in FIG. 22 (b) was made for formation of the curved shape of the linking portion 17a and formation of the step part with the crank shape on the linking portion 17a.

In case that a press die with the fixed shape in its press surface was used as in the conventional art, it was possible to form the curved shape and the step part with the crank shape on the linking portion 17a by one press operation at the same time. However, in the conventional forming method where the press dies had the respective fixed curved shapes and the respective fixed step shapes, it was necessary to exchange the press die each time the bending operation for forming different shapes was executed. Also, in the conventional forming method, the press die might execute an unreasonable bending of the wire rod. For example, the press die might apply unnecessary stress to the both surfaces of the wire rod or to the whole surface of the wire rod, and therefore the insulation layer of the wire rod might be injured. In other words, since an excess stress might be concentrated at a sharp edge of the press surface of the press die in order to increase bending precision, the insulation layer might be easily damaged. Also, in the method using the press die with the fixed shape, it was unknowable whether the insulation layer of the wire rod was damaged or not, until the wire rod was really pressed by the press die. If damaged, it was necessary to remake the press die causing the manufacturing cost of the coil segment to increase. In contrast, according to this embodiment, forming of the curved shape and forming of the crank-shaped step part are separately performed by the plurality of bending (shaping) processes, and each bending process (shaping process) is simplified and realized by the movement of the press jigs. Thus, the aforementioned problems by using the press dies can be solved, and it is possible to quickly perform the transformation from the forming process of the curved shape to the forming process of the crank-shaped step part by changing the moving amount of the press jigs. The forming time of the curved shape and the crank-shaped step part in this embodiment is substantially the same as that in the conventional method where forming is done by one press operation using the press dies with fixed shape. Further, according to this embodiment, in the bending process for forming the curved shape, since the linking portion of the wire rod is pinched between the curved smooth surfaces and then pressed, the insulation layer of the wire rod is never injured. Also, in the forming process of the crank-shaped step part, since no press surface with the step shape is pressed to the linking portion but the position of the pair of press jigs that pinch the linking portion are merely moved, the insulation layer of the wire rod is never injured as well.

Figure 17:
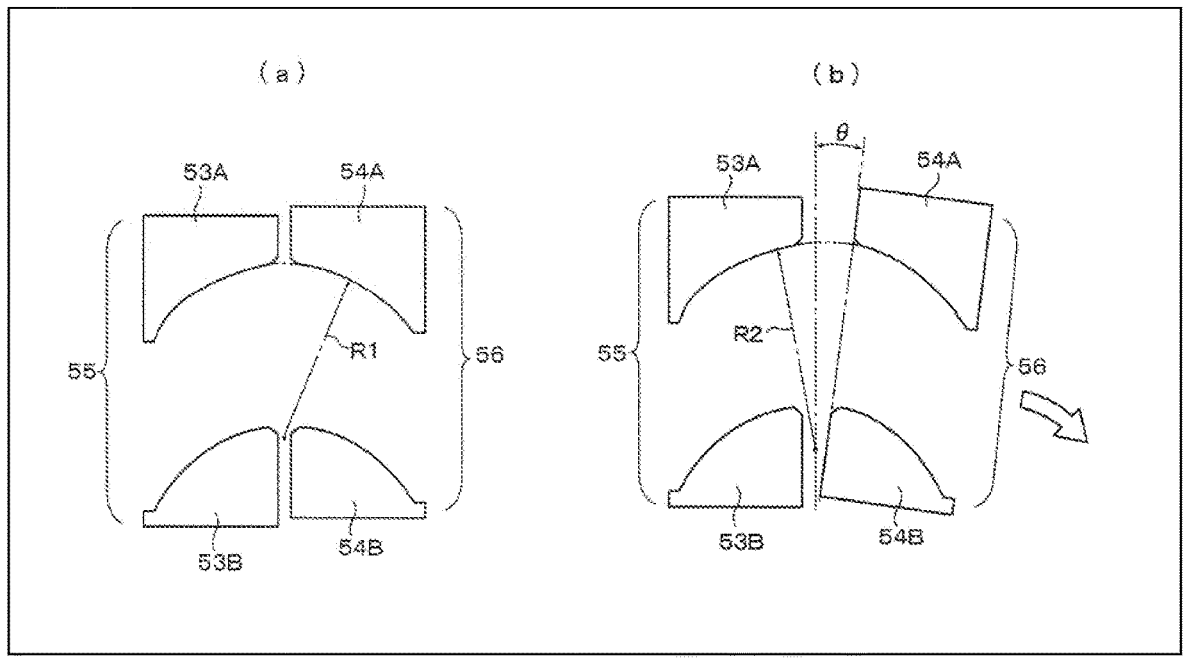
FIG. 17 is views illustrating curvature-factor adjustment operations in the second bending section in the embodiment of FIG. 1.

Referring now to FIG. 17, curvature-factor adjustment operations of the curved shape in the bending of the curved shape forming process will be described. FIG. 17 (a) shows an initial state just before starting the curvature-factor adjustment operations. This state is equivalent to the state shown in FIG. 17 (c), and the curvature radius is R1. When the press jig unit 56 shown in right side in the figure is rotated by an angle θ around the center of the curvature C, the curvature radius changes from R1 to R2 (R1<R2) as shown in FIG. 17 (b) to decrease the curvature factor (1/R2). That is, by rotating the press jig unit 56, the curvature factor of the curved shape of the linking portion 17a can be changed and therefore bending operations of various kinds of coil segments with different curvature factors of the curved shape in the linking portion 17a can be performed. In other words, with respect to the first bent bodies 17 with different widths between the slot insertion portions 17b and 17c, bending operations of the linking portion 17a can be performed by adjusting the curvature factor of the curved shape.

Hereinafter, configurations of drive mechanism and else of the second bending section 5 will be described in detail with reference to FIG. 18 to FIG. 22.

Figure 18:
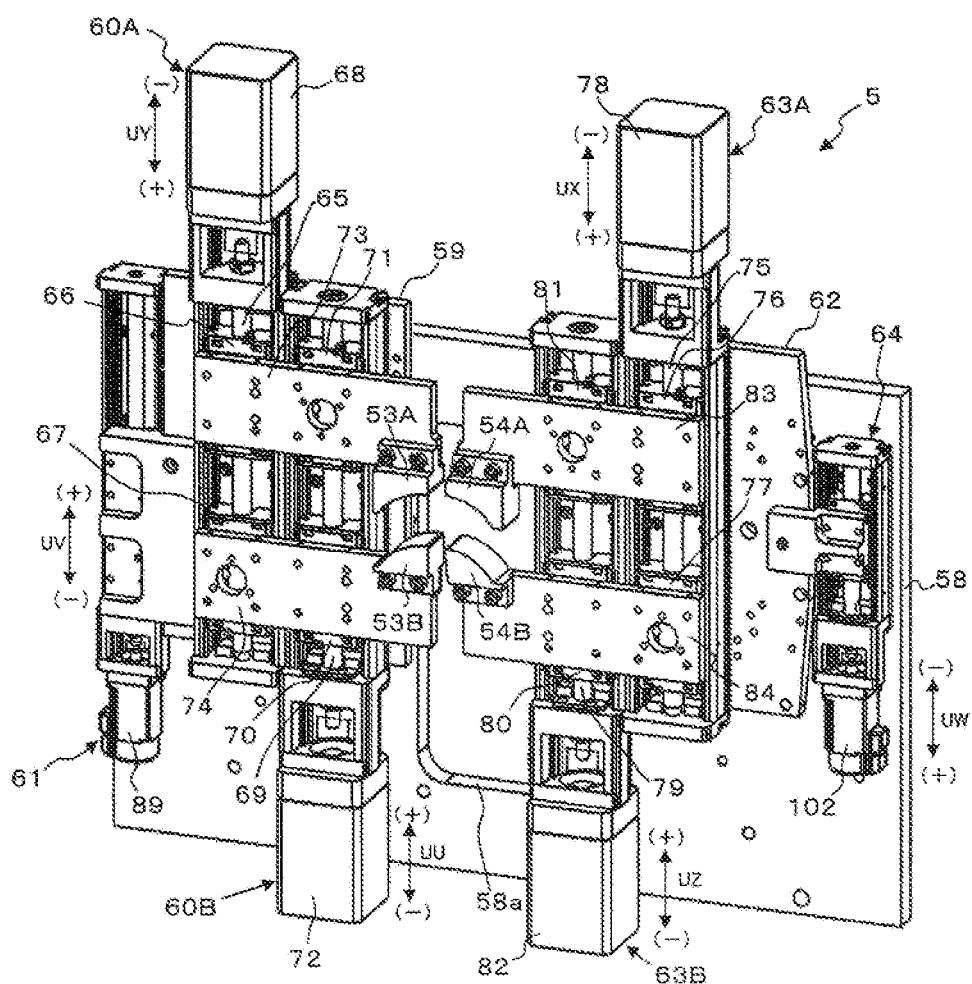
FIG. 18 is a perspective view schematically illustrating a whole constitution including a drive mechanism in the second bending section in the embodiment of FIG. 1.
Figure 25:
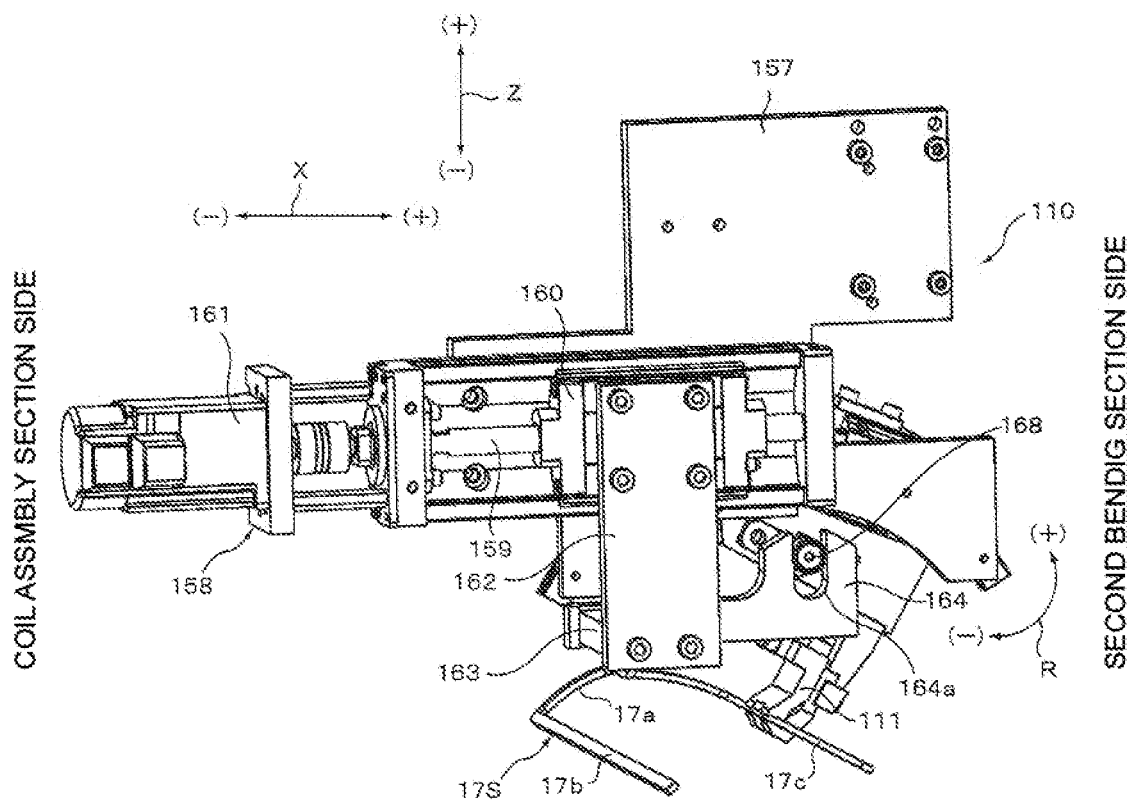
FIG. 25 is a perspective view schematically illustrating the constitution of a segment transport means in the embodiment of FIG. 1.

As shown in FIG. 18, the second bending section 5 has a fixed base 58 provided with an opening portion 58a at its center part and arranged in parallel to the vertical plane (the plane perpendicular to the horizontal plane that supports the first bent body 17), a movable base 59 movable in the right-and-left direction in the plane that is parallel to the fixed base 58, a drive mechanism 60A fixed to the movable base 59 for moving the press jig 53A in the up-and-down direction (the UY directions), a drive mechanism 60B fixed to the movable base 59 for moving the press jig 53B in the up-and-down direction (the UU directions), a drive mechanism 61 fixed to the fixed base 58 for moving the movable base 59 in the right-and-left direction (the UV directions), a rotation base 62 coupled with the fixed base 58 and capable of rotating around the center of the curvature C in the vertical plane, a drive mechanism 63A fixed to the rotation base 62 for moving the press jig 54A in the up-and-down direction (the UX directions), a drive mechanism 63B fixed to the rotation base 62 for moving the press jig 54B in the up-and-down direction (the UZ directions), and a drive mechanism 64 coupled with the rotation base 62 for moving the rotation base 62 in the up-and-down direction (the UW directions) and for rotating the rotation base 62 around the center of the curvature C. Note that, as shown in FIG. 25, the fixed base 58 is supported perpendicularly by two brackets 94 with L-shape that are fixed respectively to the both side portions in the longer distance (left-and-right direction).

The drive mechanism 60A has a ball screw portion 65 provided with a rotation axis that is parallel to the up-and-down direction (the UY directions), a nut portion 66 meshed with this ball screw portion 65 and slidable in the UY directions, a slider 67 not meshed with the ball screw portion 65 but merely slidable along the rotation axis in the UY directions, and a servomotor 68 for rotary driving the ball screw portion 65.

The drive mechanism 60B has a ball screw portion 69 provided with a rotation axis that is parallel to the up-and-down direction (the UU directions), a nut portion 70 meshed with this ball screw portion 69 and slidable in the UU directions, a slider 71 not meshed with the ball screw portion 69 but merely slidable along the rotation axis in the UU directions, and a servomotor 72 for rotary driving the ball screw portion 69.

A movement plate 73 for supporting the press jig is fixed to the nut portion 66 of the drive mechanism 60A and the slider 71 of the drive mechanism 60B, and the press jig 53A is fixed by bolt screws to a right lower portion of the movement plate 73. Thus, it is possible to move only the press jig 53A in the UY directions by the operation of the servomotor 68 of the drive mechanism 60A. Also, a movement plate 74 for supporting the press jig is fixed to the slider 67 of the drive mechanism 60A and the nut portion 70 of the drive mechanism 60B, and the press jig 53B is fixed by bolt screws to a right upper portion of the movement plate 74. Thus, it is possible to move only the press jig 53B in the UU directions by the operation of the servomotor 72 of the drive mechanism 60B. The movement plates 73 and 74 are supported over the drive mechanisms 60A and 60B to obtain stiffness and stability for securing and maintaining the precision of the press operations of the press jigs 53A and 53B.

The drive mechanism 63A has a ball screw portion 75 provided with a rotation axis that is parallel to the up-and-down direction (the UX directions), a nut portion 76 meshed with this ball screw portion 75 and slidable in the UX directions, a slider 77 not meshed with the ball screw portion 75 but merely slidable along the rotation axis in the UX directions, and a servomotor 78 for rotary driving the ball screw portion 75.

The drive mechanism 63B has a ball screw portion 79 provided with a rotation axis that is parallel to the up-and-down direction (the UZ directions), a nut portion 80 meshed with this ball screw portion 79 and slidable in the UZ directions, a slider 81 not meshed with the ball screw portion 79 but merely slidable along the rotation axis in the UZ directions, and a servomotor 82 for rotary driving the ball screw portion 79.

A movement plate 83 for supporting the press jig is fixed to the nut portion 76 of the drive mechanism 63A and the slider 81 of the drive mechanism 63B, and the press jig 54A is fixed by bolt screws to a left lower portion of the movement plate 83. Thus, it is possible to move only the press jig 54A in the UX directions by the operation of the servomotor 78 of the drive mechanism 63A. Also, a movement plate 84 for supporting the press jig is fixed to the slider 77 of the drive mechanism 63A and the nut portion 80 of the drive mechanism 63B, and the press jig 54B is fixed by bolt screws to a left upper portion of the movement plate 84. Thus, it is possible to move only the press jig 54B in the UZ directions by the operation of the servomotor 82 of the drive mechanism 63B. The movement plates 83 and 84 are supported over the drive mechanisms 63A and 63B to obtain stiffness and stability for securing and maintaining the precision of the press operations of the press jigs 54A and 54B.

Figure 19:
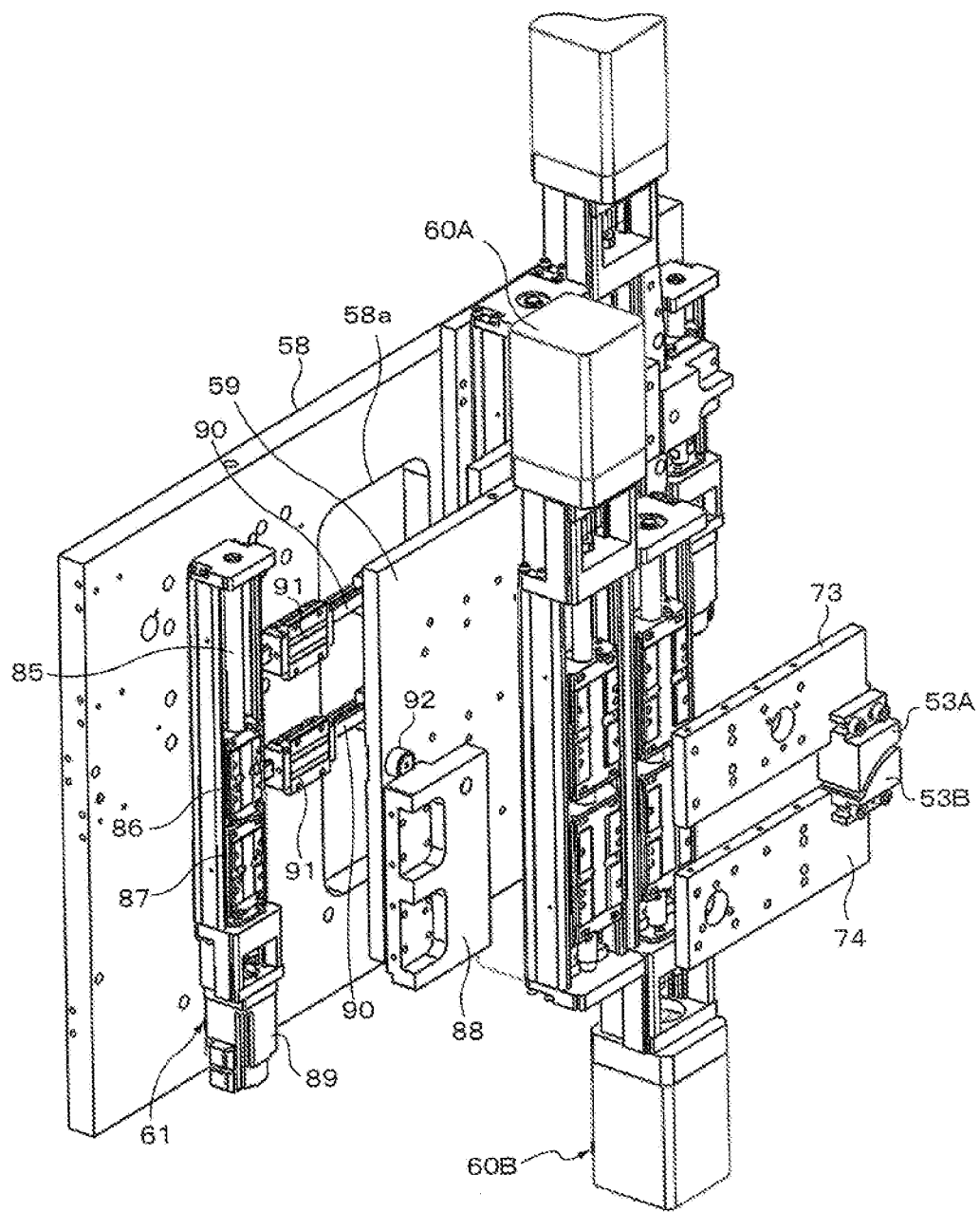
FIG. 19 is an exploded perspective view illustrating a constitution of one side (left half seen from the front) including the drive mechanism in the second bending section in the embodiment of FIG. 1.
Figure 20:
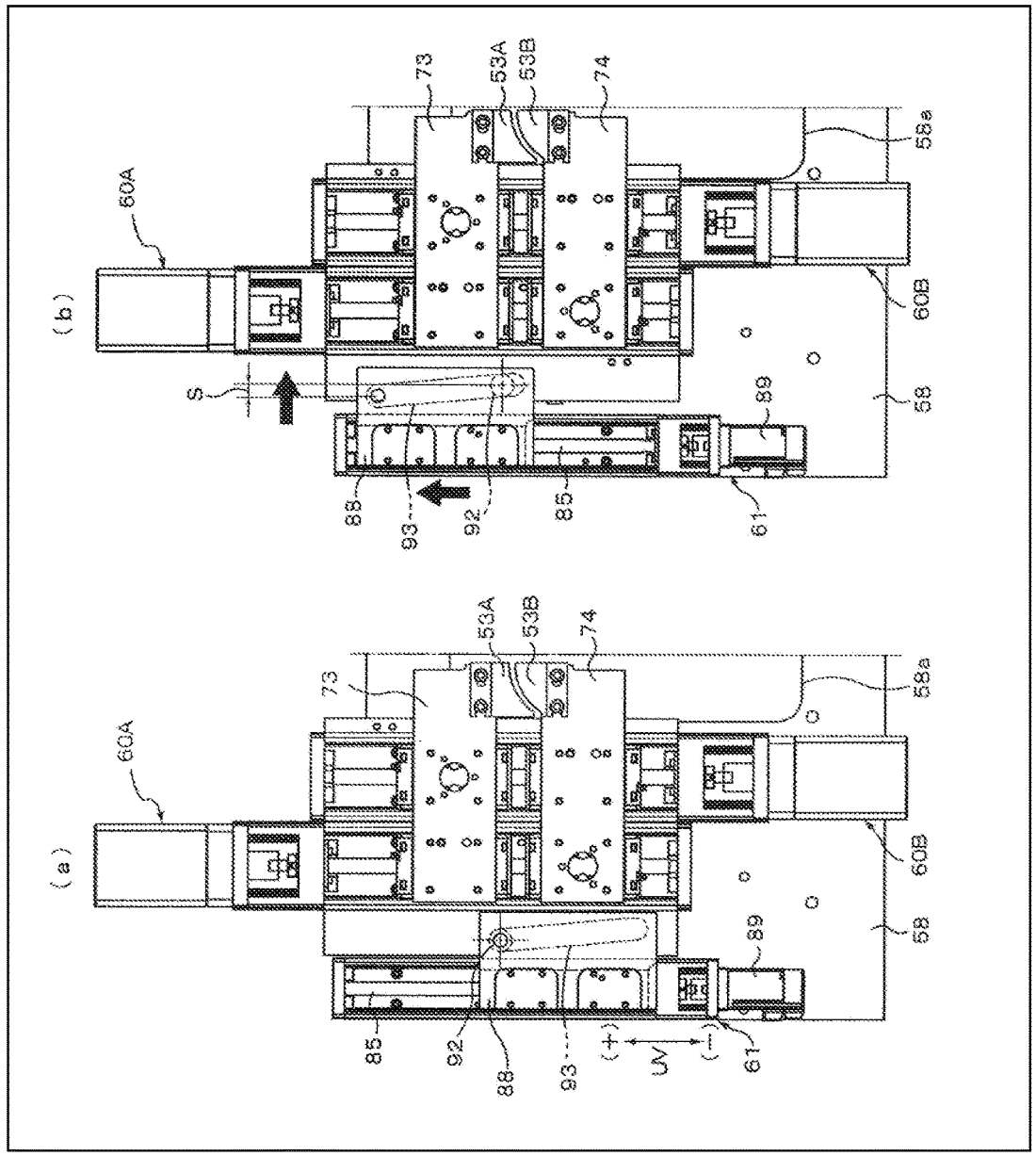
FIG. 20 is a front view illustrating operations of the drive mechanism in the side shown in FIG. 19 in the second bending section in the embodiment of FIG. 1.

Referring next to FIG. 18 to FIG. 22, a constitution of movement to the left-and-right direction with respect to the movable base 59 for supporting the drive mechanisms 60A and 60B and a constitution of the drive mechanism 61 for moving the movable base 59 will be described. It should be noted that FIG. 19 shows a constitution of one side (left half seen from the front) of the second bending section 5 and a constitution around the drive mechanism 61 in the exploded form, and FIG. 20 shows operations of this part.

As shown in FIG. 18 and FIG. 19, the drive mechanism 61 fixed to the fixed base 58 has a ball screw portion 85 provided with a rotation axis that is parallel to the up-and-down direction (the UV directions), nut portions 86 and 87 meshed with this ball screw portion 85 and slidable in the UV directions, a slide plate 88 fixed to the nut portions 86 and 87 and slidable in the UV directions, and a servomotor 89 for rotary driving the ball screw portion 85. A pair of rail members 90 along the left-and-right direction are fixed to the fixed base 58 as in upper and lower two lines that are parallel to each other. Two pairs of slide members 91 are fixed to the rear surface of the movable base 59. Each pair of the slide members 91 engages with each rail member 90 so as to be slidable along the rail member 90. The movable base 59 is therefore supported movably in the left-and-right direction (the horizontal direction) perpendicular to the UV directions (see FIG. 18).

As shown in FIG. 19 and FIG. 20, the movable base 59 has a cam follower 92 projecting from its surface, and an engagement groove 93 formed on the rear surface of the slide plate 88 at a slant to the UV directions. The cam follower 92 is configured to engage with and slide along the engagement groove 93. In the state shown in FIG. 16 (c), the cam follower 92 engaged with the engagement groove 93 is positioned as shown in FIG. 20 (a). When the servomotor 89 of the drive mechanism 61 operates and thus the slide plate 88 rises to the UV(+) direction, the engagement groove 93 rises with the slide plate 88. The cam follower 92 sliding in the engagement groove 93 will be thereby guided to the right direction in the figure as shown in FIG. 20 (b). As a result, the movable base 59, to which the cam follower 92 is fixed, moves in the right direction by a distance S shown in FIG. 20 (b). If the servomotor 89 is driven in the reversed direction, the movable base 59 moves to the opposite direction. The moving amount in the left-and-right direction of the movable base 59 can be changed by modifying an inclination angle and/or a length of the engagement groove 93. The crank shape or the step part shape of the linking portion 17a, or the curvature factor of the curved surface of the linking portion 17a can be changed by modifying the moving amount in the left and right direction of the movable base 59.

As aforementioned, since the press jig unit 55 consisting of the press jigs 53A and 53B is movable in the up-and-down direction by means of the drive mechanisms 60A and 60B, this press jig unit 55 can be moved in an oblique direction by combining and simultaneously performing the movement in the left-and-right direction by the drive mechanism 61 and the movement in the up-and-down direction by the drive mechanisms 60A and 60B. For example, the oblique direction movement from the home position state shown in FIG. 16 (*a*) to the state shown in FIG. 16 (*b*) can be attained by simultaneously moving the movable base 59 to the left direction by means of the drive mechanism 61 and the movement plates 73 and 74 to the lower direction by means of the drive mechanisms 60A and 60B. Also, the oblique direction movement from the state shown in FIG. 16 (*c*) to the state shown in FIG. 16 (*d*) can be attained by simultaneously moving the movable base 59 to the right direction by means of the drive mechanism 61 and the movement plates 73 and 74 to the upper direction by means of the drive mechanisms 60A and 60B.

Figure 21:
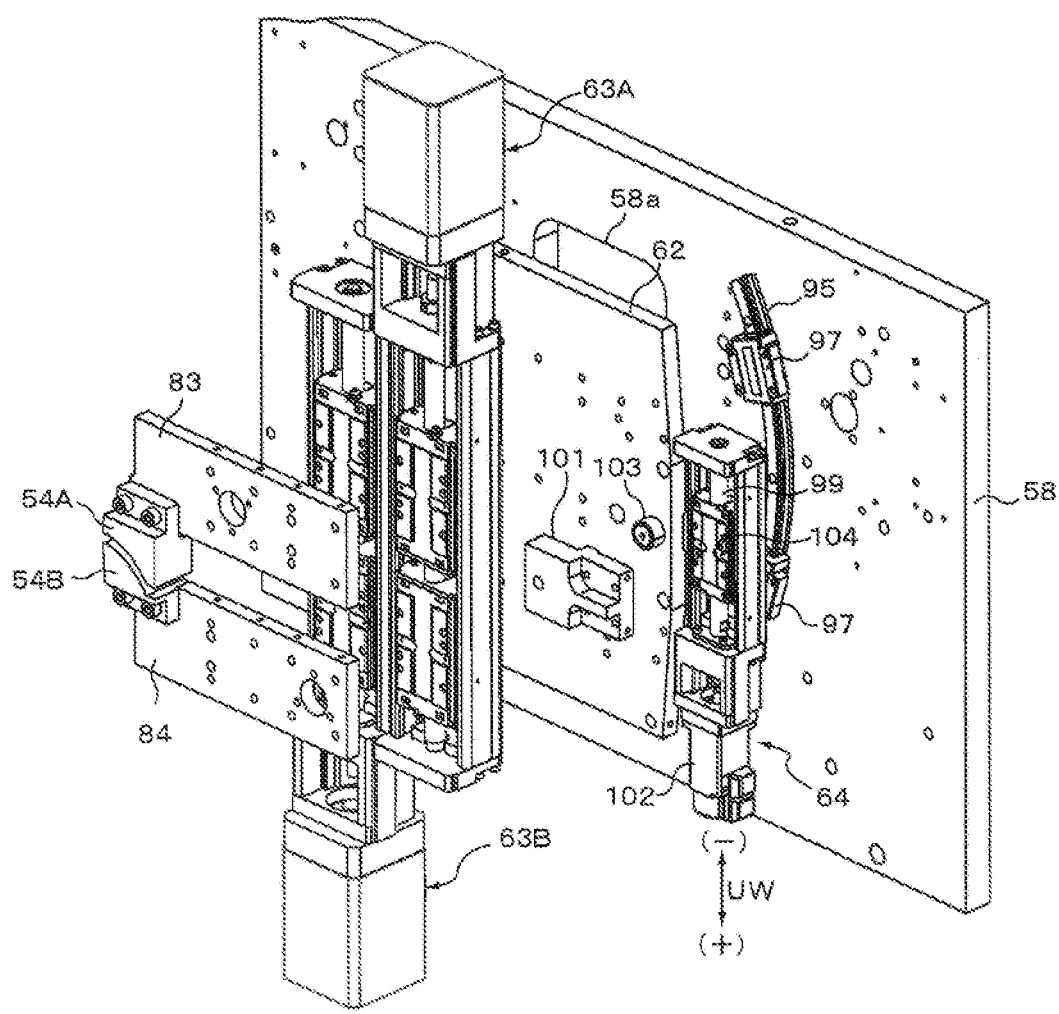
FIG. 21 is an exploded perspective view illustrating a constitution of the other side (right half seen from the front) including the drive mechanism in the second bending section in the embodiment of FIG. 1.
Figure 22:
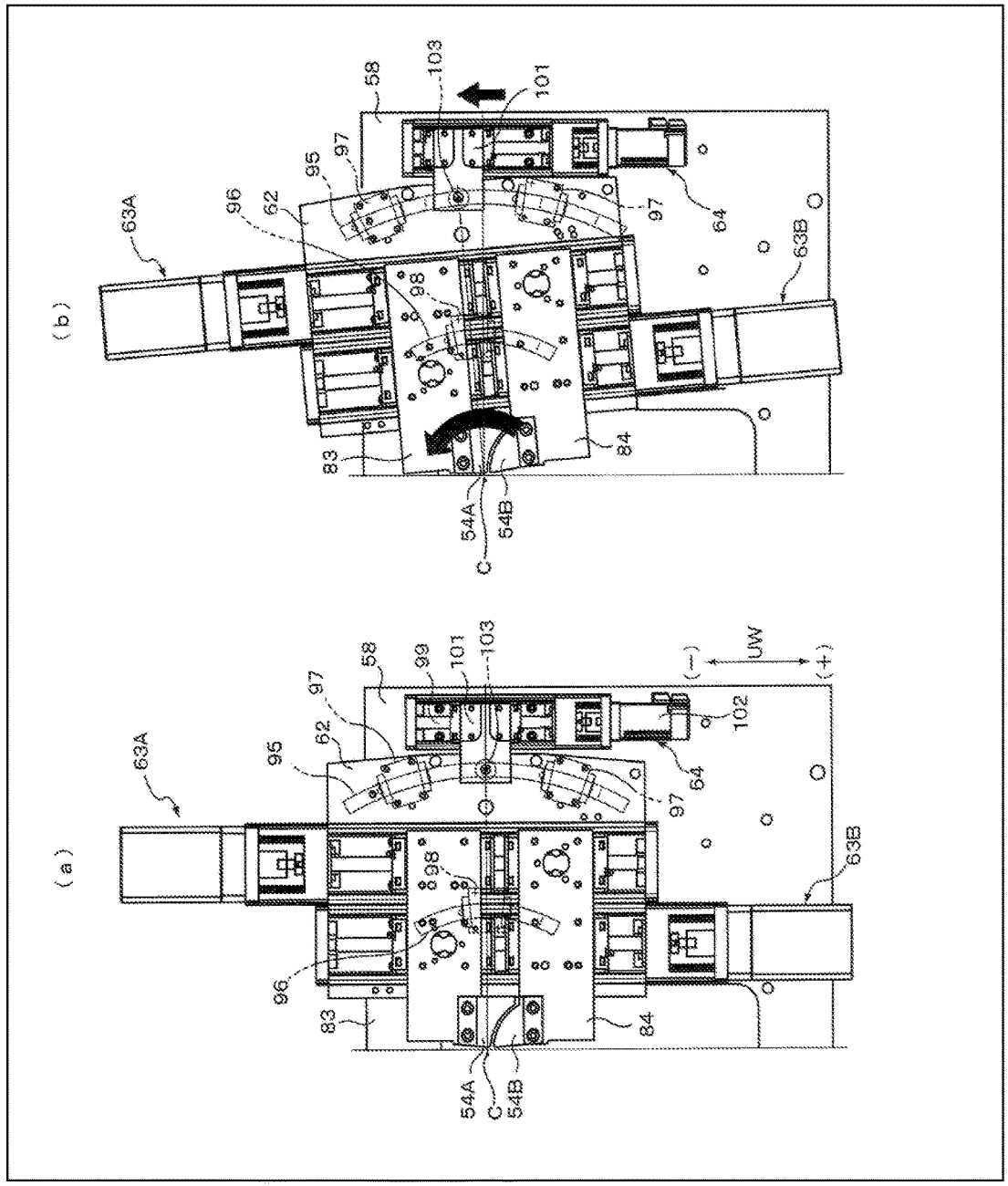
FIG. 22 is a front view illustrating operations of the drive mechanism in the side shown in FIG. 21 in the second bending section in the embodiment of FIG. 1.

Referring next to FIG. 21 and FIG. 22, a constitution of rotating movement with respect to the rotation base 62 for supporting the drive mechanisms 63A and 63B and a constitution of the drive mechanism 64 for rotating the rotation base 62 will be described. It should be noted that FIG. 21 shows a constitution of one side (right half seen from the front) of the second bending section 5 and a constitution around the drive mechanism 64 in the exploded form, and FIG. 22 shows operations of this part.

As shown in these figures, a pair of rail members 95 and 96 having the common center of curvature C and curved shapes with different curvature factors are fixed to the fixed base 58 so that the rail members are isolated with each other in the left-and-right direction, and a pair of slide members 97 and a single slide member 98 are fixed to the rear surface of the rotation base 62. The pair of slide members 97 engage with the rail member 95 so that the slide members 97 can slide along the rail member 95, and the single slide member 98 engages with the rail member 96 so that the slide member 98 can slide along the rail member 96. The drive mechanism 64 has a ball screw portion 99 provided with a rotation axis that is parallel to the up-and-down direction (UW directions), a nut portion 100 meshed with this ball screw portion 99 and slidable in the UW direction, an engagement member 101 fixed to the nut portion 100, and a servomotor 102 for rotary driving the ball screw portion 99. The rotation base 62 has a cam follower 103 projecting from its surface, and an engagement groove 101*a* (see FIG. 21) engaged with the cam follower 103 is formed on the rear surface of the engagement member 101.

When the servomotor 102 of the drive mechanism 64 operates to move the engagement member 101 to the UW direction, the cam follower 103 engaging with the engagement groove 101*a* moves so that the slide members 97 and 98 slide along the rail members 95 and 96, and the rotation base 62 rotates around center of curvature C in the counterclockwise direction. That is, the rotation base 62 rotates from the state shown in FIG. 22 (*a*) (stayed in the center) to the state shown in FIG. 22 (*b*). Because the press jigs 54A and 54B are fixed to this rotation member 62, the press jig unit 56 having these press jigs 54A and 54B integrated there with rotates. When the rotation base 62 rotates in the counterclockwise direction as aforementioned, the curvature factor at the time of forming of the curved shape to the linking portion 17*a* using the press jigs 53A, 53B, 54A and 54B will be kept large. On the contrary, when the rotation base 62 rotates in the clockwise direction from the center position shown in FIG. 22 (*a*), the curvature factor at the time of forming of the curved shape to the linking portion 17*a* can be lowered. The curvature center C that is the center of the rotation of the rotation base 62 stably guided by the pair of rail member 95 and 96 is located near the left end edge of the press jigs 54A and 54B, and thereby it is possible to change the curvature factor at the time of forming of the curved shape with a high degree of accuracy.

Hereinafter, an electrical configuration of the second bending section 5 will be described. In this embodiment, as aforementioned, the second bending section 5 adopts the 6-axes control configuration, and therefore the amplification and drive circuit of the servomotor 78 for UX direction drive, the amplification and drive circuit of the servomotor 68 for UY direction drive, the amplification and drive circuit of the servomotor 82 for UZ direction drive, the amplification and drive circuit of the servomotor 72 for UU direction drive, the amplification and drive circuit of the servomotor 89 for UV direction drive, and the amplification and drive circuit of the servomotor 102 for UW direction drive are connected to the optical communication cable 50.

Figure 23:
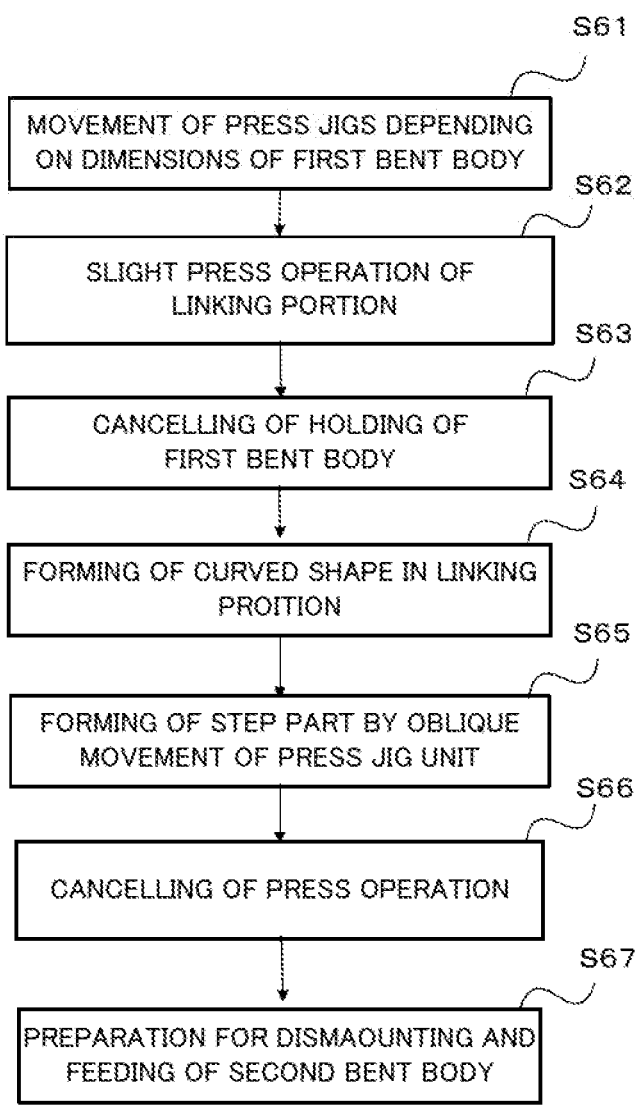
FIG. 23 is a flow chart schematically illustrating control processes of bending operations of the second bending section in the embodiment of FIG. 1.

The PLC 46 and the first NC controller 47 control the second bending operation of the first bent body 17 with respect to the coil segment to be formed, namely the forming of the curved shape and the forming of the crank-shaped step part, depending on steps of the flowchart shown in FIG. 23, which correspond to the process at the Step 6 shown in FIG. 12. Hereinafter, the second bending operation will be described in detail by using the flow chart of FIG. 23. It should be noted that the following description is in a case of performing the second bending for the first bent body with a small coil width or a short length in each side of its linking portion.

The first NC controller 47 expands the received control data with respect to the coil assembling operations and performs NC control of a drive mechanism with the designated address. At first, NC control of the movement of the press jigs 53A, 53B, 54A and 54B depending on the dimensions (shape) of the first bent body 17 is performed (Step S61). More concretely, a control data with respect to the moving amount of the press jigs is expanded and output to the drive mechanisms 60A, 60B, 63A and 63B in the second bending section 5 to drive the corresponding servomotors and to move the press jigs so that a concave curved surface has a predetermined curvature factor by the press jigs 53A and 54A and that a convex curved surface has a predetermined curvature factor by the press jigs 53B and 54B. FIG. 16 (*b*) shows this state.

Then, the first NC controller 47 performs NC control for slightly pressing the linking portion 17*a* of the first bent body 17 (slight press process is performed) (Step S62). That is, the first NC controller 47 expands the control data for press process and outputs the expanded control data to a drive mechanism in the second bending section 5 to drive the corresponding servomotor so that a slight press force is applied to prevent slippage of the first bent body 17 from occurring.

Then, the first NC controller 47 performs NC control for cancelling the holding of the first bent body 17 by the hold member 13 (Step S63). That is, the first NC controller 47 expands the control data for releasing the first bent body 17 from the hold member 13 and outputs the expanded control data to a drive mechanism of the hold member 13 to drive the air cylinder so that the holding or chucking of the slot insertion portions 17*b* and 17*c* is canceled.

Then, the first NC controller 47 performs NC control for curved-shape forming to bend the linking portion 17*a* in a curved shape (Step S64). That is, the first NC controller 47 expands the control data for pressing and outputs the expanded control data to the drive mechanisms 60A, 60B, 63A and 63B to drive the corresponding servomotor so as to perform the press processes.

In such bending operations or pressing operations, so-called spring-back phenomenon in which the bent amount is slightly restored by the elasticity of the materials when the pressing force is released after having bent may occur. The quantity of return by this spring-back is different due to parameters such as materials of the wire rod 6 and a curvature factor of the curved shape. According to the conventional bending method of bending the wire rod by using the press die, even if the forming surface of the press die was designed by considering the influence of the spring-back, undesirable spring-back influence was sometimes remained in the bent wire rod and thus the press die had to be redesigned and made again. Such redesign and remake invited forming cost of the press die, shaping cost of the coil segment and also manufacturing cost of the electrical rotating machine to increase. In case that the remake of the press die became multiple times, the manufacturing cost was extremely increased. Whereas according to this embodiment, because such spring-back influence can be cancelled by correcting the control data, for example, by prolonging the press time or by increasing the moving amount of the press jigs in the pressing direction, no remake of the press die is necessary at all. In modifications of the present invention, control data for suppressing the spring-back influence may be preliminarily obtained by experiments using the aforementioned parameters and control tables used in the NC control for bending the wire rod 6 may be made in accordance with the obtained control data, or shaping conditions for suppressing the spring-back influence may be automatically set depending on a kind of the input wire rod 6 or on a shape of the first bent body 17.

Then, the first NC controller 47 performs NC control for forming a crank-shaped step part in the linking portion 17a by moving the press jig unit 55 (press jigs 53A and 53B) in an oblique direction by means of the drive mechanism 61 (Step S65). That is, the first NC controller 47 expands the control data for forming the step part and outputs the expanded control data to the drive mechanism 61 to drive the servomotor 89 so as to move the movable base 59 to the right direction and to drive the servomotors 68 and 72 so as to move the press jigs 53A and 53B in synchronization with each other to the upper direction, and therefore to move the press jig unit 55 consisting of the press jigs 53A and 53B to the right oblique upper direction.

After forming of the step part, the first NC controller 47 performs NC control for cancelling the press operation (Step S66). That is, the first NC controller 47 expands the control data for moving the left press jigs 53A and 53B and outputs the expanded control data to the drive mechanisms 60A and 60B to drive the servomotors 68 and 72 so that the press jigs 53A and 53B leave the press position.

At the timing when the left press jigs 53A and 53B leave the press position, the first NC controller 47 performs NC control of preparation for dismounting and feeding or transferring the second bent body 17 namely a second bending-finished wire rod to the coil assembling section 2 (Step S67). That is, the first NC controller 47 expands the control data for feeding and outputs the expanded control data to a drive mechanism of a loader (not shown) to drive the air cylinder so as to hold the second bent body 17 by the pair of chucks.

Thereafter, the first NC controller 47 resets the drive mechanism in the second bending section 5 to make provision against the second bending operation of the next coil segment (first bent body).

As aforementioned, according to this embodiment, a bending region of the first bending section 4 and a bending region of the second bending section 5 are not overlapped in a single plane but exist individually. That is, in this embodiment, the concept of press forming at once using the press die having a three dimensional shape as did in the conventional method, but two individual bending processes are adopted to simplify movements and constitutions of bending in the first bending section 4 and the second bending section 5 so as to implement the numerically controlled bending processes.

In the above-mentioned second bending operations, the crank-shaped step part is formed on the top of the linking portion 17a of the first bent body 17. However, a gap for lane change to shift or misalign the pair of slot insertion portions of the first bent body 17 with each other in the radial direction of the slot may be formed in any shape such as smooth surface shape without being limited to the step.

Hereinafter, configurations and operations of the coil assembling section 2 will be described in detail.

Figure 29:
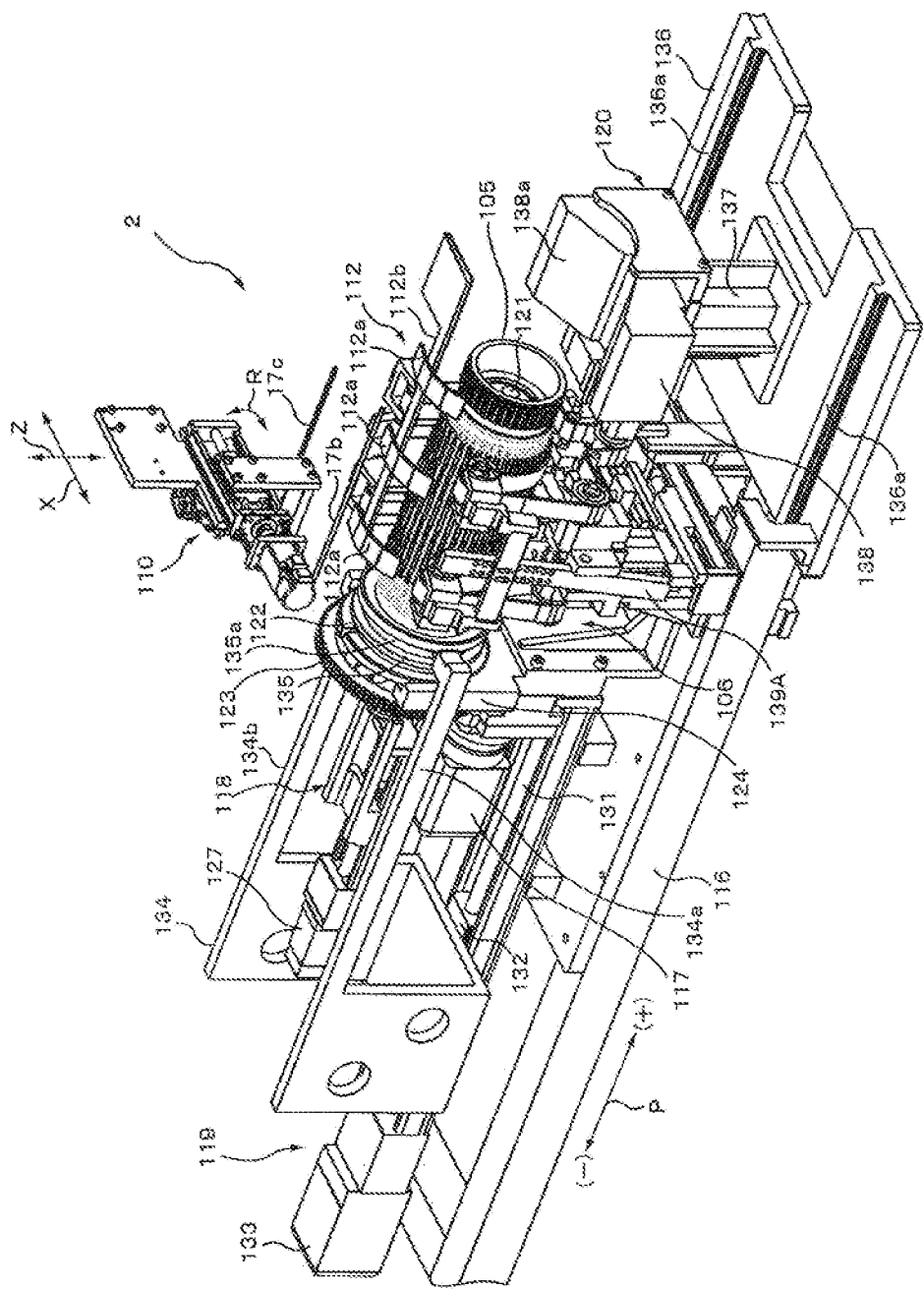
FIG. 29 is a perspective view schematically illustrating the whole constitution of the coil assembling section in the embodiment of FIG. 1.
Figure 36:
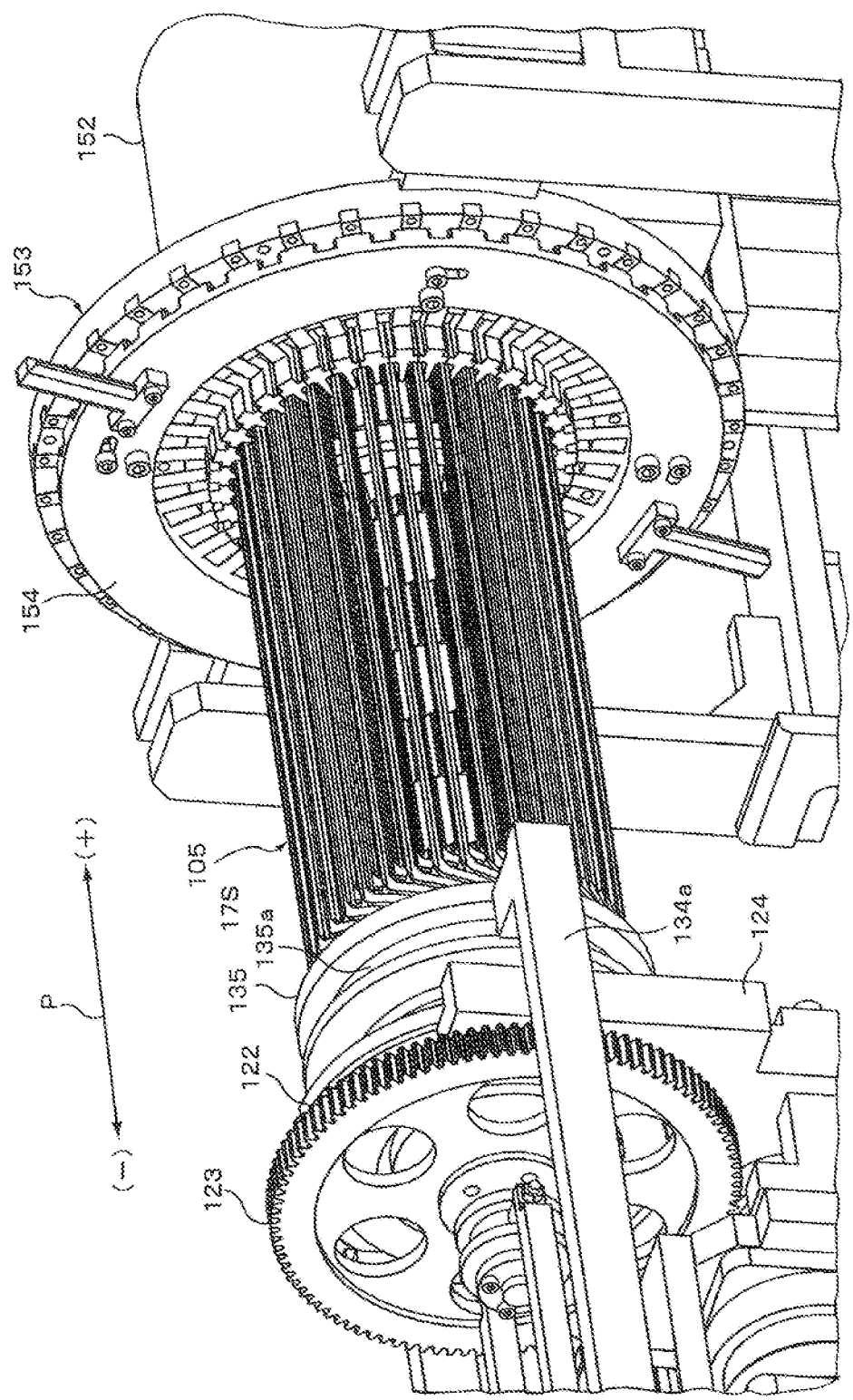
FIG. 36 is a perspective view schematically illustrating the state wherein a part of the assembled coil is inserted into an insertion guide unit in the manufacturing apparatus of electrical rotating machine in the embodiment of FIG. 1.

The coil assembling section 2 has a segment transport means 110 for sequentially transporting or feeding coil segments S, as shown in FIG. 25, FIG. 36 and FIG. 29, a segment arrangement drum 105 (corresponding to the segment arrangement body according to the present invention) with a plurality of segment hold portions 109 annularly arranged along the circumferential direction, into which the plurality of coil segments 17S can be respectively inserted from the outer radial directions, as shown in FIG. 24A to FIG. 24F and FIG. 29, and a guide member 112 (corresponding to the guide means according to the present invention) of single stage configuration for guiding and inserting the plurality of coil segments 17S into the plurality of segment hold portions 109, respectively. The segment arrangement drum 105 is configured to rotate around the center axis C (rotation axis 121) at a predetermined angle every time by an index rotation drive mechanism (not shown). The guide member 112 is arranged above the segment arrangement drum 105. This guide member 112 is configured to guide and insert one (slot insertion portion 17b, front leg) of the pair of slot insertion portions 17b and 17c of each coil segment 17S into the one of the segment hold portions 109 each time the segment arrangement drum 105 rotates by a first predetermined angle, and configured to guide and insert the other one (slot insertion portion 17c, rear leg) of the pair of slot insertion portions 17b and 17c into the other one of the segment hold portions 109 after the segment arrangement drum 105 rotates by a second predetermined angle from the insertion of the slot insertion portion 17b.

The coil assembling section 2 has a separation preventing means 106 for supporting the plurality of coil segments inserted in the plurality of segment hold portions 109 of the segment arrangement drum 105 so as to prevent separation of these plurality of coil segments from the plurality of segment hold portions 109, as shown in FIG. 24A to FIG. 24F and FIG. 29.

The separation preventing means 106 has a belt 107 (corresponding to the belt body according to the present invention) made of a rubber, which is a flexible abutment member for performing abutment along the peripheral surface of the segment arrangement drum 105 and for performing co-rotation (driven-rotation) depending on the rotation of the segment arrangement drum 105. The belt 107 is formed to have a narrow width of about 3 cm and arranged in a loop shape to cover a part of the peripheral surface of the segment arrangement drum 105 at a plurality of points (two points in this embodiment) along the axis of the segment arrangement drum 105. It should be noted that the belt 107 is not arranged above the segment arrangement drum 105, to which the coil segments 17S are guided. Detail constitutions of the separation preventing means 106 will be described later.

The segment arrangement drum 105 is arranged so that the rotation center axis C thereof is horizontally-supported and that the plurality of segment hold portions 109 are also kept horizontal. This segment arrangement drum 105 is supported in this embodiment in a state rotatable to the anticlockwise direction in FIG. 24A. In other words, the segment arrangement drum 105 is horizontally-arranged so that the center axis C of this drum 105 is substantially in parallel with an axis direction of the second bending-completed coil segment 17S (insertion direction into the slot).

Inside of the segment arrangement drum 105, a plurality of blades 108, which are divisional walls extending in the axial direction of the drum 105, are annually arranged along the circumferential direction of the drum 105 and extended to the radial direction from the center axis C of the drum 105. Thus, the plurality of segment hold portions 109 are formed between the plurality of blades 108, respectively. Heights in the radial direction of the plurality of blades 108 are variable by sliding these blades along the radial direction. It is configured that the radial direction heights of these blades 108 corresponding to an outward projection amount in the radial direction of the segment arrangement drum 105 can be simultaneously adjusted for all of the blades 108. Detail constitutions of this adjustment mechanism of the projection amount will be described later. The belt 107 of the separation preventing means 106 substantially abuts with the blades 108.

The coil segment 17s, which is the second bending-completed coil segment, is parallel-transported by means of the segment transport means 110 from the second bending section 5 and guided and inserted into the segment hold portion 109 of the segment arrangement drum 105. As shown in FIG. 25, this segment transport means 110 has a chucking portion 111 for gripping one slot insertion portion 17c (rear leg) among the pair of insertion portions 17b and 17c of the coil segment 17S, and whole of the segment transport means 110 is movable in the up-and-down direction (Z(−) direction and Z(+) direction) and in the horizontal direction (X(−) direction and X(+) direction). The X(−) direction and the X(+) direction are directions along which the segment transport means 110 transports to and from between the second bending section 5 and the segment arrangement drum 105. The chucking portion 111 is configured to rotate to the R direction in the vertical plane and to change its posture under the state where one slot insertion portion 17c (rear leg) of the coil segment 17S is gripped.

FIG. 25 indicates the state where the second bending of the coil segment 17S by the second bending section 5 has been completed, and then the bent coil segment 17S is gripped and transported by the segment transport means 110 after released from the press jigs. The chucking portion 111 of the segment transport means 110 grips the other slot insertion portion (rear leg) 17c of the coil segment 17S, which positions at the rear side when the coil segment is moved toward the coil assembling section side (segment arrangement drum 105 side). Before the coil segment 17S is transported to the segment arrangement drum 105, the chucking portion 111 of the segment transport means 110 rotates upward (R(+) direction) and thus the coil segment 17S inclines so that its one and front slot insertion portion (front leg) 17b positions obliquely downward.

In detail, the segment transport means 110 has, as shown in FIG. 25, a base 157 movable to the horizontal direction (X(−) direction and X(+) directions and the up-and-down direction (vertical direction) (Z(−) direction and Z(+) direction) by means of a drive mechanism not shown, the chucking portion 111 rotatably attached to the base 157, and a drive mechanism 158 for rotating the chuck portion 111 in the R(−) direction and R(+) direction. The drive mechanism 158 has a ball screw portion 159 provided with a rotation axis parallel to the X(−) direction and X(+) direction, a nut portion 160 threadably mounted on the ball screw portion 159 and slidable in the X(−) direction and X(+) direction, a servomotor 161 for rotating the ball screw portion 159, and a slider 162 fixed to the nut portion 160 and moved in the X(−) direction and X(+) direction in response to the rotation of the ball screw portion 159.

Figure 26:
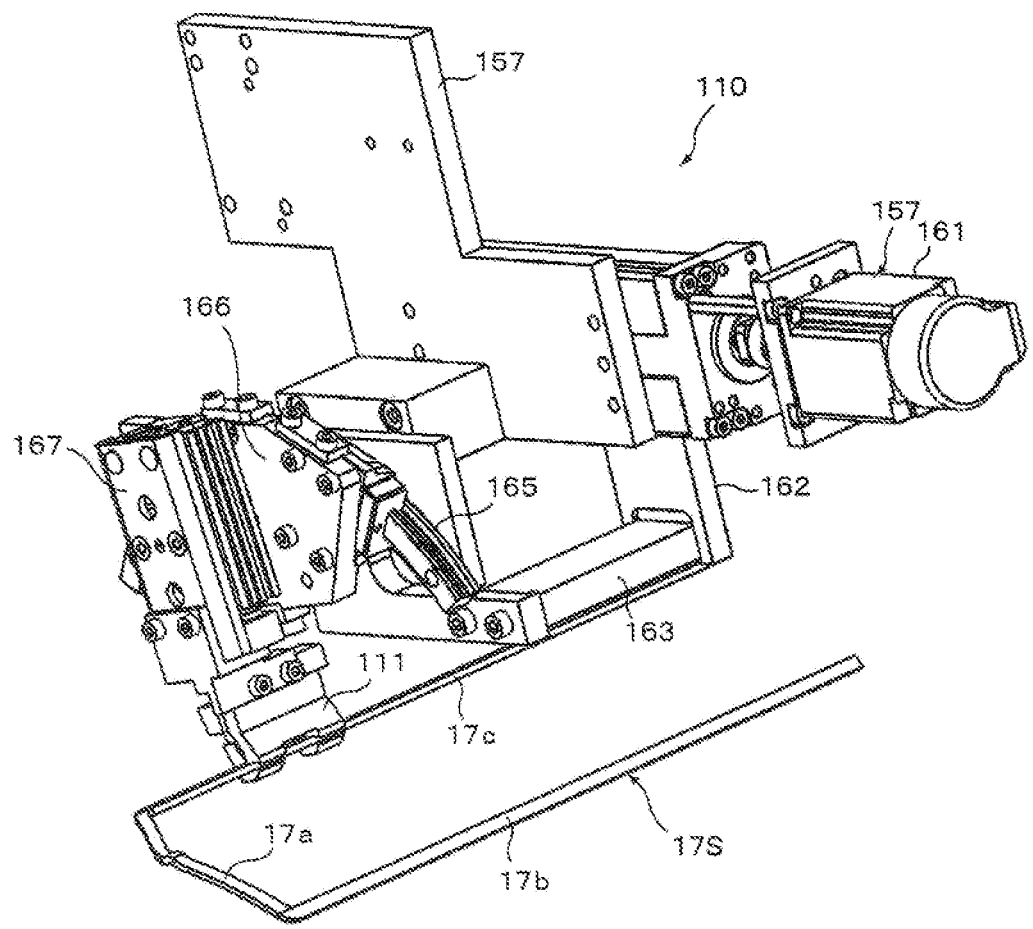
FIG. 26 is a perspective view schematically illustrating the constitution of the segment transport means seen from the rear in the embodiment of FIG. 1.

The slider 162 has a rectangular shape extending to the up-and-down direction, and a drive pawl 164 is fixed to the rear surface of the lower portion of the slider 162 through a bracket 163. As shown in FIG. 26, a rail 165 with a circular arc shape is fixed to the rear surface side of the base 157, and the chuck portion 111 is supported by a turning base 166 fitted to this rail 165 and turned along the rail 165. An air cylinder for opening and closing the chucking portion 111 is formed in the turning base 166. As shown in FIG. 25, a cam follower 168 is formed on the front surface side of the turning base 166 and a concave groove 164a engaged with the cam follower 168 is formed in the drive pawl 164. When the servomotor 161 of the drive mechanism 158 operates to move the slider 162 to the X(−) direction, the chuck portion 11 rotates to the R(−) direction. If the slider 162 moves to the X(+) direction, the chuck portion 11 rotates to the R(+) direction. Thus, by controlling the operations of the servomotor 161, it is possible to change the inclination of the coil segment 17S.

Figure 24A:
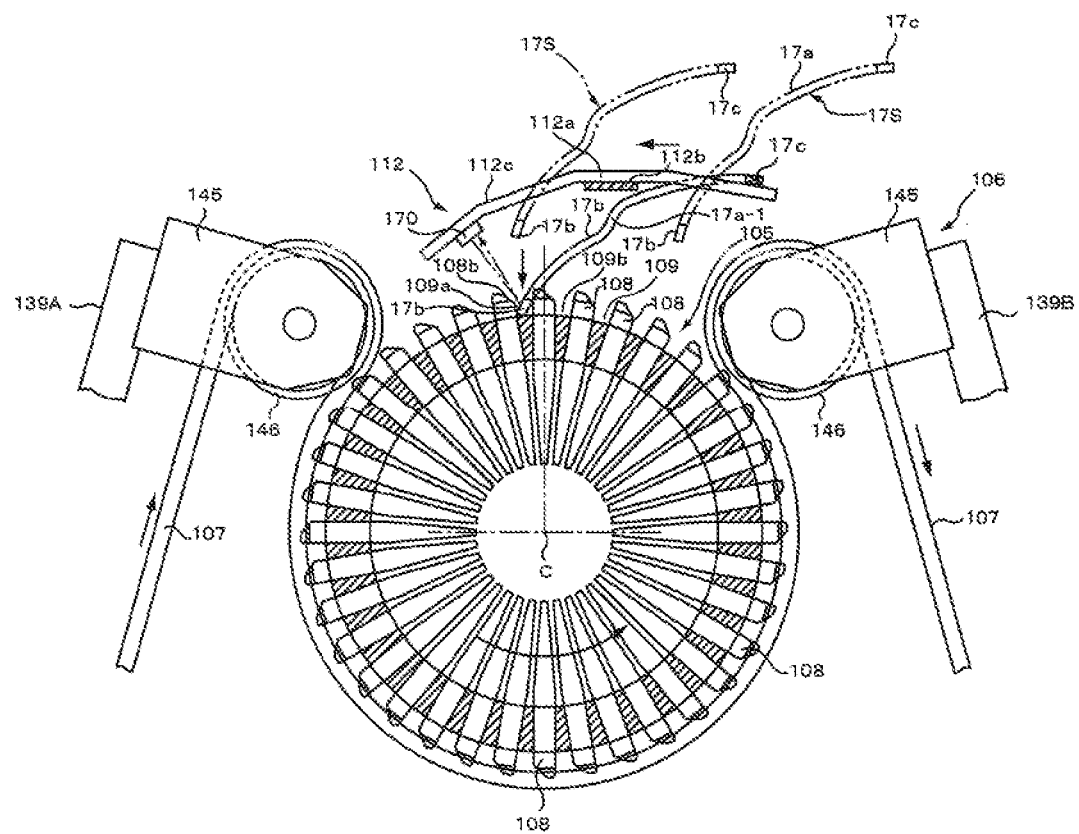
FIG. 24A is an essential part sectional view illustrating the operations of guiding and inserting a first coil segment into a segment hold portion in the coil assembling section in the embodiment of FIG. 1.
Figure 27:
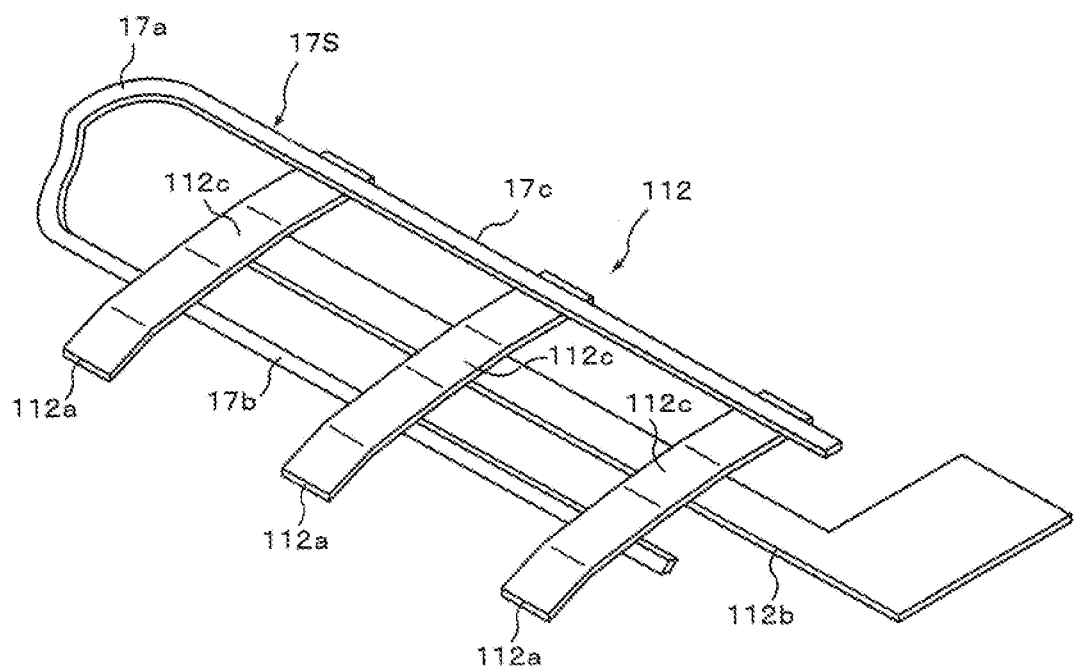
FIG. 27 is a perspective view schematically illustrating the constitution of a guide member in a coil assembling section and a coil segment guided by this guide member in the embodiment of FIG. 1.

As shown in FIG. 24A, a guide member 112 supported by a frame (not shown) is formed above the segment arrangement drum 105. This guide member 112 has a guide surface 112c formed along the peripheral surface of the segment arrangement drum 105 and guides the coil segment 17S into the predetermined segment hold portion 109 of the segment arrangement drum 105. The guide member 112, as shown in FIG. 29, extends along the axial direction of the segment arrangement drum 105, and arranged to oppose with a space to the peripheral surface of the segment arrangement drum 105. The guide member 112 has, as shown in FIG. 27, a plurality (three in this embodiment) of guide pieces 112a with a small width, and a bracket 112b for supporting these guide pieces 112a away from each other. The bracket 112b is formed along the axial direction of the segment arrangement drum 105, and the guide pieces 112a extend to the direction perpendicular to the bracket 112b. The bracket 112b is fixed to the frame (not shown) as aforementioned.

The coil segment 17S is transported so that the rear leg 17c of the coil segment 17S passes under the guide member 112 (between the guide member 112 and the segment arrangement drum 105) and the rear leg 17c of the coil segment 17S passes above the guide member 112 (above the opposite side of the guide member 112 with respect to the segment arrangement drum 105) under the conditions where the front leg 17b of the coil segment is gripped by the chuck portion 111 of the segment transport means 110 as shown in FIG. 26. As shown in FIG. 24A, the segment transport means 110 starts to lower when the front leg 17b of the coil segment 17S reaches a position above the segment hold portion 109a, which position is the reference point. Although the reference point of this embodiment is set to the segment hold portion 109a between the blade 108 located at the upper center of the segment arrangement drum 105 and the blade 108 adjacent to this upper center blade downstream of the rotation direction of the segment arrangement drum 105, the reference point of the present invention is not limited to this position. When the segment transport means 110 lowers and thereby a detection sensor 170 arranged on the lower surface of the guide member 112 detects the insertion of the front leg 17b of the coil segment 17S into the segment hold portion 109a, the chuck portion 111 of the segment transport means 110 releases the coil segment 17S. Thus, the rear leg 17c of the coil segment 17S is laid on the guide member 112.

When the insertion of the front leg 17b of the coil segment 17S into the segment hold portion 109a is detected, the segment arrangement drum 105 is controlled to rotate to the counterclockwise direction in the figure by a first predetermined angle corresponding to one slot, that is the first predetermined angle corresponding to an angle of one segment hold portion 109 (index rotation). Since the front leg 17b of the coil segment 17S is housed and caught in the segment hold portion 109, in case that the segment arrangement drum 105 rotates, the front leg 17b of the coil segment 17S moves in a state of sliding on a guide surface 112c. When the segment arrangement drum 105 rotates by an angle corresponding to one slot, the segment hold portion 109b located upstream in the rotation direction, of and adjacent to the segment hold portion 109a that is a first reference point becomes a next reference point of the coil segment 17S. In order that the front leg 17b is smoothly inserted into the segment hold portion 109 that is the reference point, the upstream part in the rotation direction of the segment arrangement drum 105, of each blade 108 is chamfered to form a tapered surface 108b. It should be noted that, in this embodiment, since there is 36 slots in one circuit of the segment arrangement drum 105, the angle corresponding to one slot of the segment arrangement drum 105, namely the first predetermined angle is 10 degrees.

Hereinafter, operations of sequentially inserting the plurality of coil segments 17S into the plurality of segment hold portions 109 of the segment arrangement drum 105 respectively will be described. It should be noted that in the figure the coil segments 17S is represented in the figure only by the end surfaces of the front legs and the rear legs. In the figure, the front leg is indicated by an outline with white space and the rear leg is indicated by an outline with X.

Figure 24B:
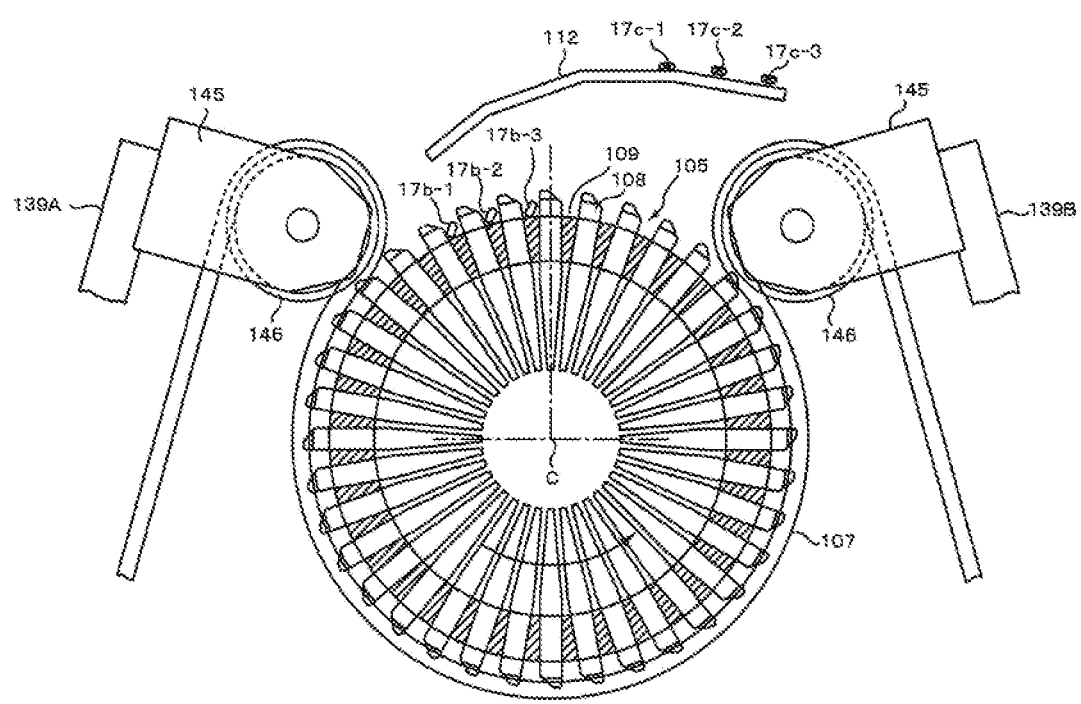
FIG. 24B is an essential part sectional view illustrating the state wherein front legs of first to third coil segments are inserted into the segment hold portions in the coil assembling section in the embodiment of FIG. 1.

FIG. 24B shows the conditions where the front legs 17b of the three coil segments 17S are inserted in the segment hold portions 109 of the segment arrangement drum 105, respectively, and the rear legs 17c are laid on the guide surface 112. In FIG. 24B, reference numerals 17b-1, 17b-2 and 17b-3 indicate the first, second and third front legs of the coil segment 17S, respectively, and reference numerals 17c-1, 17c-2 and 17c-3 indicate the first, second and third rear legs of the coil segment 17S, respectively.

Figure 24C:
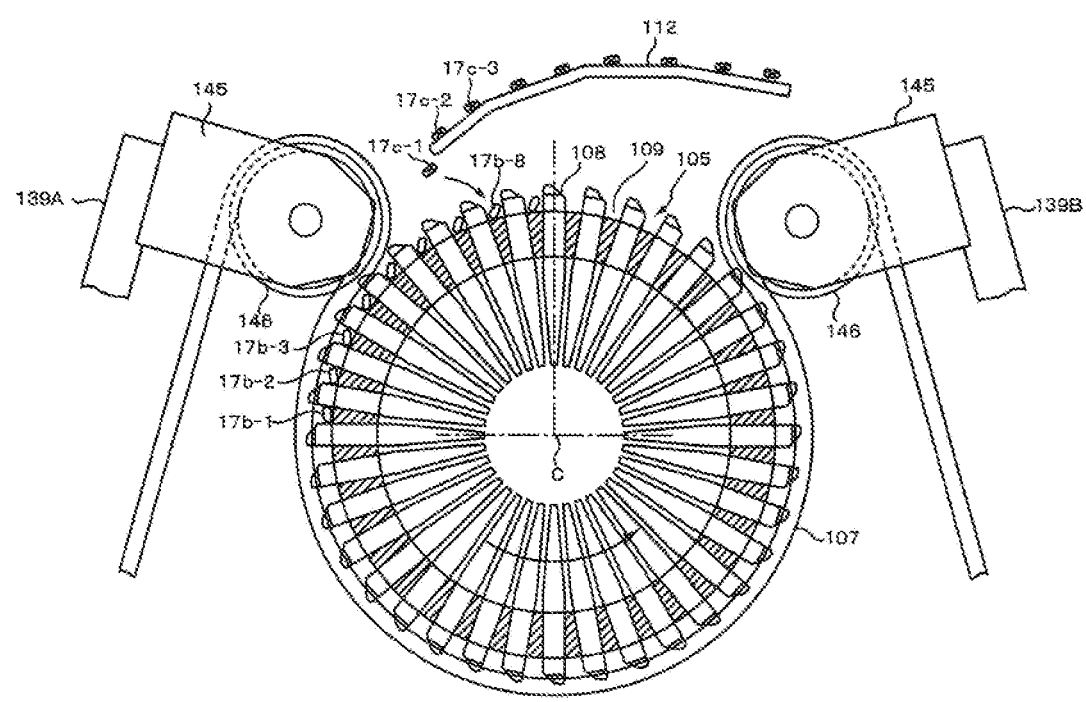
FIG. 24C is an essential part sectional view illustrating the state wherein a rear leg of the first coil segment is separated from a guide member and guided into the segment hold portion in the coil assembling section in the embodiment of FIG. 1.

FIG. 24C shows the conditions where the rear leg 17c-1 of the first coil segments 17S drops apart from the guide member 112. When the rear leg 17c-1 leaves from the guide member 112, the coil segment 17S rotates by the gravity around its front leg 17b-1 inserted in the segment hold portion 109 of the segment arrangement drum 105 as a fulcrum point, and thus the rear leg 17c-1 is automatically inserted into the segment hold portion 109 by its own weight. In other words, when the segment arrangement drum 105 rotates by a second predetermined angle corresponding to 8 slots that is the segment arrangement drum 105 rotates by the second predetermined angle corresponding to 8 segment hold portions 109, the rear leg 17c-1 is inserted into the segment hold portion 109. A relative angle of the front leg inserted in the segment hold portion 109 to the peripheral surface of the segment arrangement drum 105 is reduced depending upon the progress of the index rotation of the segment arrangement drum 105, that is, attitude of the front leg with respect to the peripheral surface of the segment arrangement drum 105 is inclined to close in parallel with the peripheral surface. In this embodiment, since there is 36 slots in one circuit, a 8 slot angle of the segment arrangement drum 105, that is the second predetermined angle, is 80 degrees. It should be noted however that this second predetermined angle differs depending on the coil width of the coil segment.

Figure 24D:
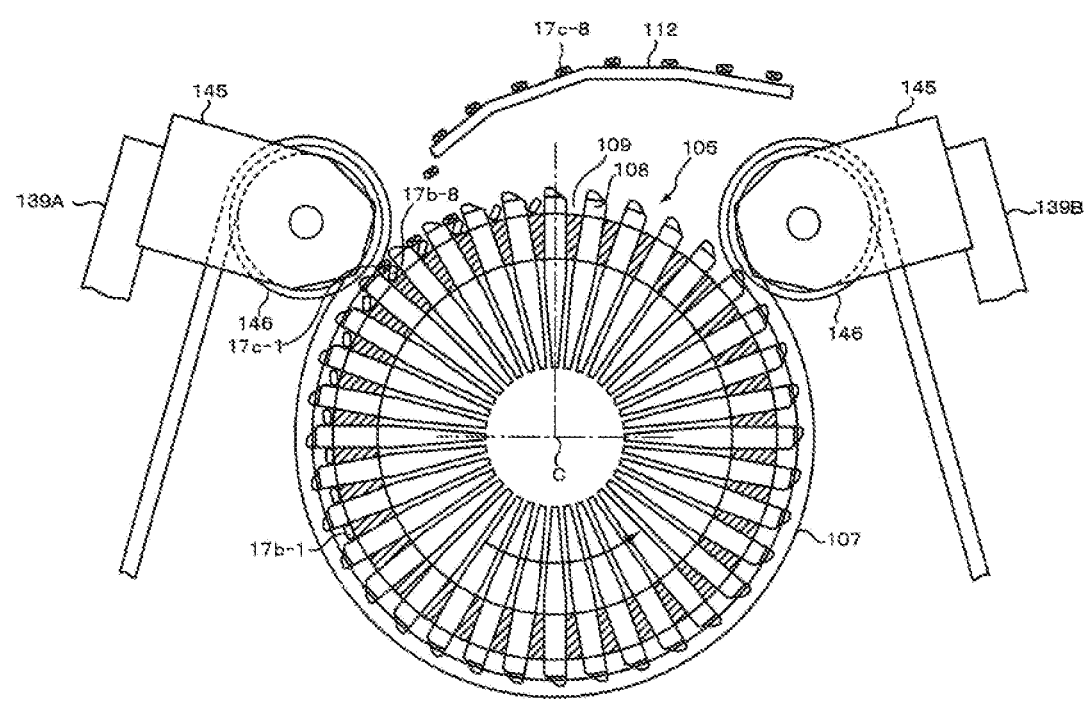
FIG. 24D is an essential part sectional view illustrating the state wherein the rear legs of the first to third coil segments are guided and inserted into the segment hold portions to ride on the front legs of the eighth to tenth coil segments, and a rear leg of the forth coil segment is separated from the guide member and guided into the segment hold portion, in the coil assembling section in the embodiment of FIG. 1.

FIG. 24D shows the conditions where the rear legs of the first to third coil segments 17S are guided and inserted in the segment hold portions to lay on the front legs of the eighth to tenth coil segments 17S, respectively, and the rear leg of the fourth coil segment 17S is left from the guide member 112. As will be seen in FIG. 24D, the rear leg 17c-1 of the first coil segment 17S is inserted and laid on the front leg 17b-8 of the eighth coil segment 17S for example. This operation is enabled because the coil segment 17s after the second bending has a shape capable of performing so-called lane change. That is, as shown in FIG. 24A, the coil segment 17S has the step 17a-1 formed on the linking portion 17a for deviating the rear leg 17c-1 to the radial outward direction of the segment arrangement drum 105. Therefore, the front leg 17b-1 of the first coil segment 17S is arranged in a first layer of the coil and the rear leg 17c-1 of this first coil segment 17S is arranged in a second layer of the coil.

Figure 24E:
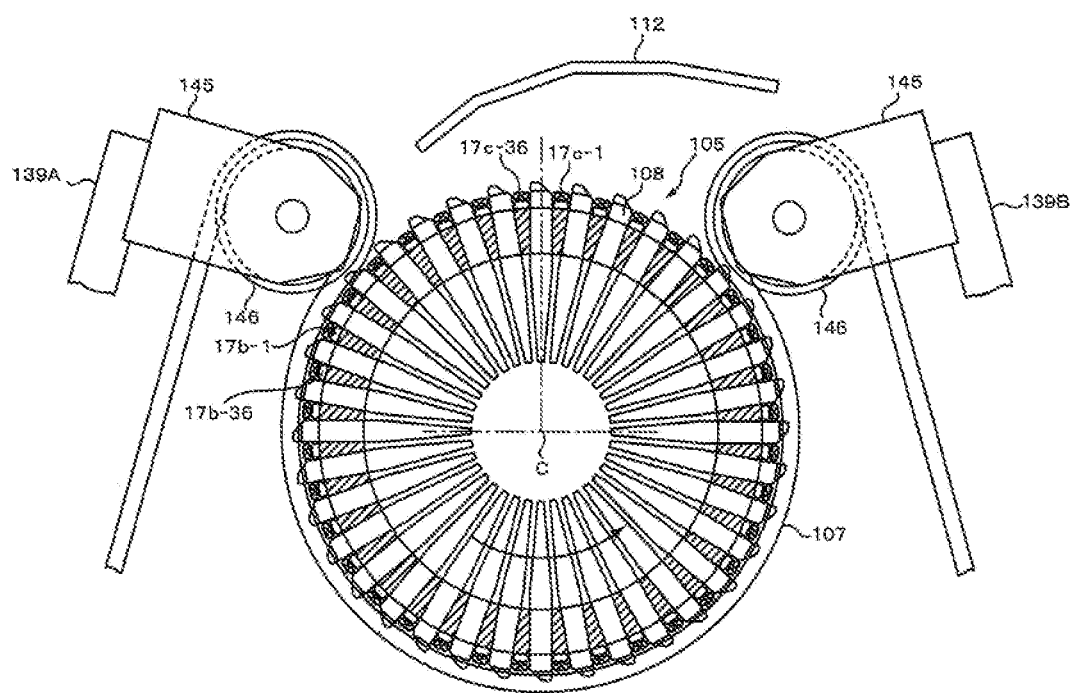
FIG. 24E is an essential part sectional view illustrating the state wherein the coil segments of a first loop are inserted into the segment hold portions in the coil assembling section in the embodiment of FIG. 1.
Figure 24F:
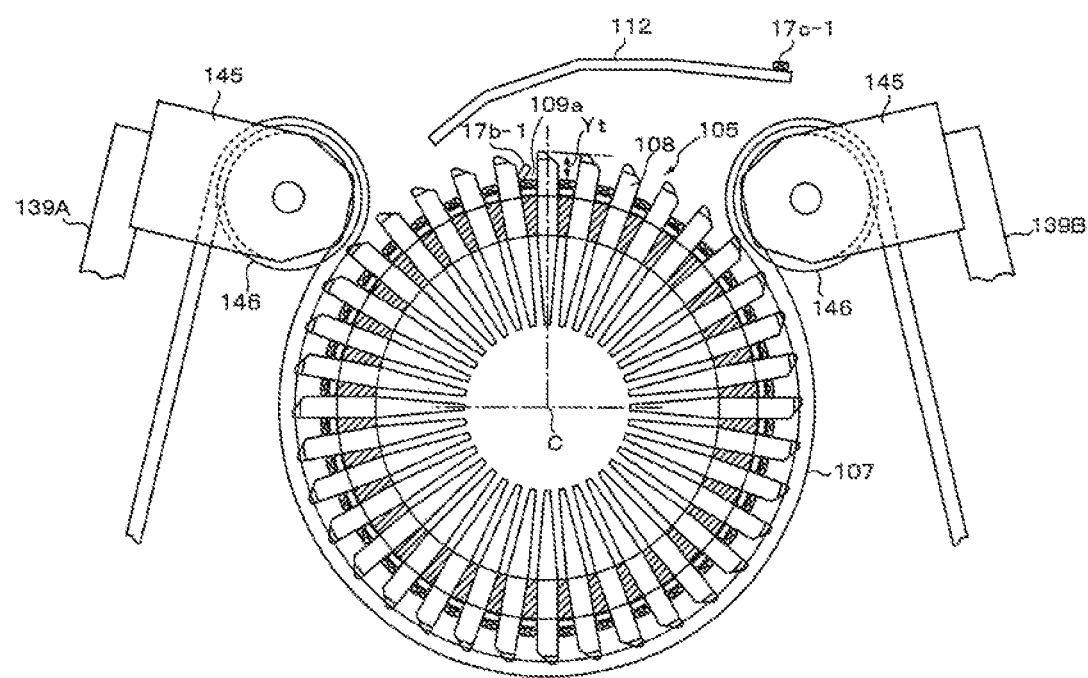
FIG. 24F is an essential part sectional view illustrating the state wherein the coil segments of the first loop are inserted into the segment hold portions and thereafter the front leg of the first coil segment of the second loop is inserted into the segment hold portion in the coil assembling section in the embodiment of FIG. 1.

When the insertion and arrangement operations of the rear legs of all the coil segments 17S with respect to the first round by performing the similar operations, arrangement of the two layers of the coil segments 17S is completed as shown in FIG. 24E. After the completion of the first round arrangement of all the coil segments 17S, insertion and arrangement operations of the second round coil segments 17S is started from its first segment as shown in FIG. 24F. Before the start of the insertion and arrangement operations of the second round coil segments 17S, each blade 108 is protruded to the radial outward direction from the segment arrangement drum 105. The protruded amount of the blade 108 is set to a height larger than the total thicknesses of the coil segments already inserted. A tolerance (height Yt) of the protruded amount of the blade 108 with respect to the total thicknesses of the coil segments inserted is within a range whereby the front leg and the rear leg of the coil segment 17S can be stably inserted and arranged and also additional insertion of new coil segment cannot be blocked, namely 4 mm for example.

When the protruding operation of the blade 108 is completed, the first front leg 17b-1 of the second round coil segment 17S is inserted into the segment hold portion 109a at the reference point, and the rear leg 17c-1 is laid on the guide member 112. Thereafter, the coil segments 17S are inserted and arranged as well as that in the first round, and when the segment arrangement drum 105 rotates one revolution, the insertion and arrangement operations of the coil segments of the second round are completed to form the four layers of the arranged coil segments 17S. If the protruded amount of the blade 108 is set to a height corresponding to the objective thickness of the layers from a beginning, the segment hold portion will become too deep causing smooth insertion operations to be blocked. Thus, the blade 108 is protruded in a stepwise fashion depending upon the thickness of the layers. Because the diameter of the peripheral surface of the segment arrangement drum 105 changes when the number of the layers is increased, an adjustment to keep the abutment pressure of the belt 107 to the blade 108 constant is performed in response to the protruding operation of the blade 108 as described later.

Figure 28:
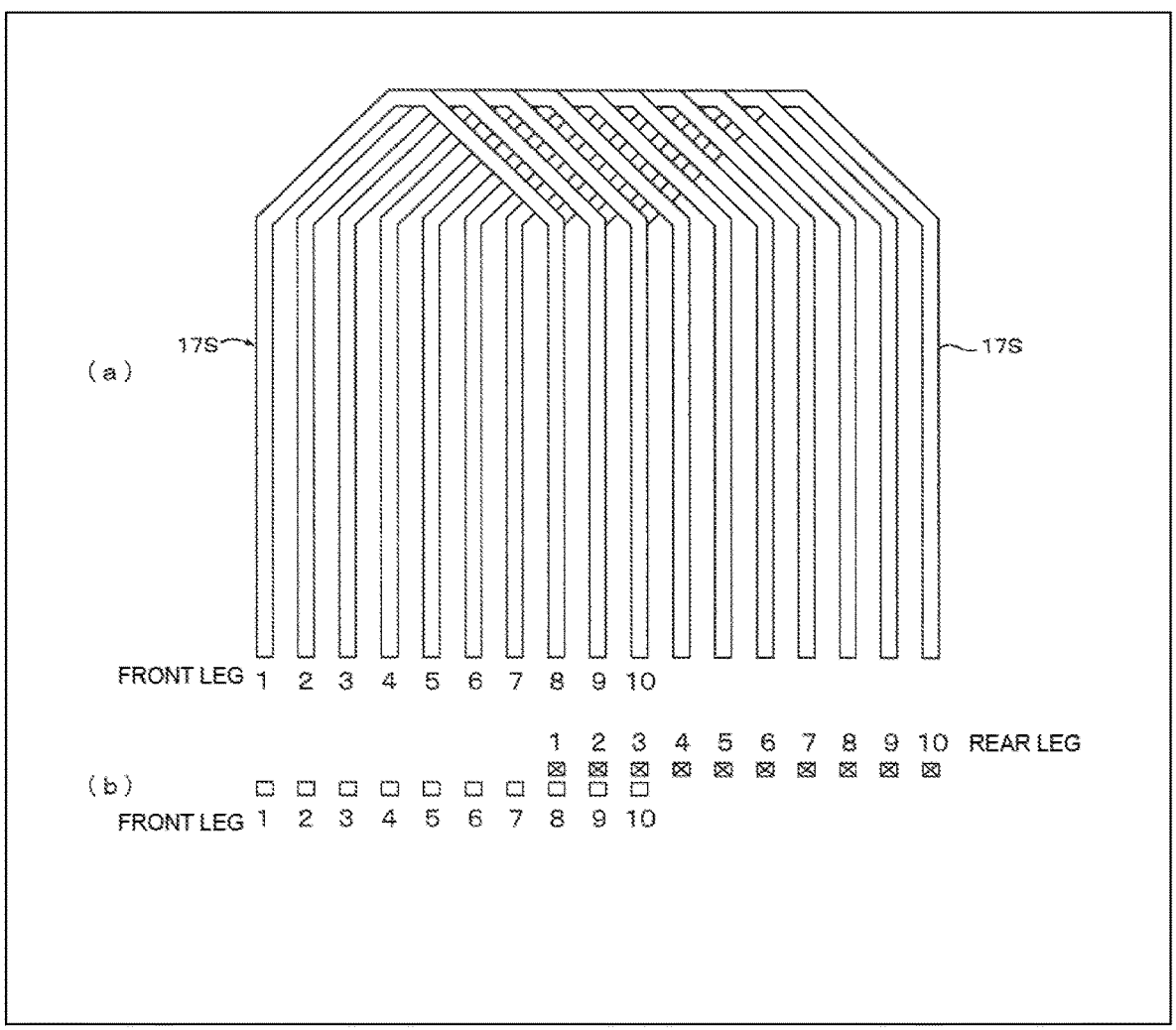
FIG. 28 is a developed view schematically illustrating assembling order of one kind of coil segment assembled in the coil assembling section in the embodiment of FIG. 1.

In the aforementioned embodiment, the coil segments supplied to the coil assembling section 2 are disposed to sequentially arrange in the same pattern the coil segments 17S with basically the same shape as shown in FIG. 28. That is, the rear legs of the first to third coil segments are laid on the front legs of the eighth to tenth coil segments, respectively when the ten coil segments are simply arranged and spread.

According to this embodiment, as aforementioned, the coil segments 17S to be formed, which were bent in the predetermined shape, are transported above the horizontally disposed segment arrangement drum 105 with keeping the horizontal state that is the state in the bending operation, and continuously inserted into the segment hold portion by rotating the segment arrangement drum 105 by a predetermined angle. Since the segment arrangement drum 105 is horizontally disposed and the coil segments 17S are guided from above the segment arrangement drum 105, if only the front leg of the coil segment 17S is guided to be inserted into the segment hold portion of the segment arrangement drum 105, the rear leg thereof will be automatically inserted into the segment hold portion by its own weight. Therefore, according to this embodiment, automation of the assembling process can be easier than that in the conventional apparatus, and a coil can be quickly and efficiently assembled.

Next, concrete constitution of the coil assembling section 2 in this embodiment will be described in detail with reference to FIG. 25 to FIG. 27 and FIG. 29 to FIG. 33.

Figure 30:
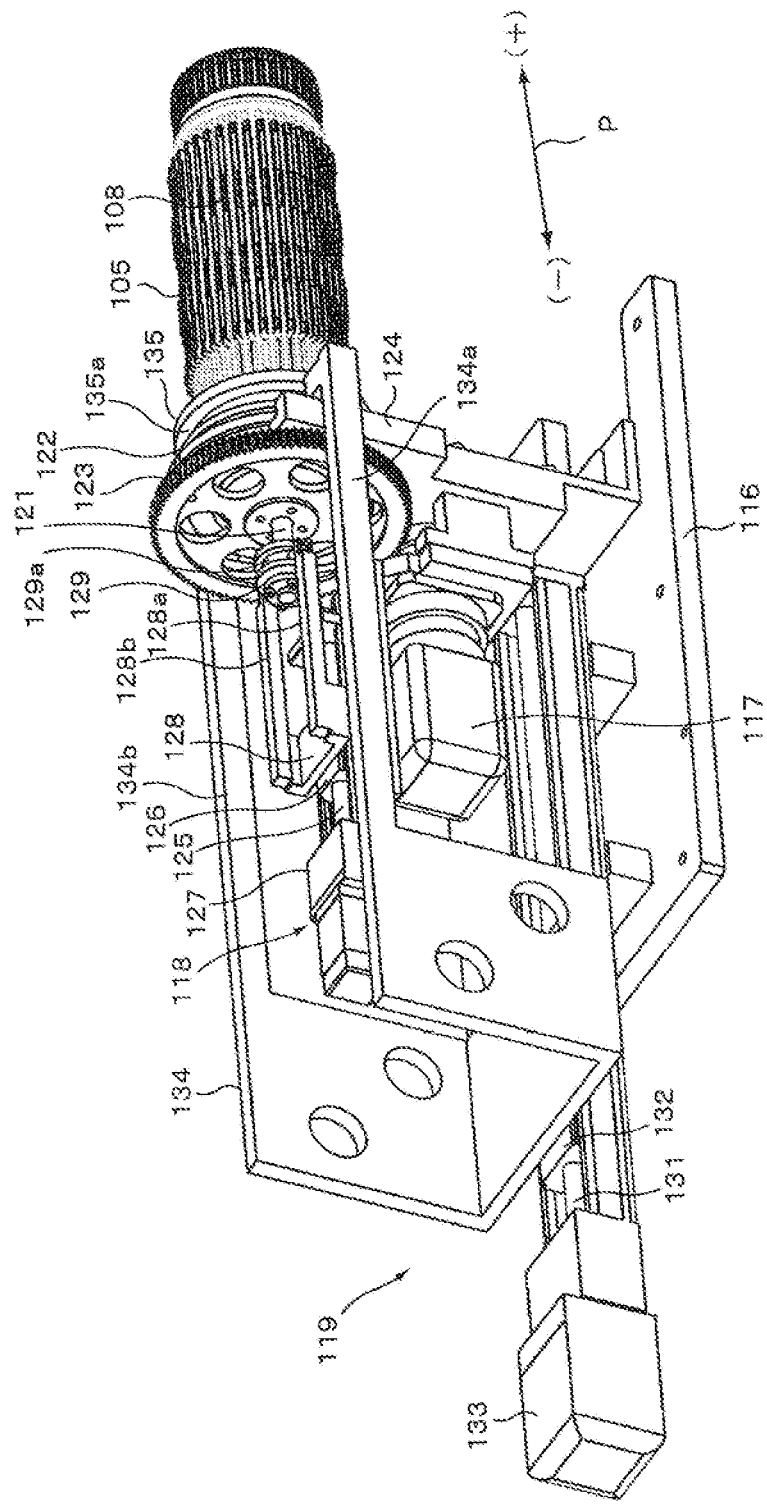
FIG. 30 is a perspective view schematically illustrating the constitution of a push-out mechanism and a blade adjustment mechanism of the coil assembling section in the embodiment of FIG. 1.

As shown in FIGS. 29 and 30, the coil assembling section 2 has a base 116, the segment arrangement drum 105 rotatably supported by and arranged on the base 116 so that the rotation axis 121 of the drum 105, which is a center axis of rotation, is horizontally retained, the separation preventing means 106 provided with the belt 107, a servomotor 117 that is a drive source for rotationally driving the segment arrangement drum 105, a blade adjustment mechanism 118 for changing the protruded amount of the blade 108, a push-out mechanism 119 for pushing out, in the axial direction of the segment arrangement drum 105, an assembled coil consisting of the predetermined number (36 in the above-mentioned embodiment) of coil segments inserted and held in the respective segment hold portions 109 annularly arranged in the segment arrangement drum 105, a work support base 120 arranged on the opposite side of the push-out mechanism 119 in between the segment arrangement drum 105, the aforementioned segment transport means 110, and a guide member 112 constituted in a single step.

The segment arrangement drum 105 is supported so as to be rotatable around the rotation axis 121 as a center of rotation. A disk-shaped bearing 122 for supporting the rotation axis 121 is arranged on the opposite side of the assembled coil push-out direction (P(+) direction) of this segment arrangement drum 105, and a large diameter gear 123 is coaxially fixed to the rotation axis 121. A small diameter gear (not shown) fixed to a rotation axis of the servomotor 117 is meshed with this large diameter gear 123. Thus, when the servomotor 117 rotates, the segment arrangement drum 105 is rotationally driven via the rotation axis, the small diameter gear and the large diameter gear 123. Due to the reduction gear mechanism of these small diameter gear and large diameter gear 123, it is possible to improve the precision of the index rotation of the segment arrangement drum 105 driven by the servomotor 117.

The bearing 122 is supported by a receiving portion 124 having a bottom fixed to the base 116, and thereby the segment arrangement drum 105 is cantilever-supported. Since portions of the segment arrangement drum 105, for arranging the coil segments 17S are held by the separation preventing means 106 as aforementioned, it is possible to stably rotate this segment arrangement drum 105. An index rotation mechanism for rotating the segment arrangement drum 105 by a predetermined angle (first predetermined angle) every time when the front leg 17b of the coil segment 17S is arranged is configured by the servomotor 117, the rotation axis of the servomotor 117, the small diameter gear fixed to this rotation axis, the large diameter gear 123 meshed with this small diameter gear, and a control unit 49 that will be mentioned later for controlling the servomotor 117.

Figure 31:
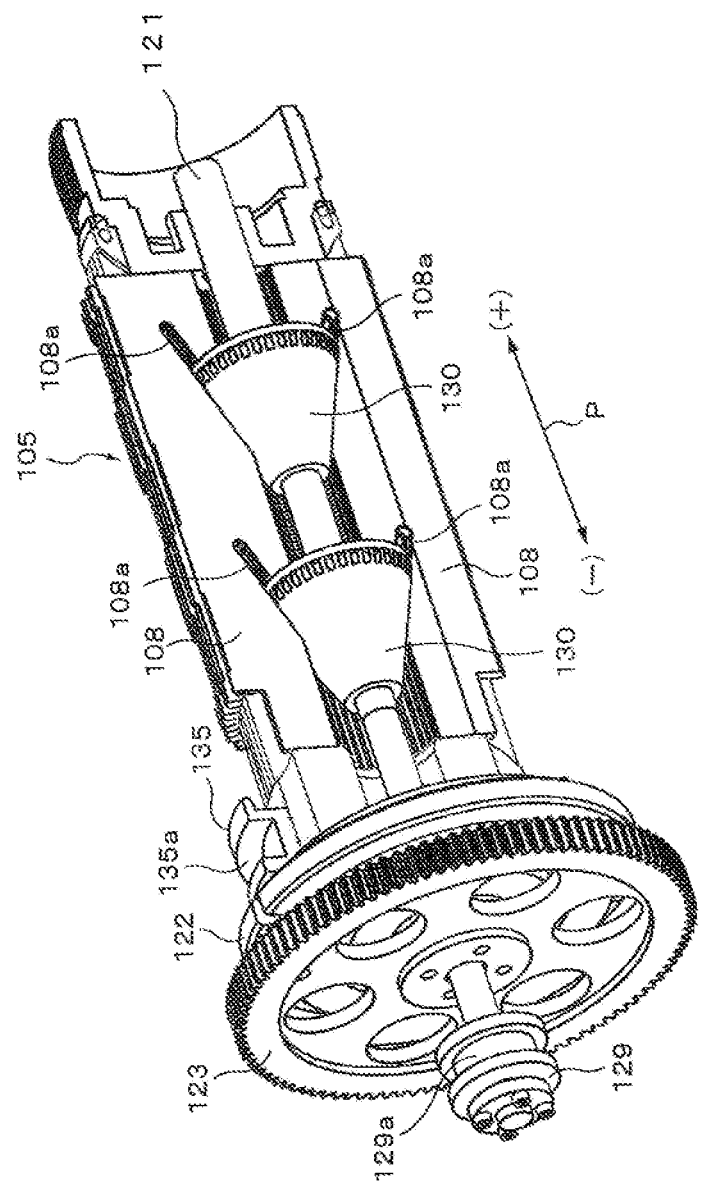
FIG. 31 is a partially broken-out perspective view schematically illustrating a part of constitution of the blade adjustment mechanism of the coil assembling section in the embodiment of FIG. 1.

As shown in FIGS. 30 and 31, the blade adjustment mechanism 118 has a ball screw portion 125 provided with a rotation axis that is parallel to the rotation axis 121 of the segment arrangement drum 105, a nut portion 126 meshed with this ball screw portion 125 and slidable in P(−) and P(+) directions parallel to the rotation axis, a servomotor 127 for rotationally driving the ball screw portion 125, a slide member 128 provided with a base portion fixed to the nut portion 126, for sliding in P(−) and P(+) directions in response to the rotation of the ball screw portion 125, an engagement portion 129 fixed to the rotation axis 121, for engaging with a convex top end portion of the slide member 128, and a plurality of (two in the example shown) hollow conical cams 130 (FIG. 31) located inside of the segment arrangement drum 105 and fixed to the rotation axis 121.

The slide member 128 has a base portion fixed to the nut portion 126, and a pair of arms 128a and 128b parallel to each other and extended along the ball screw portion 125 from this base portion. A pair of convex portions 129 protruded to the inside are formed at the top of the pair of arms 128a and 128b, respectively. The pair of convex portions 129 engage in cam follower manner with an annular groove 129a of an engagement portion 129. Thus, the slide member 128 and the engagement portion 129 are being coupled with a low friction even when both the rotation axis 121 and the engagement portion 129 rotate. As a result, when the servomotor 127 and the ball screw portion 125 rotate and thus the nut portion 126 and the slide member 128 slide along the ball screw portion 125, the rotation axis 121 moves to the sliding direction depending on the sliding.

As shown in FIG. 31, a groove 108a obliquely extended is formed on each of the blades 108 of the segment arrangement drum 105, and the conical cam 130 is inserted slidably in the groove 108a. Thus, when the servomotor 127 rotates and the rotation axis 121 moves to the P(−) direction, the blade 108 projects towards the radial outward direction of the segment arrangement drum 105. When the rotation axis 121 moves to the P(+) direction, the blade 108 will be drawn towards the radial inward direction of the segment arrangement drum 105. The protruded amount of the blade 108 can be adjusted by thus controlling the rotation amount and the rotation direction of the servomotor 127.

The push-out mechanism 119 has, as shown in FIG. 29, a ball screw portion 131 provided with a rotation axis that is parallel to the rotation axis 121 of the segment arrangement drum 105, a nut portion 132 meshed with this ball screw portion 131 and slidable in P(−) and P(+) directions parallel to the rotation axis, a servomotor 133 for rotationally driving the ball screw portion 131, a slide member 134 fixed to the nut portion 132, for sliding in P(−) and P(+) directions in response to the rotation of the ball screw portion 131, and a press ring 135 arranged on the peripheral surface of the segment arrangement drum 105 and slidable in the axial direction (P(−) and P(+) directions), for engaging with the slide member 134.

The slide member 134 has a base portion fixed to the nut portion 132, and a pair of arms 134a and 134b parallel to each other and extended along the ball screw portion 131 from this base portion. A pair of convex portions protruded to the inside are formed at the top of the pair of arms 134a and 134b, respectively. The pair of convex portions engage in cam follower manner with an annular groove 135a of an engagement portion 135. Thus, the slide member 134 and the press ring 135 are being coupled with a low friction even when the press ring 135 rotates due to the friction between the peripheral surface of the segment arrangement drum 105 and the press ring 135. As a result, when the servomotor 133 and the ball screw portion 131 rotate and thus the nut portion 132 and the slide member 134 slide along the ball screw portion 131, the segment arrangement drum 105 moves to the sliding direction depending on the sliding.

The work support base 120 has a base portion 136, a work carrying portion 138 provided with a V-shaped concave portion 138a fixed to the base portion 136 via a prop 137, and a pair of rails 136a formed at both sides on the top surface of the base portion 136.

Figure 32:
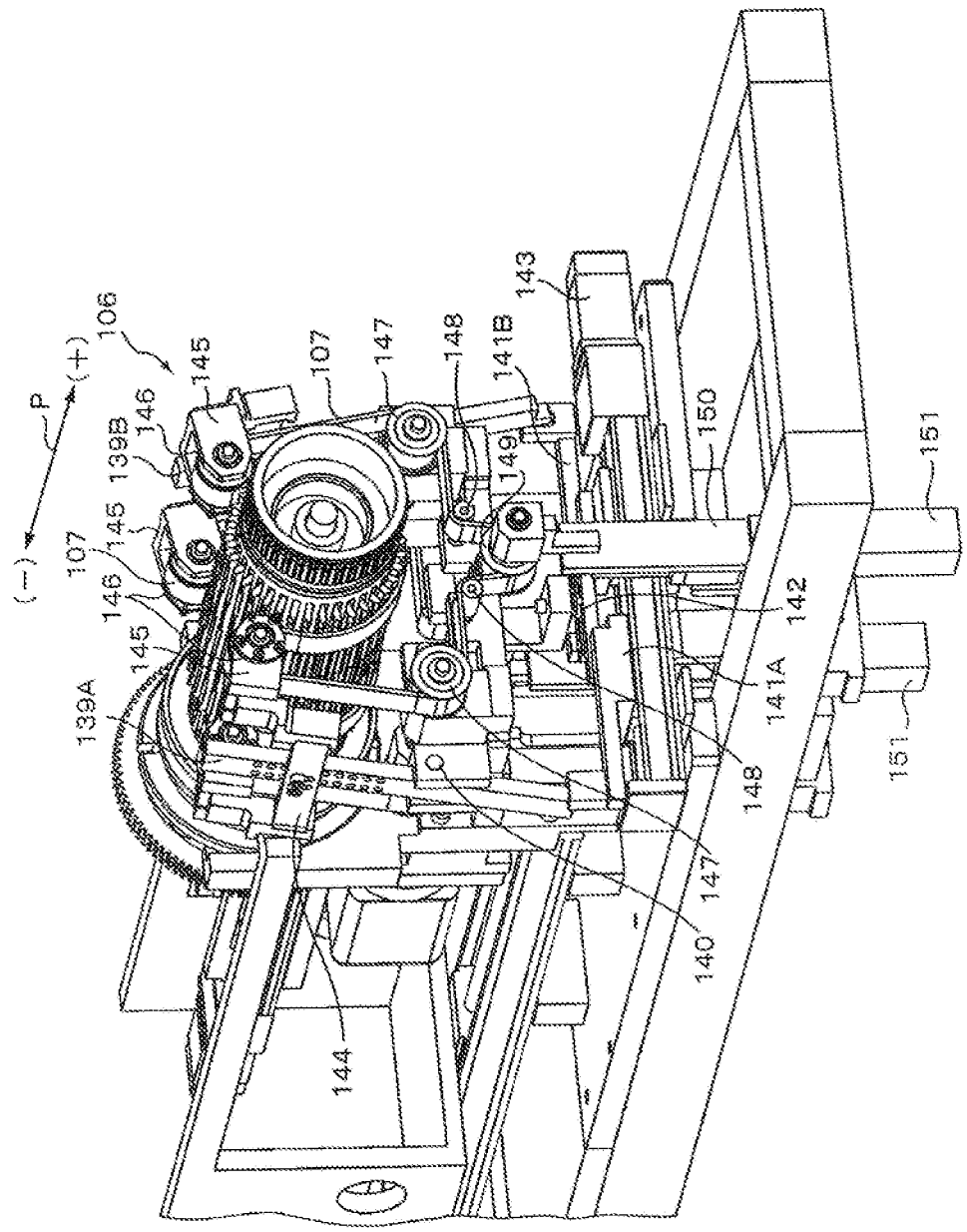
FIG. 32 is a schematic perspective view illustrating the constitution of a separation preventing means of the coil assembling section in the embodiment of FIG. 1.
Figure 33:
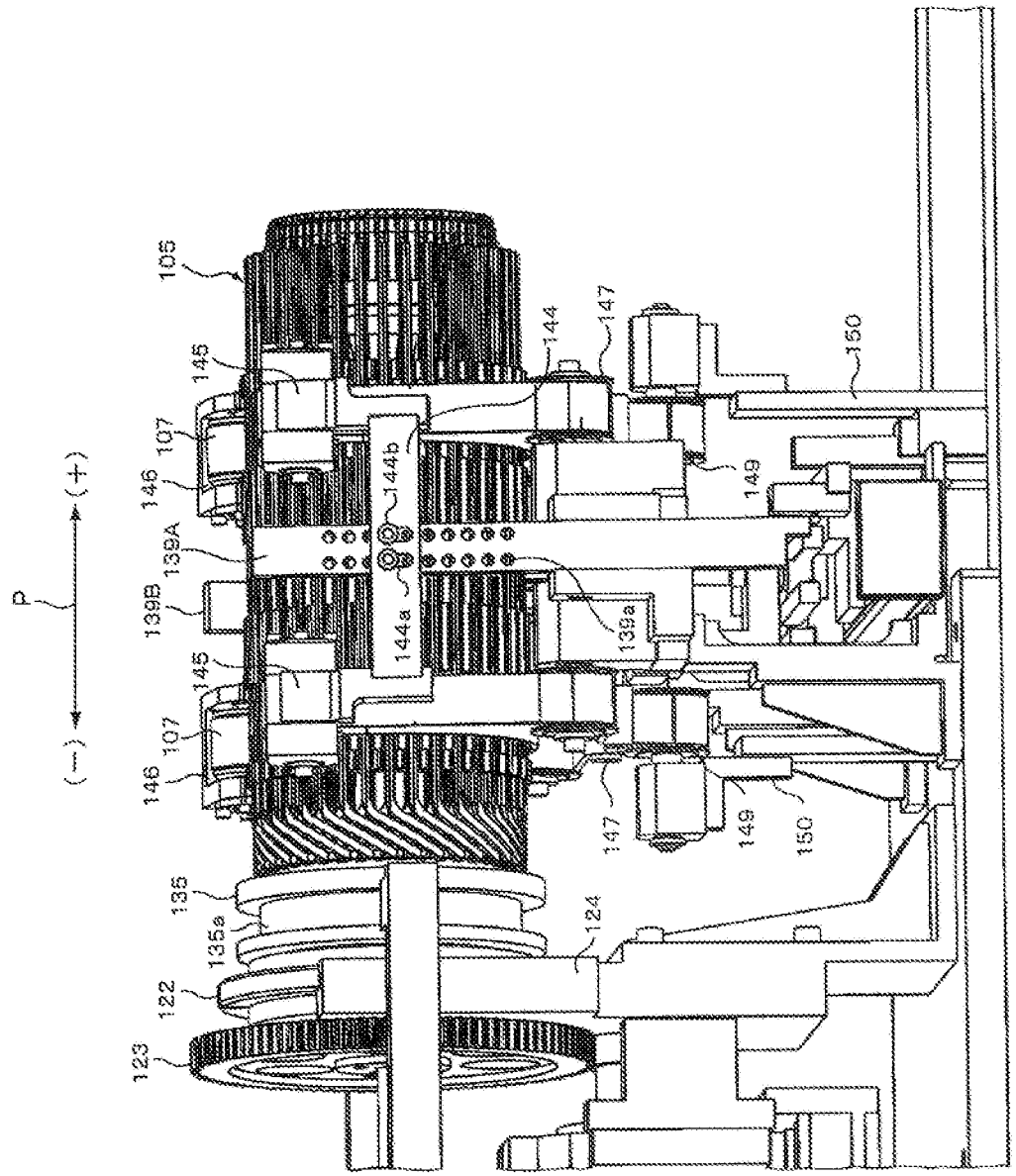
FIG. 33 is a perspective view schematically illustrating the constitution of the separation preventing means of the coil assembling section in the embodiment of FIG. 1.

The separation preventing means 106 has, as shown in FIGS. 32 and 33, a pair of arms 139A and 139B extended to up-and-down direction and arranged on the radial side of the segment arrangement drum 105 on the opposite side with each other in between this segment arrangement drum 105. The pair of arms 139A and 139B are rotatably supported around axes 140 provided approximately at the centers as arm fulcrums, respectively, so that their upper end portions can abut to and leave from the peripheral surface of the segment arrangement drum 105. The lower end portion of the arm 139A is coupled via a cam follower with a rack member 141A sliding in the direction perpendicular to the P(−) and P(+) directions, and the lower end portion of the arm 139B is coupled via a cam follower with a rack member 141B sliding in the direction perpendicular to the P(−) and P(+) directions. The rack member 141A and the rack member 141B are meshed with a pinion gear 142 so as to be coupled together via the pinion gear 142. The rack member 141A is coupled with the servomotor 143. Thus, in response to the rotation of the servomotor 143, not only the rack member 141A but also the rack member 141B slide, and therefore the pair of arms 139A and 139B synchronously rotate.

A pair of horizontal bars 144 is fixed to the upper portions of the pair of arms 139A and 139B so as to perpendicularly intersect with these arms, respectively. A pair of holders 145 is fixed respectively to the both end portions of each of the pair of horizontal bars 144. That is, two pairs of holders 145 are attached to the both end portions of the pair of horizontal bars 144. Two pairs of movable pulleys 146 for belts are rotatably supported by the se two pairs of holders 145, respectively. Two fixed pulleys 147 are rotatably supported by a frame of the separation preventing means 106, two small diameter fixed pulleys 148 are rotatably supported by the frame, and a tension pulley 149 is rotatably supported by the frame between the small diameter fixed pulleys 148. Another set of the two fixed pulleys 147, the two small diameter fixed pulleys 148 and the tension pulley 149 corresponding to another pair of movable pulleys 146 is formed.

One of the pair of belts 107 arranged along the rotation axis of the segment arrangement drum 105 is stretched around the movable pulley 146 fixed to the holder 145, the two fixed pulleys 147, the two small diameter fixed pulleys 148 and the tension pulley 149 to cover the lower peripheral surface of the segment arrangement drum 105. The tension pulley 149 is connected to an air cylinder 151 via its support shaft 150. The contact pressure or abutment pressure of the belt 107 against the peripheral surface of the segment arrangement drum 105 can be variably adjusted by operating the air cylinder 151 to displace the tension pulley 149 in the up-and-down direction. The other one of the pair of belts 107 has the similar constitutions and operates similarly.

A plurality of screw holes 139a separated in the up-and-down direction from each other are formed in two rows in each of the pair of arms 139A and 139B to adjust the fixing position of the horizontal bar 144 in the up-and-down direction. As shown in FIG. 33, two long-hole shaped fixing holes 144a extended in the up-and-down direction are formed on each of the horizontal bars 144. The horizontal bars 144 are fixed to the arm 139A or 139B to be finely adjustable in the up-and down direction by means of screws 114b inserted through these fixing holes 144a, respectively. By adjusting the fixing position of the horizontal bars 144 in the up-and down direction, it is possible to respond to possible change in the diameter of the segment arrangement drum 105. Adjustment of the contact pressure of the pair of belts 107 against the peripheral surface of the segment arrangement drum 105 can be performed by independently adjusting the contact pressure of each belt.

Hereinafter, constitutions and operations of inserting a coil assembled in the segment arrangement drum 105 in the manufacturing apparatus of the electrical rotating machine of this embodiment into a core 152 will be described.

Figure 34:
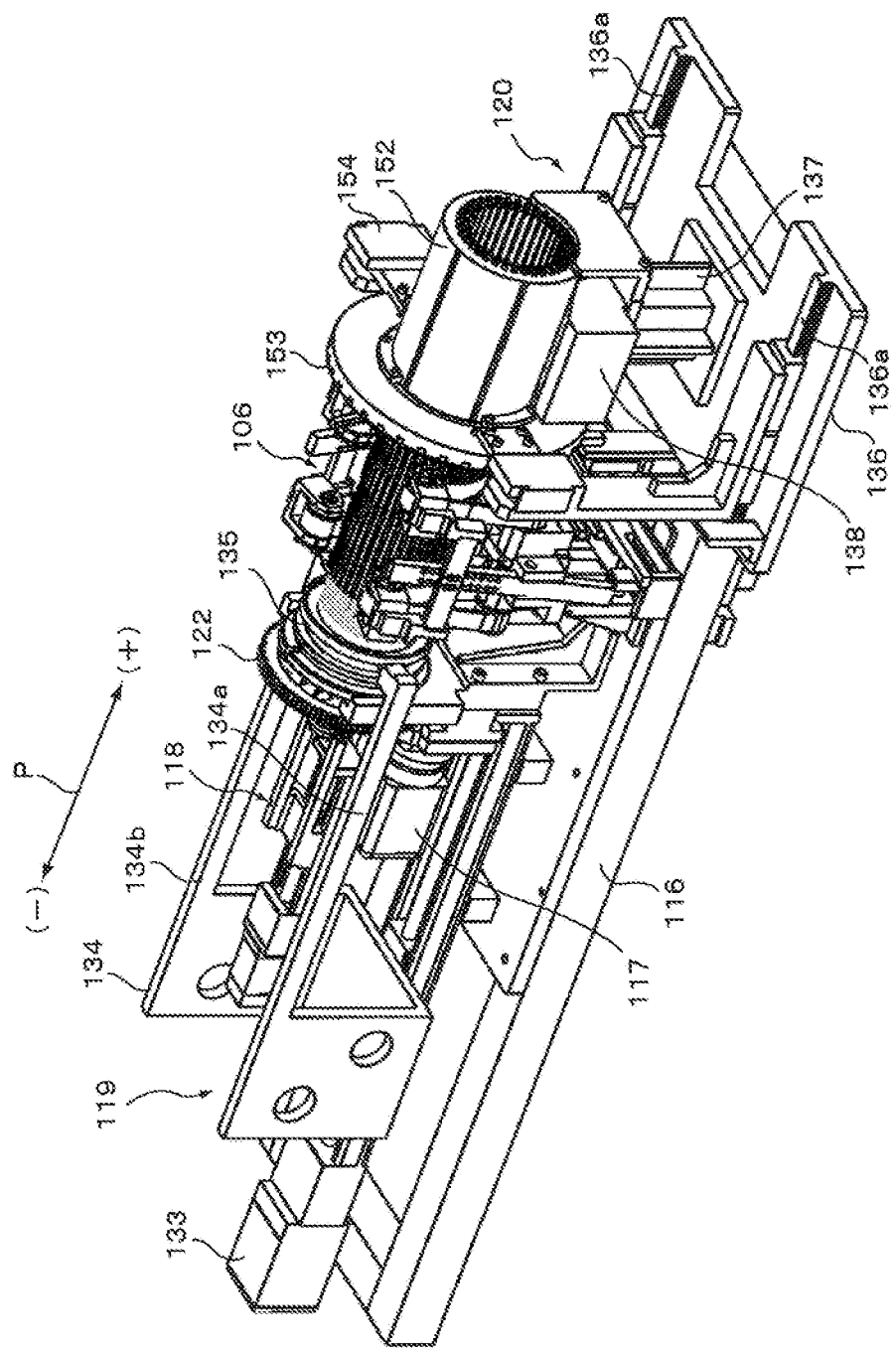
FIG. 34 is a perspective view schematically illustrating the state wherein a work support base and the coil assembling section are connected together in the manufacturing apparatus of electrical rotating machine in the embodiment of FIG. 1.

In the coil assembling section 2, assembling of coil is performed as aforementioned by arranging the plurality of coil segments 17S on the peripheral surface of the segment arrangement drum 105. Then, the assembled coil is inserted into the core 152 of the rotating electrical machine. In this process, at first, the work support base 120 on which the core 152 is set is coupled to the base 116 in the coil assembling section 2. FIG. 34 indicates the conditions where the core 152 is set on the work support base 120, and then the work support base 120 is coupled with the base 116 so that the assembled coil on the segment arrangement drum 105 can be inserted into the core 152. That is, the core 152 is placed on a work carrying portion 138 under the state where the work support base 120 is separated from the base 116, and then a cuffs supporter 154 for supporting an insertion guide unit 153 is moved along the rails 136a from P(−) direction of the work support base 120 to couple the ring-shaped insertion guide unit 153 with the core 152. Thereafter, the work support base 120 is coupled with the base 116 of the coil assembling section 2 so that the insertion guide unit 153 opposes to the segment arrangement drum 105. In FIG. 34, the guide member 112 is omitted from showing.

Figure 35:
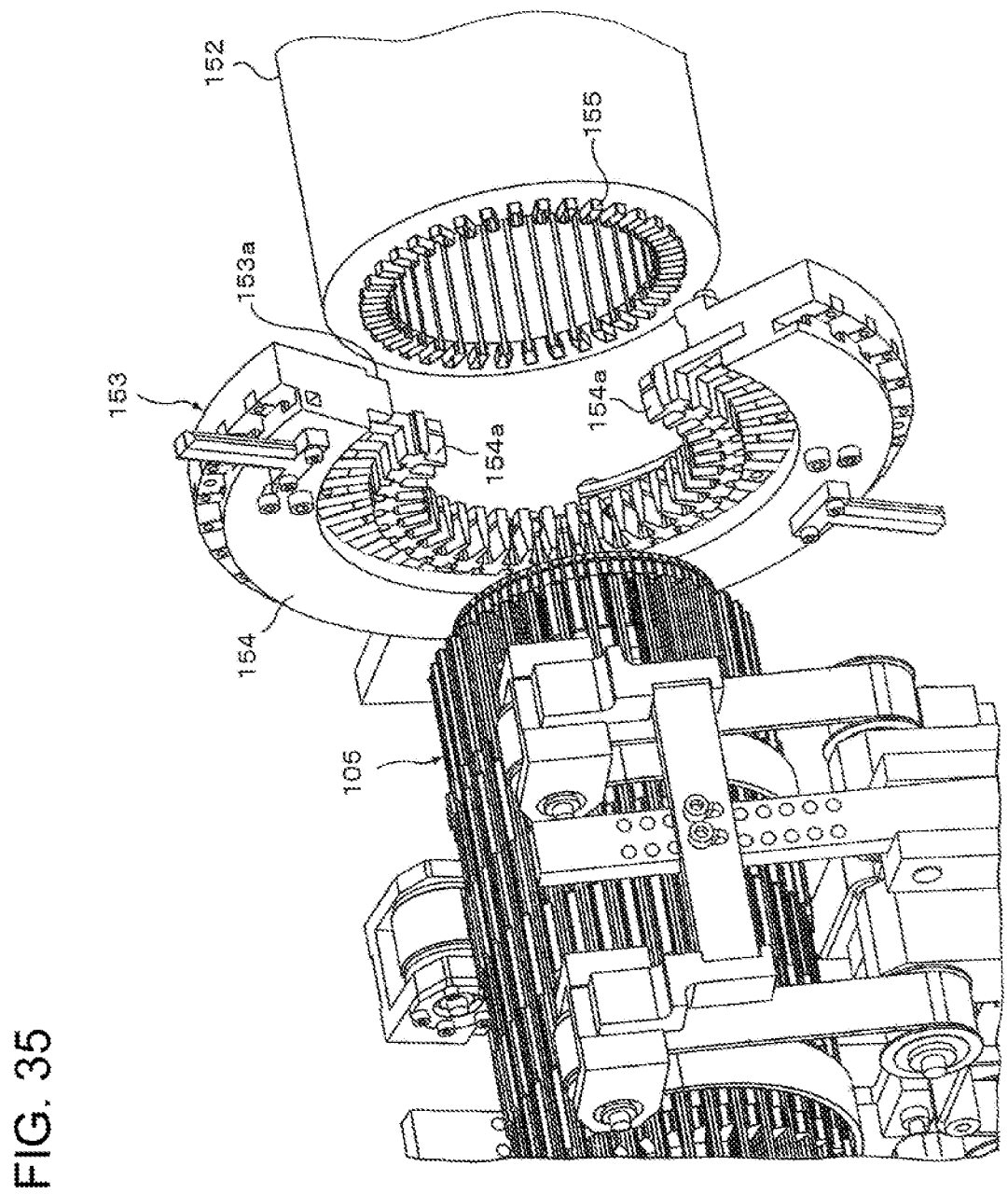
FIG. 35 is an exploded perspective view schematically illustrating the constitution for inserting an assembled coil into a core in the manufacturing apparatus of electrical rotating machine in the embodiment of FIG. 1.

The insertion guide unit 153 has, as shown in FIG. 35, the cuffs supporter 154 on the surface facing to the segment arrangement drum 105 and a concave portion 153a fitted with the core 152 on the opposite surface. The cuffs supporter 154 is used to protect a cuffs portion 155 made of an insulation paper inserted in each slot of the core 152. The cuffs portion 155 of the core 152 is inserted between a plurality of radial projections 154a arranged along the circumferential direction, respectively. The plurality of projections 154a can simultaneously slide in the radial direction by a drive mechanism not shown.

In the segment arrangement drum 105, when a predetermined number of layers consisting of a predetermined number of the coil segments 17S are inserted to complete the coil assembling, a servomotor 133 in the push-out mechanism 119 is rotated to move a slide member 134 to the P(+) direction so as to move a press ring 135 to the P(+) direction along the peripheral surface of the segment arrangement drum 105. A concave portion (not shown) for housing along entire circumferential direction the coil end portion (linking portion) of the assembled coil is formed in the P(+) direction side of the press ring 135. The assembled coil of which coil end portion is held inside of this concave portion is moved along the peripheral surface of the segment arrangement drum 105, and then the coil end portion (linking portion) of the assembled coil is inserted into the insertion guide unit 153 as shown in FIG. 36. That is, end portions of the front leg and the rear leg of each coil segment 17S are inserted between projections 154a of the insertion guide unit 153, respectively. The servomotor 133 is stopped its rotation to stop the movement of the press ring 135 just before the coil end portions (linking portion) of the assembled coil interfere with the blades 108 of the segment arrangement drum 105, or just before the press ring 135 abuts against the separation preventing means 106.

The segment arrangement drum 105 is supported at both ends by inserting the coil end portion (linking portion) of the assembled coil into the insertion guide unit 153. While the segment arrangement drum 105 is supported at both ends, the servomotor 117 of the blade adjustment mechanism 118 is rotated to move the slide member 128 (FIG. 30) to the P(+) direction so that no blade 108 protrudes from the peripheral surface of the segment arrangement drum 105, that is the blades 108 retreat to the position where the movement of the press ring 135 is not disturbed. Then, a servomotor 143 (FIG. 32) of the separation preventing means 106 is rotated to open the two pairs of arms 139A and 139B so as to leave from the peripheral surface of the segment arrangement drum 105 to the radial outward direction, and thus the abutment of the belt 107 against the segment arrangement drum 105 is released. Thereafter, the separation preventing means 106 is lowered down so that the movement of the press ring 135 is not disturbed.

Figure 37:
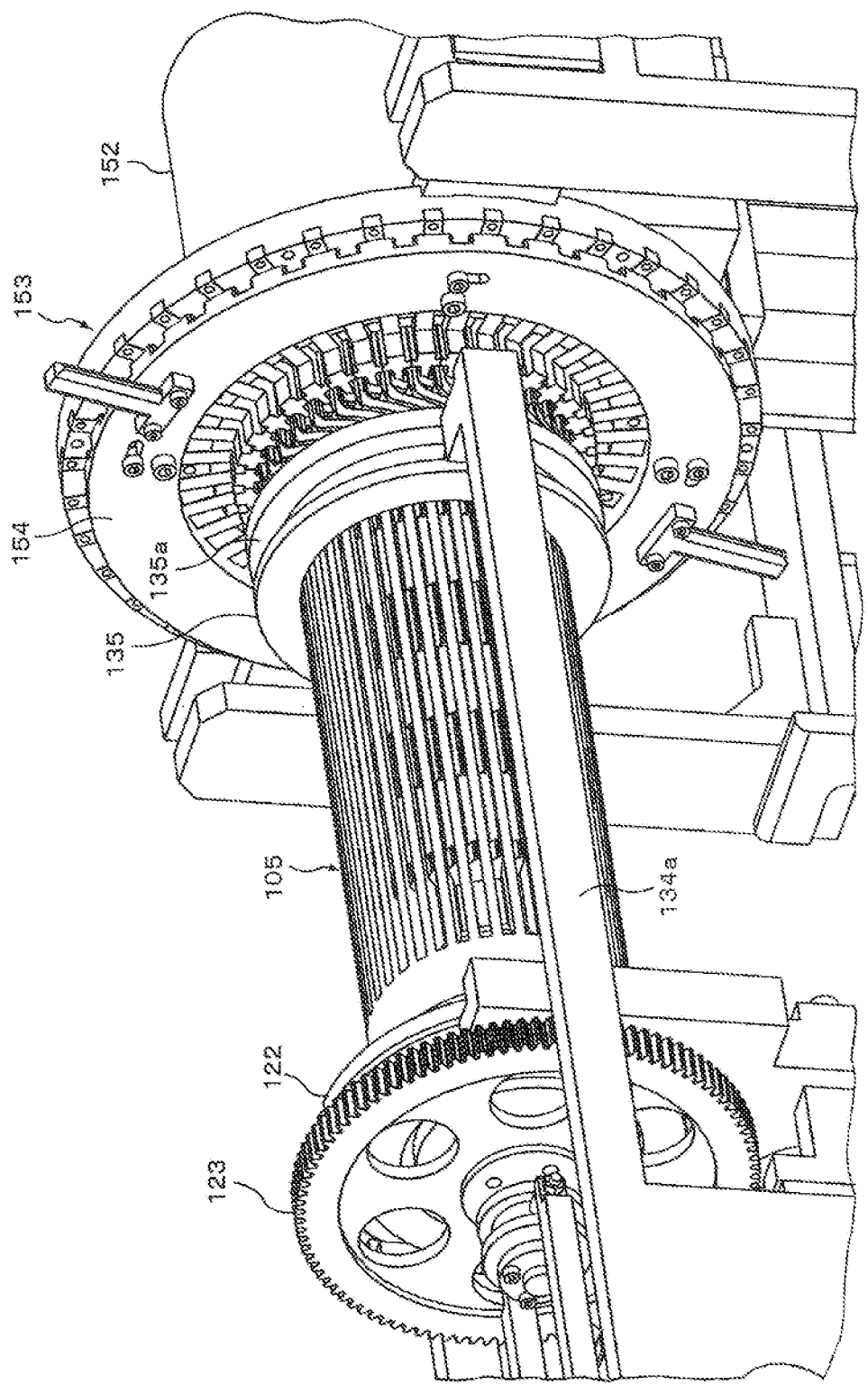
FIG. 37 is a perspective view schematically illustrating the state just before insertion of the assembled coil into the core is completed in the manufacturing apparatus of electrical rotating machine in the embodiment of FIG. 1.
Figure 38:
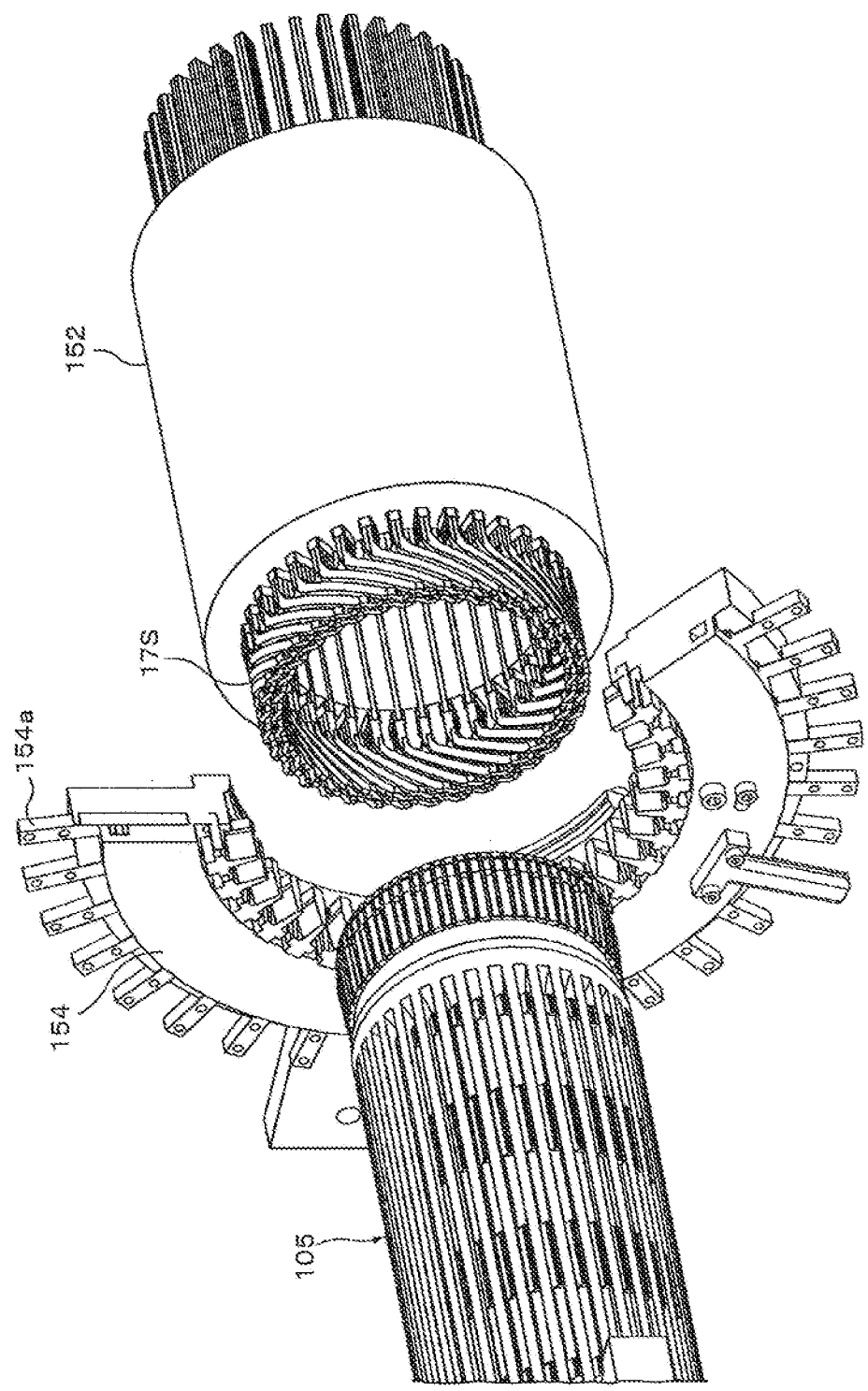
FIG. 38 is an exploded perspective view schematically illustrating the state wherein the insertion of the assembled coil into the core is completed in the manufacturing apparatus of electrical rotating machine in the embodiment of FIG. 1.

After the separation preventing means 106 is completely lowered, the press ring 135 is moved to the P(+) direction so that the insertion of the assembled coil into the core 152 is processed. As shown in FIG. 37, the movement of the press ring 135 is stopped just before the coil end portions (linking portion) of the assembled coil abut to the cuffs supporter 154. Then, as shown in FIG. 38, all the projections 154a of the cuffs supporter 154 are moved to the radial outward direction, and thereby the cuffs supporter 154 is outwardly opened.

Thereafter, the press ring 135 is advanced at a predetermined position, and the movement of the press ring 135 is stopped just before the coil end portions (linking portion) of the assembled coil abut to the cuffs supporter 154. The stoppage timing of the movement of the press ring 135, and the stoppage timing of the predetermined distance advance of the press ring 135 after the opening of the cuffs supporter 154 are controlled based on values preliminarily stored in a memory of the control means 49. After completion of the insertion, the press ring 135 is returned to an original position (initial position) by the operation of the push-out mechanism 119. FIG. 38 indicates the conditions after completion of the insertion of the assembled coil into the core 152.

As aforementioned in detail, according to the coil assembling section 2 of this embodiment, the assembled coil that is assembled by arranging the plurality of coil segments on the segment arrangement drum 105 can be inserted into the core 152 by pushing out the assembled coil to the axial direction of the segment arrangement drum 105. Therefore, process of changing the jig and the core after having pulled up the segment assembly from the jig, and process of inserting the segment assembly into the changed core are not necessary to perform, resulting the work efficiency in the fabrication of the electrical rotating machine to extremely improve. In other words, according to the constitution of this embodiment, when the assembling of the coil segments is completed, the segment assembly can be promptly inserted into the core 152 as it is resulting that unnecessary time for changing the jig and the core can be omitted.

Next, an electrical configuration of the coil assembling section 2 will be described. In this embodiment, the coil assembling section 2 has the index rotation drive mechanism of the segment arrangement drum 105, the separation preventing means 106, the segment transport means 110, the blade adjustment mechanism 118 and the push-out mechanism 119. An amplification and drive circuit of the servomotor 117 in the index rotation drive mechanism, an amplification and drive circuit of the servomotor 143 for opening and closing the pair of arms 139A and 139B in the separation preventing means 106, an amplification and drive circuit of the servomotor 161 for rotating the chucking portion 111 in the segment transport means 110, an amplification and drive circuit of the servomotor 127 for adjusting the protruded amount of the blades 108, an amplification and drive circuit of the servomotor 133 for pushing out the assembled coil, and a drive circuit of the air cylinders 151 and 167 are connected to an optical communication cable 51. Signal lines from encoders mechanically coupled with the plurality of servomotors are connected to the plurality of amplification and drive circuits, respectively.

Figure 39:
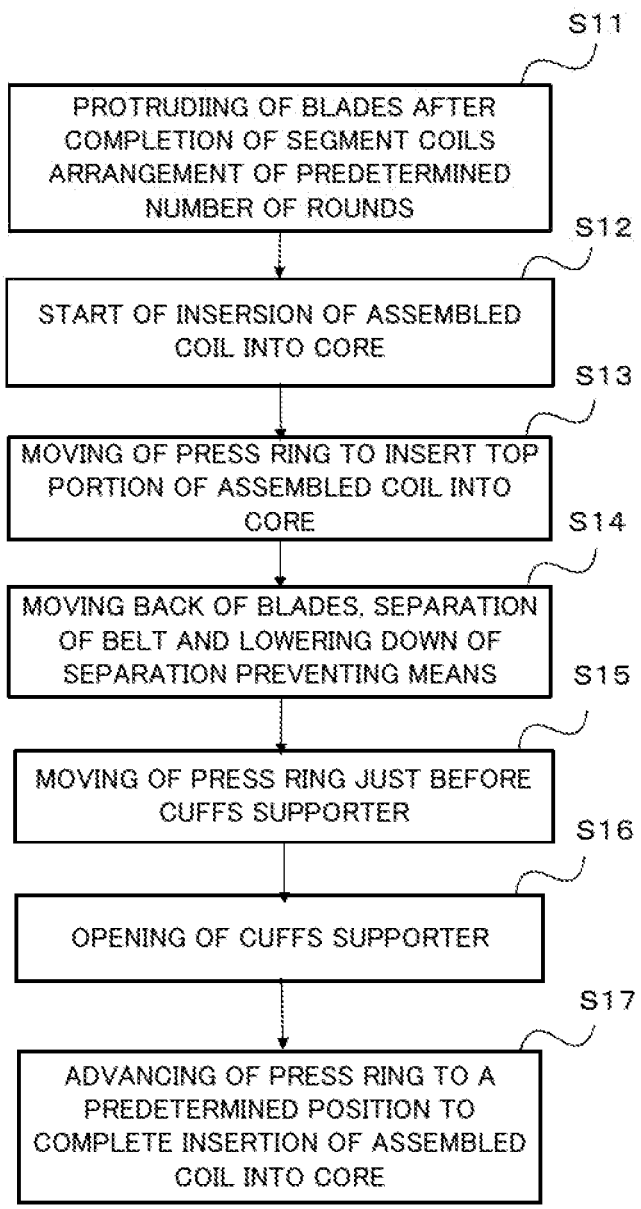
FIG. 39 is a flowchart schematically illustrating control processes of the coil assembling section in the embodiment of FIG. 1.

The PLC 46 and the second NC controller 48 control insertion operations of the coil segments and insertion operations of the assembled coil into the core 152 in the coil assembling section 2 based on the step S1 and the step S8 of FIG. 12 and steps shown in the flow chart of FIG. 39. Hereinafter, operations in the coil assembling section 2 will be described with reference to the flow charts of FIG. 12 and FIG. 39 in detail.

As aforementioned, the PLC 46 reads out, at the step S1 of FIG. 12, from the memory a series of control data for coil assembling operations, that is a number and layer number of coil segments applied to the segment arrangement drum 105 in the coil assembling section 2, a rotating amount of index, a rotating amount of the arms 139A and 139B in the separation preventing means 106, a protruded amount of the blades 108 and a moving amount of the press ring 135 for example, with respect to the coil segment to be formed, and outputs the control data to the second NC controller 48.

The second NC controller 48 expands the received control data and performs NC control of a drive mechanism with the designated address. The important points of this embodiment are that cutting operations and stripping operations of the coated insulation layer in the wire rod providing section 3, first bending operations in the first bending section 4, second bending operations in the second bending section 5, and assembling operations in the coil assembling section 2 are performed in units of coil segments based on the set control data. That is, the cutting operations and the stripping operations of the coated insulation layer with respect to a coil segment to be formed are performed based on the set control data, the first bending operations with respect to the same coil segment are performed based on the set control data, the second bending operations with respect to the same coil segment are performed based on the set control data, and the assembling operations with respect to the same coil segment are performed based on the set control data. Thus, the cutting operations and the stripping operations of the wire rod, the bending operations of the coil segments and the coil assembling operations can be consistently performed resulting that the work efficiency can be extremely improved. Also, since the stock of the formed coil segments and the selection of necessary coil segment from the stocked coil segments are not necessary, the managements can become extremely easy.

In the coil assembling process (Step S8 in FIG. 12), at first, an index control for arranging the coil segments 17S on the peripheral surface of the segment arrangement drum 105 is performed. When the first coil segment 17S that is the coil segment to be formed is transported by the segment transport means 110, the insertion of the front leg of the transported first coil segment into the segment hold portion 109a, that is the reference point, of the segment arrangement drum 105 is detected by the detection sensor 170, and a detection signal is sent to the PLC 46, the servomotor 117 is rotationally driven to rotate the segment arrangement drum 105 by an angle of one slot (10 degrees in this embodiment) to the anticlockwise direction in FIG. 24A. This operation is repeated in stages. When the arrangement of the coil segments 17S on the segment arrangement drum 105 for a predetermined number of rounds is completed, the servomotor 127 is rotationally driven to protrude the blades 108 from the segment arrangement drum 105 by a predetermined height (Step S11 in FIG. 39).

The detection sensor 170 of this embodiment is desirably a distance judgement sensor using a laser or else. As shown in FIG. 24A, a laser emitting part and a laser receiving part are arranged on the under surface of the guide member 112. The distance is determined by irradiating a laser light from the light emitting part to the segment hold portion, that is a reference point, and by receiving the reflected light at the laser receiving part. The PLC 46 is possible to judge whether the coil segment of the first round is inserted or the coil segment of the second or later round is inserted depending on the determined distance and send the result of the judgment to the second NC controller 48. In modification, a sensor for emitting and receiving a color light may be mounted in addition to the distance judgement sensor. Namely, a color light sensor provided with line shaped light emitting part and light receiving part extending along the axial direction of the segment arrangement drum 105 and the distance judgment sensor are arranged side by side on the under surface of the guide member 112. A color light from the light emitting part to the segment hold portion, that is a reference point, and the reflected color light is received by the light receiving part. The PLC 46 calculates a spectrum light intensity of the reflected light applied from the light receiving part and compares the calculated light intensity with a reference spectrum light intensity range stored beforehand. If the detected and calculated spectrum light intensity is within an allowable range set beforehand, the PLC 48 judges that the front leg is normally inserted and arranged and sends the result of the judgment to the second NC controller 48. Since the coil segment 17S is in general a copper color that is different from the color of the blades 108 and the color of the peripheral surface of the segment arrangement drum 105, it is possible to distinguish the reflected light of the front leg of the coil segment from the reflected light of other portions. In modification, the judgement of whether the front leg is normally arranged or not may be performed by using combination of a photoelectric sensor such as a color sensor and an image sensor such as a charge coupled device (CCD) or a complementary metal oxide semiconductor (CMOS). If the combination of sensors using different detection methods is used, it is possible to lower the detection error.

When an assembled coil is formed by arranging, in a predetermined number of layers, the coil segments 17S on the segment arrangement drum 105, the second NC controller 48 starts NC control operations for inserting the assembled coil into the core (Step S12 in FIG. 39). That is, the second NC controller 48 expands the control data for inserting the assembled coil into the core 152 and outputs the expanded control data to the push-out mechanism 119, the blade adjustment mechanism 118 and the separation preventing means 106 to start the insertion operations by rotationally driving the corresponding servomotors.

At first, the second NC controller 48 performs NC control for moving the press ring 155 to the P(+) direction by rotationally driving the servomotor 133 of the push-out mechanism 119 so as to insert the end portion of the slot insertion portion of the assembled coil into the insertion guide unit 153 (Step 13 in FIG. 39). This movement of the press ring 135 is stopped just before the coil end portions (linking portion) of the assembled coil interfere with the blades 108, or just before the press ring 135 abuts against the separation preventing means 106. Thus, the segment arrangement drum 105 is supported at both ends. FIG. 36 shows this state.

Then, the second NC controller 48 performs NC control for moving back the blades 108 so that no blade protrudes from the peripheral surface of the segment arrangement drum 105 by rotationally driving the servomotor 127 of the blade adjustment mechanism 118, for separating the belt 107 from the peripheral surface of the segment arrangement drum 105 by rotationally driving the servomotor 143 of the separation preventing means 106, and for lowering down the separation preventing means 106 (Step 14 in FIG. 39).

Then, the second NC controller 48 performs NC control for moving the press ring 155 to the P(+) direction by rotationally driving the servomotor 133 of the push-out mechanism 119 and for stopping the movement of the press ring 155 just before the coil end portions (linking portion) abuts against the cuffs supporter 154 (Step 15 in FIG. 39). FIG. 37 shows this state.

Then, the second NC controller 48 performs NC control for opening the cuffs supporter 154 by controlling a drive mechanism not shown so that all the protrusions 154a of the cuffs supporter 154 move toward the radial outward direction (Step 16 of FIG. 39).

Thereafter, the second NC controller 48 performs NC control for advancing the press ring 155 to a predetermined position by rotationally driving the servomotor 133 of the push-out mechanism 119 to complete the insertion of the assembled coil into the core 152, that is, the annular insertion of the coil segments into the slots of the core 152 (Step 17 in FIG. 39). After the insertion of the coil segments, the press ring 135 is returned to the original position. FIG. 38 shows this state.

Next, a manufacturing apparatus of an electrical rotating machine in another embodiment according to the present invention will be describe with reference to FIGS. 40A to 40D and FIG. 41. In this embodiment, as shown in FIGS. 40A to 40D and FIG. 41, a guide means a coil assembling section has a two stage construction so that two different kinds of coil segments with different linking portions and different coil widths to each other can be assembled. Other constitutions, operations and advantages in this embodiment are the same as these in the aforementioned embodiment. Therefore, detail explanations of this embodiment will be omitted and the same reference numerals may be used in this embodiment for the similar components as these in the aforementioned embodiment.

As shown in FIGS. 40A to 40D and FIG. 41, the guide means 113 in this embodiment has the two stage configuration consisting of an outer guide member 114, and an inner guide member 115 located nearer than the outer guide member 114 with respect to the center axis C of the segment arrangement drum 105. The outer guide member 114 and the inner guide member 115 are arranged above the segment arrangement drum 105. The configuration of the outer guide member 114 and the inner guide member 115 is basically the similar as that of the guide member 112 in the embodiment shown in FIG. 27. That is, each of the outer guide member 114 and the inner guide member 115 has a plurality (three in this embodiment) of guide pieces with a small width, and the bracket 114b or 115b for supporting these guide pieces away from each other. The bracket 114b or 115b is formed along the axial direction of the segment arrangement drum 105, and the guide pieces extend to the direction perpendicular to the bracket 114b or 115b. The bracket 114b or 115b is fixed to a frame (not shown). The outer guide member 114 is formed in order to guide a large width coil segment 17S that has a large distance between slot insertion portions 17b and 17c, the inner guide member 115 is formed in order to guide a small width coil segment 17SS that has a small distance between slot insertion portions 17d and 17e.

The inner guide member 115 is configured that a length along the circumferential direction of its guide surface 115c is shorter than a length along the circumferential direction of a guide surface 114c of the outer guide member 114. The large width coil segment 17S is gripped by the chucking portion 111 of the segment transport means 110 and, under this state, the coil segment 17S is transported so that its front leg 17b passes under the inner guide member 115 and its rear leg 17c passes above the outer guide member 114. The front leg 17b of the coil segment 17S is lowered when this front leg 17b reaches a position of the segment hold portion above the segment arrangement drum 105, which position is the reference point. The small width coil segment 17SS is gripped by the chucking portion 111 of the segment transport means 110 and, under this state, the coil segment 17SS is transported so that its front leg 17d passes under the inner guide member 115 and its rear leg 17e passes above this inner guide member 115. The front leg 17d of the coil segment 17SS is lowered when the this front leg 17d reaches a position of the segment hold portion above the segment arrangement drum 105, which position is the reference point. In case of such two stage configurations of the guide members, the detection sensor 170 is arranged on the under surface of the inner guide member 115 to detect the front leg 17d of the coil segment 17SS.

Figure 40A:
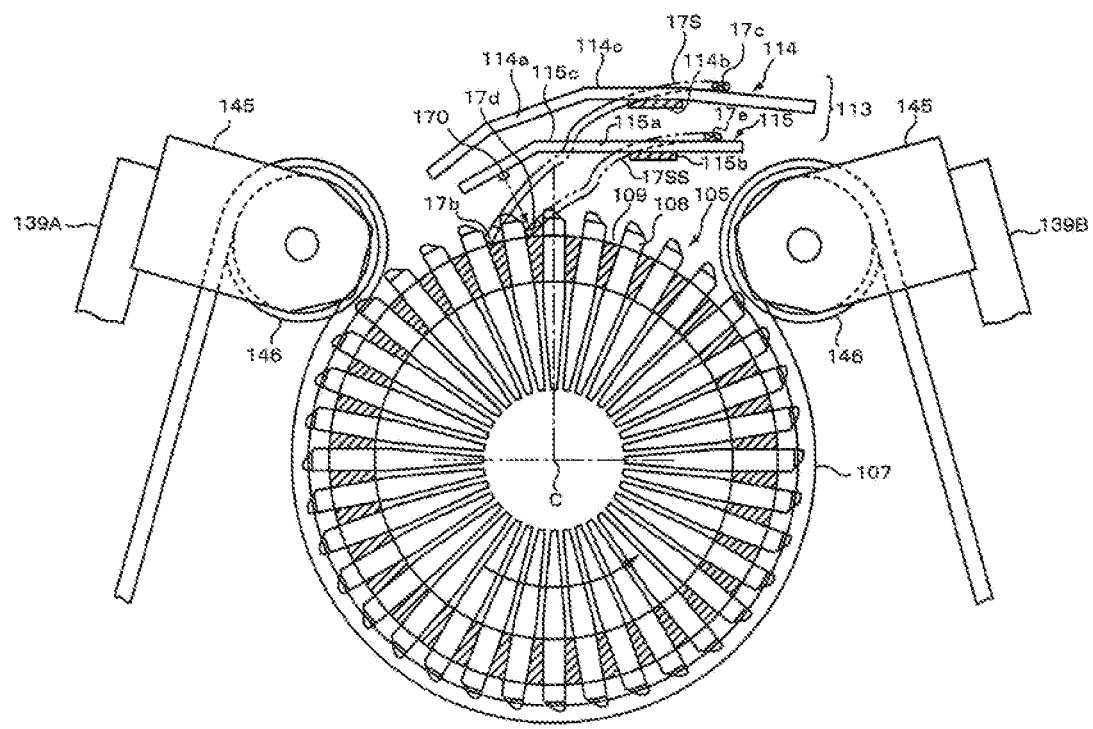
FIG. 40A is an essential part sectional view illustrating the state of a coil assembling section wherein a first coil segment and a second coil segment are inserted into a segment hold portion in another embodiment according to the present invention.
Figure 40B:
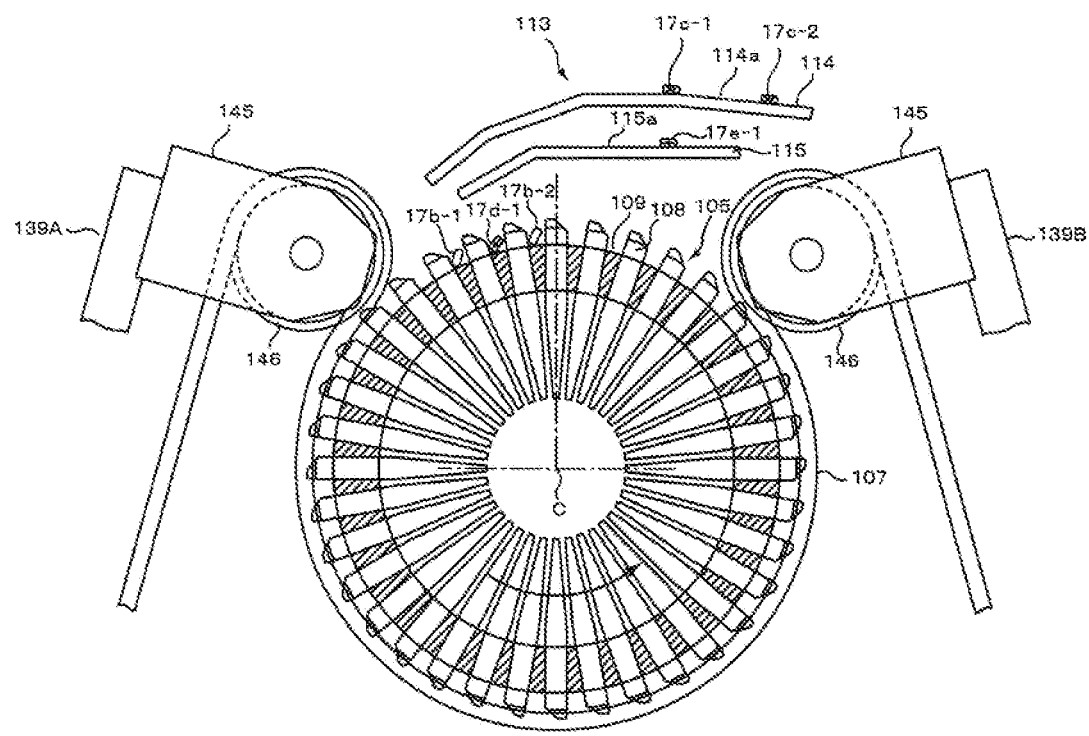
FIG. 40B is an essential part sectional view illustrating the state wherein front legs of first to third coil segments are inserted into the segment hold portions in the coil assembling section in this embodiment.

In this embodiment, coil assembling operation is performed by alternately supplying the large width coil segment 17S and the small width coil segment 17SS. FIG. 40B indicates conditions wherein the front leg 17b-1 of the first large width coil segment 17S is inserted in the predetermined segment hold portion 109 of the segment arrangement drum 105 and the rear leg 17c-1 thereof is laid on the outer guide member 114, the front leg 17d-1 of the second small width coil segment 17SS is inserted in the next segment hold portion 109 of the segment arrangement drum 105 and the rear leg 17e-1 thereof is laid on the inner guide member 115, and the front leg 17b-2 of the third large width coil segment 17S is inserted in the next segment hold portion 109 of the segment arrangement drum 105 and the rear leg 17c-2 thereof is laid on the outer guide member 114.

Figure 40C:
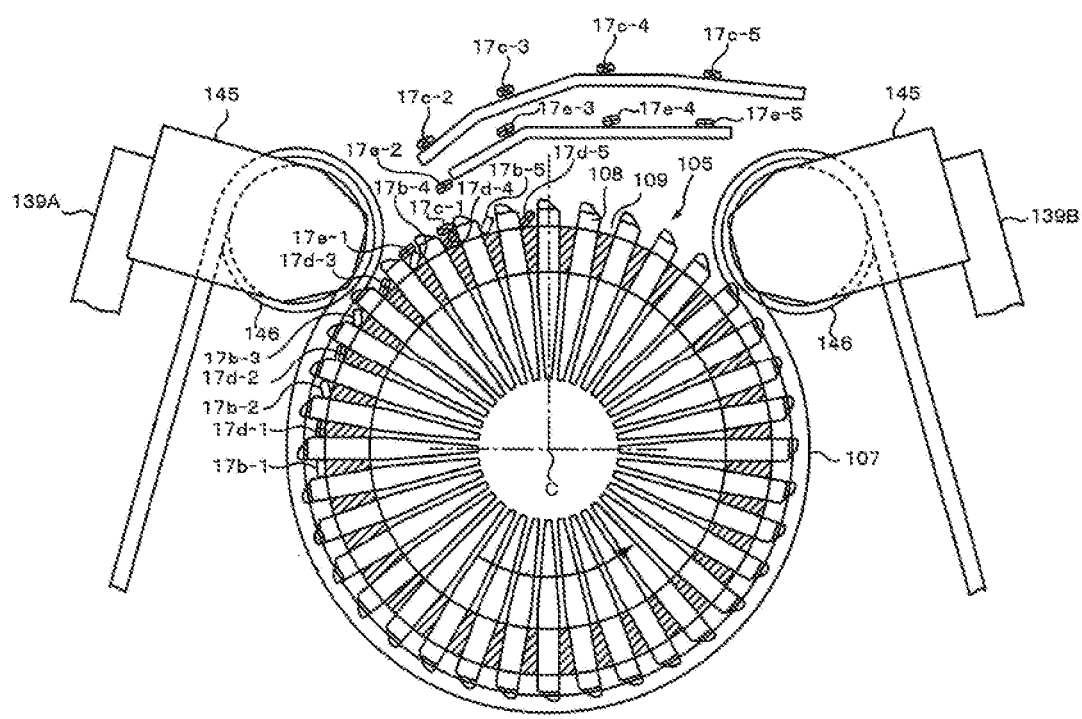
FIG. 40C is an essential part sectional view illustrating the state wherein a rear leg of the second coil segment is inserted before a rear leg of the first coil segment, into the segment hold portions in the coil assembling section in this embodiment.

When the alternate arrangement of the large width coil segment 17S and the small width coil segment 17SS is proceeded, the rear leg 17e-1 of the second small width coil segment 17SS falls earlier than the rear leg 17c-1 of the first large width coil segment 17S and is arranged as shown in FIG. 40C. The lengths along the circumferential direction of the outer guide member 114 and the inner guide member 115 are set so that falling of the rear legs occur at such timing.

Figure 40D:
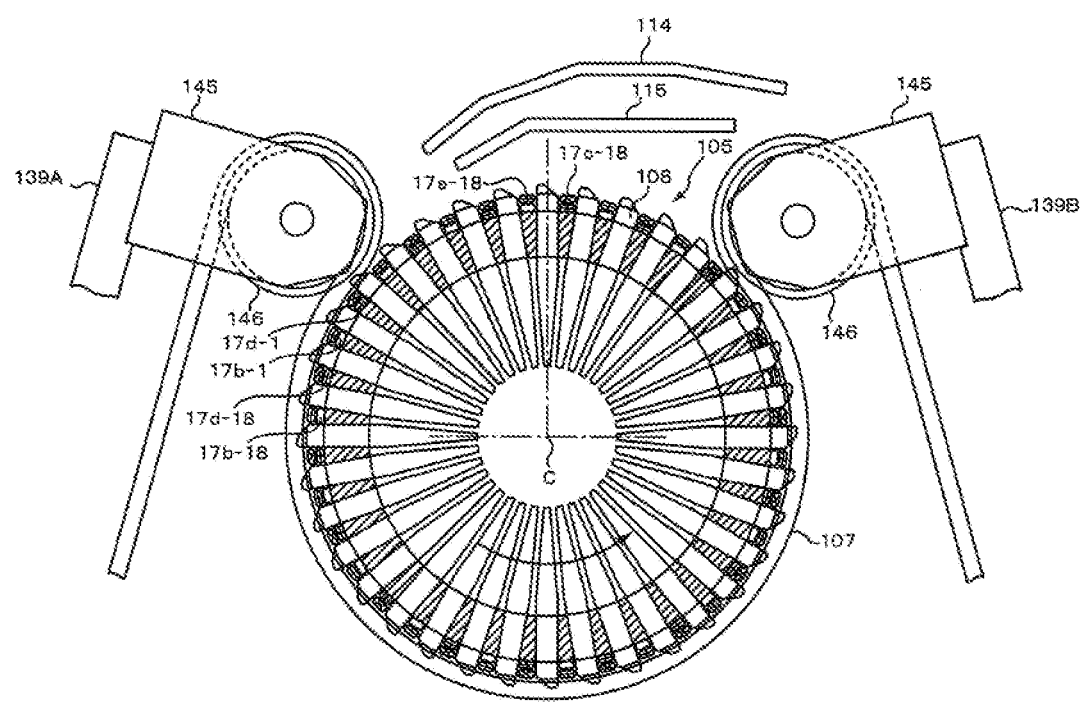
FIG. 40D is an essential part sectional view illustrating the state wherein the coil segments of a first loop are inserted into the segment hold portions in the coil assembling section in this embodiment.
Figure 41:
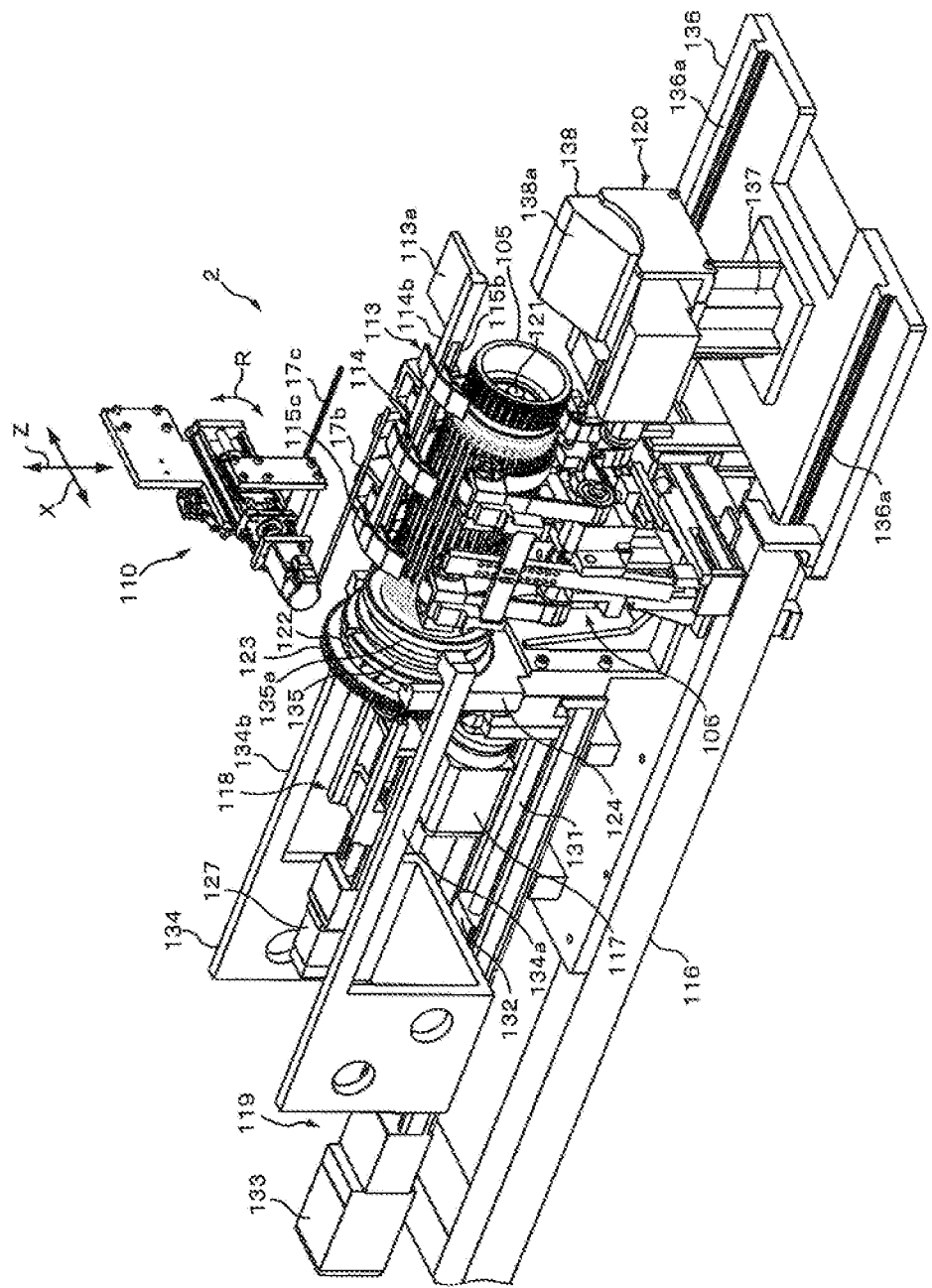
FIG. 41 is a perspective view schematically illustrating the whole constitution of the coil assembling section in this embodiment.

FIG. 40D shows the state where the arrangement of the coil segments of the first round is completed. It is possible to arrange the coil segments in a more complicated pattern by configuring three or more stages of the guide members According to this embodiment, as for the coil segments to be supplied to the coil assembling section 2, the large width coil segments 17S and the small width coil segments 17SS are alternately arranged as shown in FIG. 41. In this case, not simple pattern of arrangement is performed as that the rear legs (2) and (4) of the second and fourth small width coil segments 17SS are first arranged than the rear legs (1) and (3) of the first and third large width coil segments 17S. Namely, when ten coil segments 17S and 17SS are arranged and expanded, the rear legs of the second coil segment 17SS, the first coil segment 17S, the fourth coil segment 17SS and the third coil segment 17S are arranged on the front legs of the seventh coil segment 17SS, the eighth coil segment 17S, the ninth coil segment 17SS and the tenth coil segment 17S, respectively.

Figure 42:
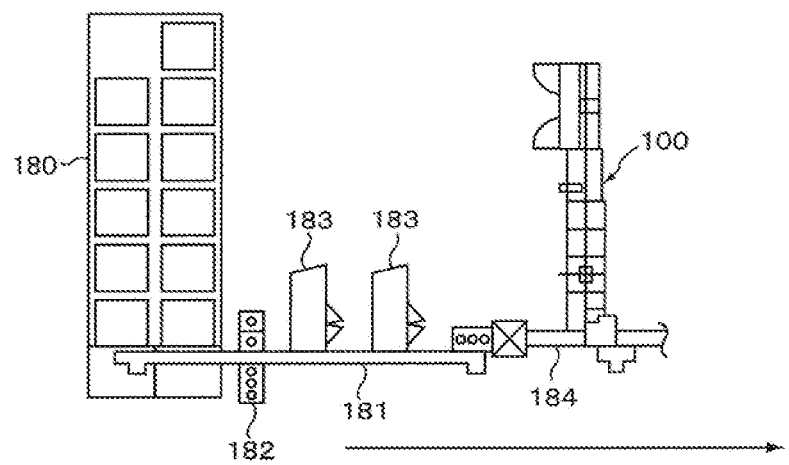
FIG. 42 is a plane view schematically illustrating a system constitution example of the manufacturing apparatus of an electrical rotating machine according to the present invention.
Figure 43:
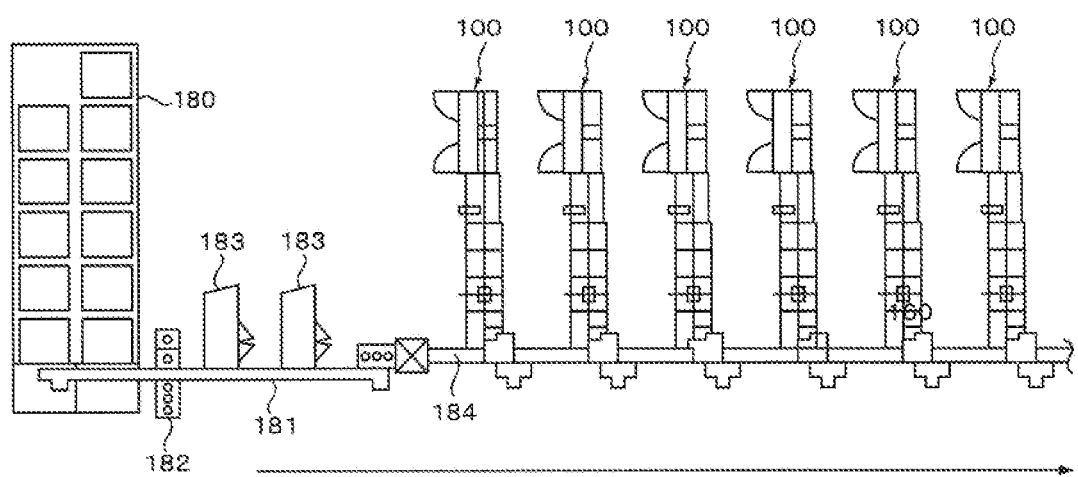
FIG. 43 is a plane view schematically illustrating another system constitution example of the manufacturing apparatus of an electrical rotating machine according to the present invention.

FIGS. 42 and 43 schematically illustrate a system constitution example of the manufacturing apparatus of the electrical rotating machine according to the present invention.

A manufacturing system shown in FIG. 42 has a stator core palette 180 for accommodating a core of a plurality of stators, which is an example of the electrical rotating machine, a core transportation line 181, a lase marker 182 located downstream of the stator core palette 180 on the core transportation line 181, for positioning or for marking the core, a plurality of insulation paper inserters 183 located downstream of the laser marker 182 on the core transportation line 181, for inserting insulation papers into slots of the stator core, a stator transportation line 184 located downstream of the core transportation line 181, and a single manufacturing apparatus of the electrical rotating machine 100 arranged to intersect with (in this example being perpendicular to) this stator transportation line 184 and formed as a coil supplying line for consistently unitizing processes of cutting of the wire rod, peeling of insulation layer, first bending of coil segment, second bending of coil segment, assembling of coil, and inserting of the coil into the core.

Although not shown in the drawings, a coil twisting section for twisting free end portions (slot insertion end portions) of the coil segments and a welding section for welding the twisted end portions to make all the coil segments in the conducting condition are arranged on the stator transportation line 184 downstream of the manufacturing apparatus of the electrical rotating machine 100.

The coil supplying line (the manufacturing apparatus of the electrical rotating machine 100) is configured by unitizing the wire rod providing section 3 for supplying a linear wire rod with a predetermined length, the coated insulation layer at both end portions being stripped, the first bending section 4 for firstly bending, in the same plane, the supplied wire rod into U-shape consisting of a pair of slot insertion portions extending substantially in parallel with each other and a linking portion for coupling the pair of slot insertion portions, the second bending section 5 for secondly bending the first bent body bent in the first bending section 4 in a direction intersecting with the above-mentioned same plane, the coil assembling section 2 for assembling a coil by circularly arranging the coil segments bent in the second bending section 5, and the push-out mechanism 119 for pushing out the coil assembled at the coil assembling section 2 to insert the coil into slots of the stator core. In the initial stage of construction of manufacturing equipment, only the single coil supplying line is built as this system constitution example of FIG. 42 so as to construct a small sized manufacturing apparatus and thus to reduce the initial investment cost.

In a manufacturing system shown in FIG. 43, a plurality (six in this example) of unitized coil supplying lines (the manufacturing apparatuses of the electrical rotating machine 100) are arranged to intersect with (in this example being perpendicular to) the stator transportation line 184. In the initial stage of construction of manufacturing equipment, only the single coil supplying line is built as the system constitution example of FIG. 42 to reduce the initial investment cost. Then, the number of the unitized coil supplying lines may be increased to enlarge the manufacturing scale depending on increased demand of stators. Thereby, it is possible to perform efficient investment in plant and equipment. Since the coil supplying line (the manufacturing apparatus of the electrical rotating machine 100) is unitized and has the same specification, if a production capability of the initial single coil supplying line is validated, it is not necessary to confirm the production capability of the increased coil supplying lines.

In manufacturing the electrical rotating machine, plant investment under the conditions where demand of the electrical rotating machine could not be clearly and correctly grasped was quite difficult and risky. If a gap existed between the assumed demand and the real demand, excess investment in plant and equipment was invited. However, in the aforementioned manufacturing system where the number of the unitized coil supplying line having the same specification is increased depending on the demand of the electrical rotating machine, since manufacturing of the electrical rotating machine can be performed from the minimum initial investment and the equipment can be enlarged in stages depending on the increase in demand resulting that it is possible to perform efficient (with low risk) investment in plant and equipment.

Although a preferred embodiment of the present invention is described, the present invention is not limited to such specific embodiment described in the specification, except as defined in the appended claims. But many widely different embodiments of the present invention may be constructed without departing from the spirit and scope of the present invention. The advantages described in the embodiment of the present invention are merely preferable advantages but the advantages of the present invention are not limited to that described in the specification.

DENOTATION OF REFERENCE NUMERALS

1: coil segment shaping section
2: coil assembling section
3: wire rod providing section
4: first bending section
5: second bending section
6: wire rod
7: bobbin
8: feed direction switching section
9: correction transport section
9a, 9b: roller pair
10: peeling section
11: cutting section
12: feed mechanism
13: hold member
14A, 14B, 15A, 15B, 16A, 16B: jig
17a, 17a': linking portion
17b, 17c: slot insertion portion
17A: first bent body
14A-1, 14B-1, 15A-1, 15B-1, 16A-1, 16B-1, 164a: concave groove
14A-2, 14B-2, 15A-2, 15B-2, 16A-2, 16B-2: edge portion
14A-3, 14B-3, 15A-3, 15B-3, 16A-3, 16B-3: chamfered portion
18: fixed base
19A, 19B: guide rail
20A, 20B, 59: movable base
21, 27A, 27B, 28A, 28B, 60A, 60B, 61, 63A, 63B, 64: drive mechanism
22, 29A, 29B, 35A, 35B, 65, 75, 79, 85, 99, 125, 131, 159: ball screw portion
23, 30A, 30B, 36A, 36B, 66, 76, 80, 86, 87, 014, 126, 132, 160: nut portion
24, 31A, 37A, 31B, 68, 72, 78, 82, 89, 102, 117, 127, 133, 161: servomotor
25, 71, 77, 81: slider
26A, 26B, 128a, 128b, 134a, 134b, 139A, 139B: arm
32A, 32B, 88: slide plate
33A, 33B, 92, 103, 168: cam follower
34A, 34B: turning plate
38A, 38B: turning drive plate
39A, 39B: engagement concave portion
41, 44: turning center
45: HMI
46: PLC
47: first NC controller
48: second NC controller
49: control unit
50, 51: optical communication cable
53A, 53B, 54A, 54B: press jig
53A-1, 53-B, 54A-1, 54B-1: press surface
53A-2, 53A-3, 53B-2, 53B-3, 54A-2, 54A-3: bolt-insertion hole
53A-4, 53B-4, 54A-4, 54B-4: corner
55, 56: press-jig unit
58: fixed base
58a: opening portion
62: rotation base
73, 74, 83, 84: movement plate
90, 95, 96: rail member
91, 97, 98: slide member
93, 101a: engagement groove
94, 163: bracket
100: manufacturing apparatus of electrical rotating machine
101: engagement member
105: segment arrangement drum
106: separation preventing means
107: belt
108: blade
108a: groove
108b: tapered surface
109, 109a segment hold portion
110: segment transport means
111: chucking portion
112, 113: guide member
112a: guide piece 112*b*, 114*b*, 115*b*, 163: bracket
112*c*, 114*c*, 115*c*: guide surface
113: guide means
114: outer guide member
115: inner guide member
116, 136, 157: base
118: blade adjustment mechanism
119: push-out mechanism
120: work support base
121: rotation axis
122: bearing
123: large diameter gear
124: receiving portion
128, 134: slide member
129: engagement portion
129*a*: annular groove
130: conical cam
135: press ring
136*a*, 165: rail
137: prop
138: work carrying portion
138*a*, 153*a*: concave portion
139*a*: screw hole
140: axis
141A, 141B: rack member
142: pinion gear
144: horizontal bar
144*a*: fixing hole
145: holder
146: movable pulley
147, 148: fixed pulley
149: tension pulley
150: support shaft
151, 167: air cylinder
152: core
153: insertion guide unit
154: cuffs supporter
154*a*: projection
155: cuffs portion
158: drive mechanism
162: slider
164: drive pawl
166: turning base
170: detection sensor
180: stator core palette
181: core transportation line
182: laser marker
183: insulation paper inserter
184: stator transportation line
C: bending centerline

The invention claimed is:

1. A manufacturing apparatus for an electrical rotating machine having a coil, the manufacturing apparatus comprising:
   a coil segment shaping section including:
      a plurality of jigs, each having a groove through which a linear wire rod extends, the wire rod having a predetermined length; and
      a plurality of first bending drive mechanisms that independently move each of a first pair of the plurality of jigs, each of a second pair of the plurality of jigs, and each of a third pair of the plurality jigs respectively to shape the wire rod into a coil segment having a pair of slot insertion portions extending substantially in parallel with each other and a linking portion coupling the pair of slot insertion;
   a numerical controller driving the plurality of first bending drive mechanisms based on control data for the coil to be formed to independently move each of the first pair of jigs in a first curved path relative to each other to bend the wire rod to form a first angle in a plane defined by the wire rod having the first angle, independently move each of the second pair of jigs in a second curved path relative to each other to bend the wire rod to form a second angle in the plane, and independently move each of the third pair of jigs in a third curved path relative to each other to bend the wire rod to form a third angle in the plane; and
   a coil assembling section assembling the coil by circularly arranging a plurality of the coil segments, the coil assembling section including:
      a segment arrangement body having a plurality of segment hold portions annularly arranged along its circumferential direction, into which the plurality of the coil segments are respectively inserted from outer radial directions, and being rotatable around a center axis of the body; and
      a guide member guiding insertion of one of the pair of slot insertion portions of the coil segment of each of the plurality of the coil segments into one of the segment hold portions each time the segment arrangement body rotates by a first predetermined angle, and guiding insertion of the other one of the pair of slot insertion portions of the coil segment of each of the plurality of the coil segments into another one of the segment hold portions after the segment arrangement body rotates by a second predetermined angle after the insertion of the one of the pair of slot insertion portions of the coil segment.

2. The manufacturing apparatus according to claim 1, further comprising a wire rod providing section including a supply of continuous wire rod and a cutter cutting the continuous wire rod to provide the linear wire rod with the predetermined length.

3. The manufacturing apparatus according to claim 1, further comprising a coil insertion mechanism including a servo motor driving a press ring to slide and push out an assembled coil that is assembled in said coil assembling section to an axial direction of the assembled coil to insert the assembled coil into a core coaxially arranged with the assembled coil.

4. The manufacturing apparatus according to claim 1, further comprising a work supplying line supplying stator and rotors having cores, a coil supplying line connected to said work supplying line and provided with said coil segment shaping section, said coil assembling section and said coil insertion mechanism, and wherein said coil insertion mechanism of said coil supplying line is configured to insert the assembled coil into slots of the core supplied from said work supplying line.

5. The manufacturing apparatus according to claim 4, wherein the coil supplying line is unitized, and wherein a plurality of unitized coil supplying lines are equipped.

6. The manufacturing apparatus according to claim 1, wherein the numerical controller drives at least one of the plurality of first bending drive mechanisms to linearly move at least one of the second pair of the plurality of jigs and the third pair of the plurality of jigs to change the location on the wire rod for bending the wire rod to form at least one of the second angle and the third angle respectively.

7. The manufacturing apparatus according to claim 1, further comprising a second bending section pinching and pressing the linking portion, the second bending section including:
- a second plurality of pairs of press jigs, each of the pairs of press jigs being configured to press the wire rod therebetween; and
- a plurality of second bending drive mechanisms moving respectively the second plurality of pairs of press jigs in directions intersecting with the plane, and wherein the numerical controller drives the plurality of second bending drive mechanisms to move the second plurality of pairs of press jigs based on moving amounts respectively set in the control data based on shape conditions of the coil segment to be formed.

8. The manufacturing apparatus according to claim 7, wherein the numerical controller drives the plurality of second bending drive mechanisms to move the plurality of pairs of press jigs to form a misalignment in the linking portion along a direction intersecting with the plane.

9. A manufacturing method for an electrical rotating machine having a coil comprising:
- a coil segment shaping process of shaping a linear wire rod with a predetermined length into a coil segment having a pair of slot insertion portions extending substantially in parallel with each other and a linking portion coupling the pair of slot insertion portions, the coil segment shaping process including a first bending process, the first bending process including driving a plurality of first bending drive mechanisms based on control data for the coil to be formed to independently move each of a first pair of jigs in a first curved path relative to each other to bend the wire rod to form a first angle in a plane defined by the wire rod having the first angle, independently move each of a second pair of jigs in a second curved path relative to each other to bend the wire rod to form a second angle in the plane, and independently move each of a third pair of jigs in a third curved path relative to each other to bend the wire rod to form a third angle in the plane, each of the first pair of jigs, the second pair of jigs, and the third pair of jigs having a groove through which the wire rod extends; and
- a coil assembling process of assembling the coil by circularly arranging a plurality of the coil segments shaped in the coil segment shaping process, the coil segment shaping process and the coil assembling process continuously performing the shaping and the assembling of the coil segment in each coil segment unit, based on the control data for the coil to be formed.

10. The manufacturing method according to claim 9, wherein the wire rod having the first angle, the second angle, and the third angle is a first bent body, wherein the coil segment shaping process further comprises a second bending process including a second bending of the first bent body in a direction intersecting with the plane, and wherein said first bending process and said second bending process are continuously performed for each of the plurality of the coil segments.

11. The manufacturing method according to claim 9, further comprising a wire rod providing process including supplying the linear wire rod with the predetermined length, and wherein the wire rod providing process, the coil segment shaping process and the coil assembling process are continuously performed.

12. The manufacturing method according to claim 9, further comprising a coil insertion process including pushing out an assembled coil that is assembled in the coil assembling process to an axial direction of the assembled coil to insert the assembled coil into a core coaxially arranged with the assembled coil.

* * * * *